(12) United States Patent
Dubrow et al.

(10) Patent No.: US 10,302,845 B2
(45) Date of Patent: May 28, 2019

(54) QUANTUM DOT FILMS, LIGHTING DEVICES, AND LIGHTING METHODS

(71) Applicant: Nanosys, Inc., Milpitas, CA (US)

(72) Inventors: Robert S. Dubrow, San Carlos, CA (US); William P. Freeman, San Mateo, CA (US); Ernest Lee, Palo Alto, CA (US); Paul Furuta, Sunnyvale, CA (US)

(73) Assignee: Nanosys, Inc., Milpitas, CA (US)

( * ) Notice: Subject to any disclaimer, the term of this patent is extended or adjusted under 35 U.S.C. 154(b) by 0 days.

(21) Appl. No.: 15/245,020

(22) Filed: Aug. 23, 2016

(65) Prior Publication Data

US 2016/0363713 A1    Dec. 15, 2016

Related U.S. Application Data

(60) Continuation of application No. 15/018,512, filed on Feb. 8, 2016, now Pat. No. 9,804,319, which is a
(Continued)

(51) Int. Cl.
*F21V 8/00* (2006.01)
*B82Y 20/00* (2011.01)
(Continued)

(52) U.S. Cl.
CPC .............. *G02B 6/0055* (2013.01); *B32B 5/16* (2013.01); *B32B 9/04* (2013.01); *B82Y 20/00* (2013.01);
(Continued)

(58) Field of Classification Search
CPC .... G02B 6/0055; G02B 6/005; G02B 6/0053; G02B 6/0061; G02B 6/0073; B32B 5/16;
(Continued)

(56) References Cited

U.S. PATENT DOCUMENTS 3,913,872 A * 10/1975 Weber .................... F21V 11/00
355/67
4,130,343 A    12/1978 Miller et al.
(Continued)

FOREIGN PATENT DOCUMENTS

CN       1779522 A      5/2006
CN     100559066 C     11/2009
(Continued)

OTHER PUBLICATIONS

English language abstract for Chinese Patent Publication No. CN 100559066 C, published Nov. 11, 2009, from https://worldwide.espacenet.com, 1 page.
(Continued)

*Primary Examiner* — Anh T Mai
*Assistant Examiner* — Jessica M Apenteng
(74) *Attorney, Agent, or Firm* — Sterne, Kessler, Goldstein & Fox P.L.L.C.

(57) ABSTRACT

Light-emitting quantum dot films, quantum dot lighting devices, and quantum dot-based backlight units are provided. Related compositions, components, and methods are also described. Improved quantum dot encapsulation and matrix materials are provided. Quantum dot films with protective barriers are described. High-efficiency, high brightness, and high-color purity quantum dot-based lighting devices are also included, as well as methods for improving efficiency and optical characteristics in quantum dot-based lighting devices.

20 Claims, 44 Drawing Sheets

Related U.S. Application Data continuation of application No. 14/612,935, filed on Feb. 3, 2015, which is a division of application No. 13/287,616, filed on Nov. 2, 2011, now Pat. No. 9,199,842, which is a continuation-in-part of application No. 12/318,516, filed on Dec. 30, 2008, now Pat. No. 8,343,575.

(60) Provisional application No. 61/412,004, filed on Nov. 10, 2010.

(51) Int. Cl.
    *B32B 5/16* (2006.01)
    *B32B 9/04* (2006.01)
    *G02F 1/1335* (2006.01)
    *F21V 9/30* (2018.01)
    *F21Y 115/10* (2016.01)

(52) U.S. Cl.
    CPC .......... *F21V 9/30* (2018.02); *G02B 6/005* (2013.01); *G02B 6/0053* (2013.01); *G02B 6/0061* (2013.01); *G02B 6/0068* (2013.01); *G02B 6/0073* (2013.01); *G02F 1/133611* (2013.01); *B32B 2313/00* (2013.01); *B32B 2457/202* (2013.01); *B32B 2551/00* (2013.01); *F21Y 2115/10* (2016.08); *G02F 2001/133614* (2013.01); *Y10S 977/774* (2013.01); *Y10T 428/31504* (2015.04)

(58) Field of Classification Search
    CPC . B32B 9/04; B32B 2313/00; B32B 2457/202; B32B 2551/00; B82Y 20/00; F21V 9/16; G02F 1/133611; G02F 2001/133614; Y10T 428/31504; F21Y 2115/10; Y10S 977/774
    USPC .......................................................... 362/607
    See application file for complete search history.

(56) References Cited

U.S. PATENT DOCUMENTS

| | | |
|---|---|---|
| 4,322,666 A | 3/1982 | Muller |
| 5,442,254 A | 8/1995 | Jaskie |
| 5,482,890 A | 1/1996 | Liu et al. |
| 5,599,897 A | 2/1997 | Nishiguchi et al. |
| 5,667,650 A | 9/1997 | Face et al. |
| 5,975,711 A | 11/1999 | Parker et al. |
| 5,990,479 A | 11/1999 | Weiss et al. |
| 6,107,105 A | 8/2000 | Sandhu |
| 6,207,229 B1 | 3/2001 | Bawendi et al. |
| 6,225,198 B1 | 5/2001 | Alivisatos et al. |
| 6,271,901 B1 | 8/2001 | Ide et al. |
| 6,322,901 B1 | 11/2001 | Bawendi et al. |
| 6,501,091 B1 | 12/2002 | Bawendi et al. |
| 6,541,790 B1 | 4/2003 | Pichler |
| 6,570,325 B2 | 5/2003 | Graff et al. |
| 6,639,733 B2 | 10/2003 | Minano et al. |
| 6,744,960 B2 | 6/2004 | Pelka |
| 6,755,563 B2 | 6/2004 | Wahlig et al. |
| 6,794,265 B2 | 9/2004 | Lee et al. |
| 6,803,719 B1 | 10/2004 | Miller et al. |
| 6,815,064 B2 | 11/2004 | Treadway et al. |
| 6,861,155 B2 | 3/2005 | Bawendi et al. |
| 6,861,674 B2 | 3/2005 | Perlo et al. |
| 6,864,626 B1 | 3/2005 | Weiss et al. |
| 6,878,871 B2 | 4/2005 | Scher et al. |
| 6,933,537 B2 | 8/2005 | Yee et al. |
| 6,949,206 B2 | 9/2005 | Whiteford et al. |
| 7,009,213 B2 | 3/2006 | Camras et al. |
| 7,041,539 B2 | 5/2006 | Fraboulet et al. |
| 7,087,833 B2 | 8/2006 | Scher et al. |
| 7,173,367 B2 | 2/2007 | Sanghera et al. |
| 7,180,566 B2 | 2/2007 | Lee |
| 7,229,690 B2 | 6/2007 | Chan et al. |
| 7,255,823 B1 | 8/2007 | Guenther et al. |
| 7,267,865 B2 | 9/2007 | Hetzler et al. |
| 7,267,875 B2 | 9/2007 | Whiteford et al. |
| 7,374,807 B2 | 5/2008 | Parce et al. |
| 7,449,237 B2 | 11/2008 | Chan et al. |
| 7,572,393 B2 | 8/2009 | Whiteford et al. |
| 7,572,490 B2 | 8/2009 | Park et al. |
| 7,585,564 B2 | 9/2009 | Whiteford et al. |
| 7,645,397 B2 | 1/2010 | Parce et al. |
| 7,662,313 B2 | 2/2010 | Whiteford et al. |
| 7,686,493 B2 | 3/2010 | Roshan et al. |
| 7,695,150 B2 | 4/2010 | Dejima et al. |
| 7,714,322 B2 | 5/2010 | Sandhu |
| 7,819,539 B2 | 10/2010 | Kim et al. |
| 7,910,400 B2 | 3/2011 | Kwon et al. |
| 7,969,085 B2 | 6/2011 | Cok |
| 8,088,483 B1 | 1/2012 | Whiteford et al. |
| 8,143,703 B2 | 3/2012 | Heald et al. |
| 8,343,575 B2 | 1/2013 | Dubrow |
| 8,697,471 B2 | 4/2014 | Dubrow |
| 9,139,767 B2 | 9/2015 | Dubrow |
| 9,199,842 B2 | 12/2015 | Dubrow et al. |
| 2001/0008363 A1 | 7/2001 | Sanghera et al. |
| 2001/0022494 A1 | 9/2001 | Fujishiro |
| 2002/0018632 A1 | 2/2002 | Pelka et al. |
| 2002/0186921 A1 | 12/2002 | Schumacher et al. |
| 2003/0148379 A1 | 8/2003 | Roitman et al. |
| 2005/0018106 A1 | 1/2005 | Wang et al. |
| 2005/0040340 A1 | 2/2005 | Morikawa et al. |
| 2005/0051766 A1 | 3/2005 | Stokes et al. |
| 2005/0214536 A1 | 9/2005 | Schrier et al. |
| 2005/0214967 A1 | 9/2005 | Scher et al. |
| 2005/0215164 A1 | 9/2005 | Mueller et al. |
| 2006/0001036 A1 | 1/2006 | Jacob et al. |
| 2006/0056166 A1 | 3/2006 | Yeo et al. |
| 2006/0068154 A1 | 3/2006 | Parce et al. |
| 2006/0087827 A1 | 4/2006 | Jung et al. |
| 2006/0103589 A1 | 5/2006 | Chua et al. |
| 2006/0105170 A1 | 5/2006 | Dobson et al. |
| 2006/0109682 A1 | 5/2006 | Ko et al. |
| 2006/0208657 A1 | 9/2006 | Hara et al. |
| 2006/0227546 A1 | 10/2006 | Yeo et al. |
| 2006/0255711 A1 | 11/2006 | Dejima et al. |
| 2007/0040501 A1 | 2/2007 | Aitken et al. |
| 2007/0114138 A1 | 5/2007 | Krasteva et al. |
| 2007/0121227 A1 | 5/2007 | Wang et al. |
| 2007/0178615 A1 | 8/2007 | Banin et al. |
| 2007/0215856 A1 | 9/2007 | Kwon et al. |
| 2007/0252526 A1 | 11/2007 | Aitken et al. |
| 2007/0267972 A1 | 11/2007 | Menegus et al. |
| 2008/0012001 A1 | 1/2008 | Gillies |
| 2008/0118755 A1 | 5/2008 | Whiteford et al. |
| 2008/0173886 A1 | 7/2008 | Cheon et al. |
| 2008/0191604 A1 | 8/2008 | Morris et al. |
| 2008/0193717 A1* | 8/2008 | Jongerden .............. B32B 15/04 428/142 |
| 2008/0217602 A1 | 9/2008 | Kahen |
| 2008/0237540 A1 | 10/2008 | Dubrow |
| 2008/0246388 A1 | 10/2008 | Cheon et al. |
| 2009/0011579 A1 | 1/2009 | Takeda et al. |
| 2009/0091689 A1 | 4/2009 | Rho et al. |
| 2009/0167981 A1 | 7/2009 | Arai et al. |
| 2009/0231831 A1 | 9/2009 | Hsiao et al. |
| 2009/0236619 A1 | 9/2009 | Kwon et al. |
| 2010/0051898 A1 | 3/2010 | Kim et al. |
| 2010/0110728 A1 | 5/2010 | Dubrow et al. |
| 2010/0123155 A1 | 5/2010 | Pickett et al. |
| 2010/0155749 A1 | 6/2010 | Chen et al. |
| 2010/0165660 A1 | 7/2010 | Weber et al. |
| 2010/0167011 A1 | 7/2010 | Dubrow |
| 2010/0172122 A1 | 7/2010 | Ramer et al. |
| 2010/0208172 A1 | 8/2010 | Jang et al. |
| 2010/0208493 A1 | 8/2010 | Choi et al. |
| 2010/0264371 A1 | 10/2010 | Nick |
| 2010/0276638 A1 | 11/2010 | Liu et al. |
| 2010/0283072 A1 | 11/2010 | Kazlas et al. |
| 2011/0068362 A1 | 3/2011 | Negley et al. |

(56) References Cited

U.S. PATENT DOCUMENTS

| | | | |
|---|---|---|---|
| 2011/0281388 | A1 | 11/2011 | Gough et al. |
| 2012/0113672 | A1 | 5/2012 | Dubrow et al. |
| 2013/0075014 | A1 | 3/2013 | Dubrow |
| 2014/0017396 | A1 | 1/2014 | Whiteford et al. |
| 2014/0035011 | A1 | 2/2014 | Chen et al. |
| 2014/0178648 | A1 | 6/2014 | Dubrow |
| 2015/0300600 | A1 | 10/2015 | Dubrow et al. |
| 2016/0009988 | A1 | 1/2016 | Dubrow |

FOREIGN PATENT DOCUMENTS

| | | | |
|---|---|---|---|
| CN | 101609863 | A | 12/2009 |
| CN | 101707223 | A | 5/2010 |
| EP | 1 965 453 | A2 | 9/2008 |
| EP | 1 804 116 | B1 | 8/2009 |
| EP | 1 813 978 | B1 | 9/2009 |
| EP | 2 249 429 | A1 | 11/2010 |
| JP | 6-58440 | B2 | 8/1994 |
| JP | 2001-66405 | A | 3/2001 |
| JP | 2003-240963 | A | 8/2003 |
| JP | 2004-093560 | A | 3/2004 |
| JP | 2004-179644 | A | 6/2004 |
| JP | 2004-239713 | A | 8/2004 |
| JP | 2005-514744 | A | 5/2005 |
| JP | 2005-209852 | A | 8/2005 |
| JP | 2005-538573 | A | 12/2005 |
| JP | 2006-073202 | A | 3/2006 |
| JP | 2006-146115 | A | 6/2006 |
| JP | 2007-005098 | A | 1/2007 |
| JP | 2007-173754 | A | 7/2007 |
| JP | 2007-192805 | A | 8/2007 |
| JP | 2008-503034 | A | 1/2008 |
| JP | 2009-157276 | A | 7/2009 |
| JP | 2009-231273 | A | 10/2009 |
| JP | 2010-533976 | A | 10/2010 |
| JP | 2011-202148 | A | 10/2011 |
| JP | 5418762 | B2 | 2/2014 |
| KR | 2000-0068127 | A | 11/2000 |
| KR | 2006-0056834 | A | 5/2006 |
| KR | 2010-0029519 | | 3/2010 |
| KR | 2010-0093860 | A | 8/2010 |
| TW | 550406 | | 9/2003 |
| TW | 200419223 | A | 10/2004 |
| TW | 200537714 | A | 11/2005 |
| TW | 200938913 | A | 9/2009 |
| TW | 201036214 | A | 10/2010 |
| WO | WO 03/009012 | A2 | 1/2003 |
| WO | WO 2005/022120 | | 3/2005 |
| WO | WO 2005/055330 | | 6/2005 |
| WO | WO 2005/119314 | A2 | 12/2005 |
| WO | WO 2006/057425 | A1 | 6/2006 |
| WO | WO 2008/115498 | A1 | 9/2008 |
| WO | WO 2009/011922 | A1 | 1/2009 |
| WO | WO 2009/098857 | A1 | 8/2009 |
| WO | WO 2009/137053 | A1 | 11/2009 |
| WO | WO 2010/077226 | A1 | 7/2010 |

OTHER PUBLICATIONS

English language abstract for Japanese Patent Publication No. JP 6-58440 B2, published Aug. 3, 1994, from https://worldwide.espacenet.com, 2 pages.
English language abstract for Japanese Patent Publication No. JP 2006-146115 A, published Jun. 8, 2006, from https://worldwide.espacenet.com, 2 pages.
English language abstract for Japanese Patent Publication No. JP 2007-5098 A, published Jan. 11, 2007, from https://worldwide.espacenet.com, 2 pages.
English language abstract for Japanese Patent Publication No. JP 2007-192805 A, published Aug. 2, 2007, from https://worldwide.espacenet.com, 2 pages.
English language abstract for Japanese Patent Publication No. JP 2008-503034 A, published Jan. 31, 2008, from https://worldwide.espacenet.com, 2 pages.
English language abstract for Japanese Patent Publication No. JP 2009-157276 A, published Jul. 16, 2009, from https://worldwide.espacenet.com, 2 pages.
English language abstract for Japanese Patent Publication No. JP 2009-231273 A, published Oct. 8, 2009, from https://worldwide.espacenet.com, 2 pages.
English language abstract for Japanese Patent Publication No. JP 2010-533976 A, published Oct. 28, 2010, from https://worldwide.espacenet.com, 1 page.
English language abstract for Japanese Patent Publication No. JP 2011-202148 A, published Oct. 13, 2011, from https://worldwide.espacenet.com, 2 pages.
English language abstract for Japanese Patent Publication No. JP 5418762 B2, published published Feb. 19, 2014, from https://worldwide.espacenet.com, 2 pages.
Communication pursuant to Article 94(3) EPC directed to related European Patent Application No. 11839257.0-1553, dated Apr. 20, 2017; 5 pages.
English Translation of Notice of Reasons for Refusal directed to related Japanese Patent Application No. 2013-538785, dated Sep. 17, 2015; 38 pages.
English-Language Translation of the First Office Action directed to related Chinese Patent Application No. 201510353134.6, dated Jul. 20, 2017.
English Translation of Notice of Reasons for Revocation directed to Japanese Opposition No. 2016-701202 (filed against related Japanese Patent No. 5940079), dated Jun. 12, 2017; 28 pages.
U.S. Appl. No. 10/796,832, Scher et al., "Process for producing nanocrystals and nanocrystals produced thereby," filed Mar. 10, 2004.
Alivisatos, A.P., "Semiconductor clusters, nanocrystals, and quantum dots" Science (1996) 271:933-937.
Gao, G. et al. "Low-cost compliant wafer-level packaging technology" (2008) http://www.tessera.com/technologies/imagingandoptics/Documents/IWPLC-Low%20cost%20WLP%2otechnology_10.2008.pdf.
Humpston, G. "High-density, wafer-level package interconnect providing a reliable and low-cost alternative to through silicon vias for image sensors" (2008) http://www.tessera.com/technologies/imagingandoptics/Documents/ DICEP WLP 2008.pdf.
Humpston, G., "Novel and low cost through silicon via solution for wafer scale packaging of image sensors," Electrical Design of Advanced Packaging and Systems Symposium (EDAPS) 2008; pp. 179-182.
Humpston, G., et al., "Low cost through silicon via solution compatible with existing assembly infrastructure and suitable for single die and die stacked packages," International Conference on Electronic Materials and Packaging (EMAP) 2008; pp. 61-64.
Murray, C.B. et al., "Synthesis and Characterization of Nearly Monodisperse CdE (E+S, Se, Te) Semiconductor Nanocrystallites" J. Am. Chern. Soc. (1993) 5:8706-8715.
Peng, X. et al., "Epitaxial growth of highly luminescent CdSe/CdS core/shell nanocrystals with photostability and electronic accessibility" J. Am. Chern. Soc. (1997) 9:7019-7029.
Takeda, Y., et al., "A Novel Method Based on Oblique Depositions to Fabricate Quantum Dot Arrays," Conference Record of the IEEE 4th World Conference on Photovoltaic Energy Conversion, 1:75-78 (2006).
International Search Report directed to related International Patent Application No. PCT/US2011/058941, dated Apr. 23, 2012; 3 pages.
International Preliminary Report on Patentability and Written Opinion of the International Searching Authority directed to related International Patent Application No. PCT/US2011/058941, dated May 14, 2013; 21 pages.
International Search Report directed to related International Patent Application No. PCT/US2008/014112, dated Mar. 10, 2009; 1 page.
International Preliminary Report on Patentability and Written Opinion of the International Searching Authority directed to related International Patent Application No. PCT/US2008/014112, dated Jul. 5, 2011; 10 pages.

(56) References Cited

OTHER PUBLICATIONS

Supplemental European Search Report directed to related European Patent Application No. 11839257.0-1553, dated Apr. 3, 2014; 7 pages.
English Translation of Notice of Reasons for Rejection directed to related Japanese Patent Application No. JPA P2011-543486, dated Mar. 26, 2012; 5 pages.
English-Language Translation of the First Office Action directed to related Chinese Patent Application No. 201180057057.X, dated Dec. 24, 2014; 6 pages.
English language Abstract of Japanese Patent Publication No. JP 2003-240963 A, Japanese Patent Office, published Aug. 27, 2003, Espacenet database.
English language Abstract of Japanese Patent Publication No. JP 2004-093560 A, Japanese Patent Office, published Mar. 25, 2004, Espacenet database.
English language Abstract of Japanese Patent Publication. No. JP 2006-073202 A, Japanese Patent Office, published Mar. 16, 2006, Espacenet database.
U.S. Appl. No. 15/018,512, Dubrow et al., "Quantum Dot Films, Lighting Devices, and Lighting Methods," filed Feb. 8, 2016.
English-Language Translation of Korean Patent Publication No. 2010-0029519, published Mar. 17, 2010; 14 pages.
Office Action directed to related Taiwanese Patent Application No. 100140135, dated Feb. 15, 2016, with attached English-language translation; 71 pages.
English-language Abstract of Japanese Patent Publication No. 2004-239713 A, Japanese Patent Office, published Aug. 26, 2004, Espacenet database; 1 page.

\* cited by examiner

PRIOR ART

PRIOR ART

PRIOR ART

PRIOR ART

PRIOR ART

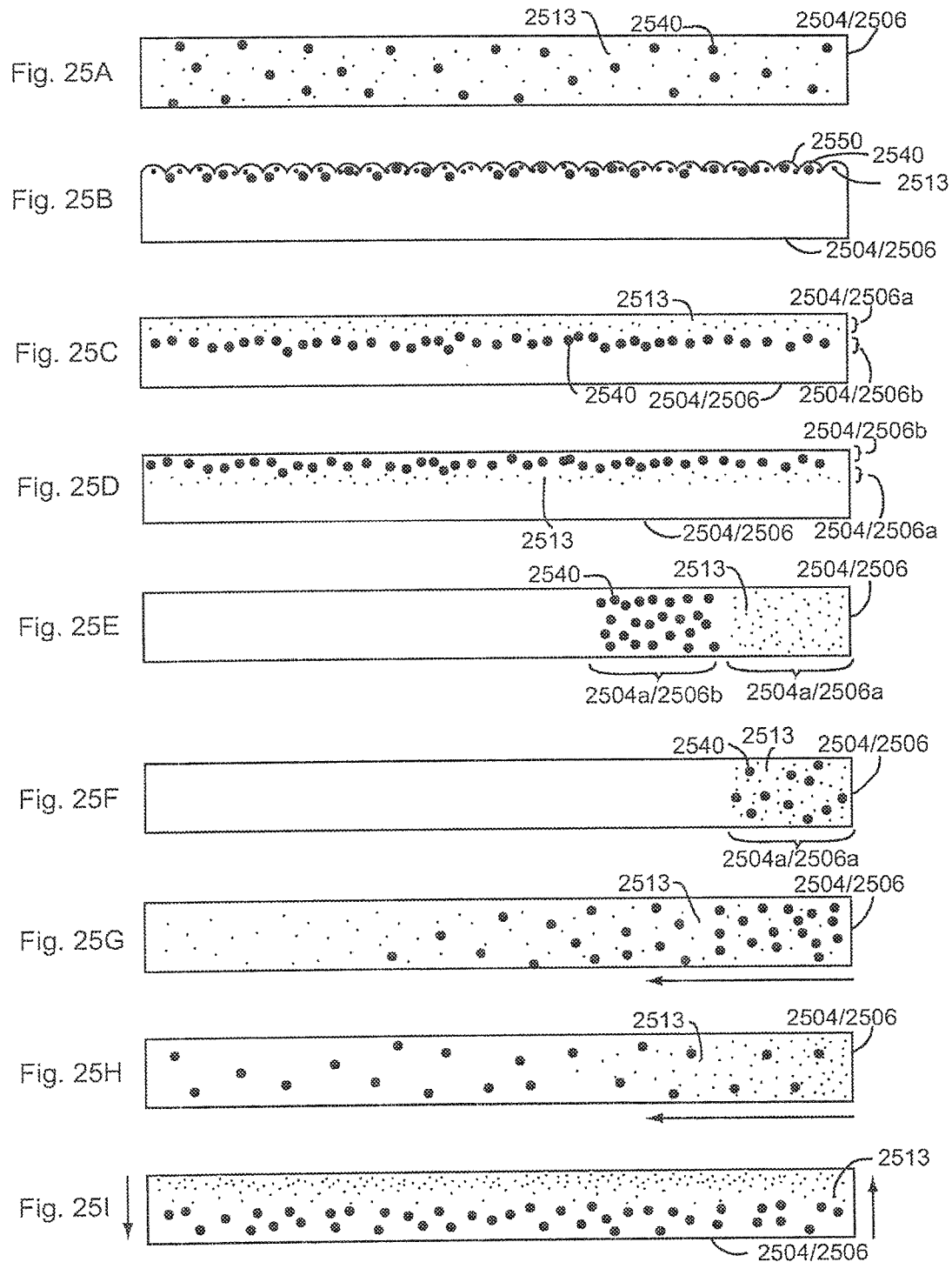

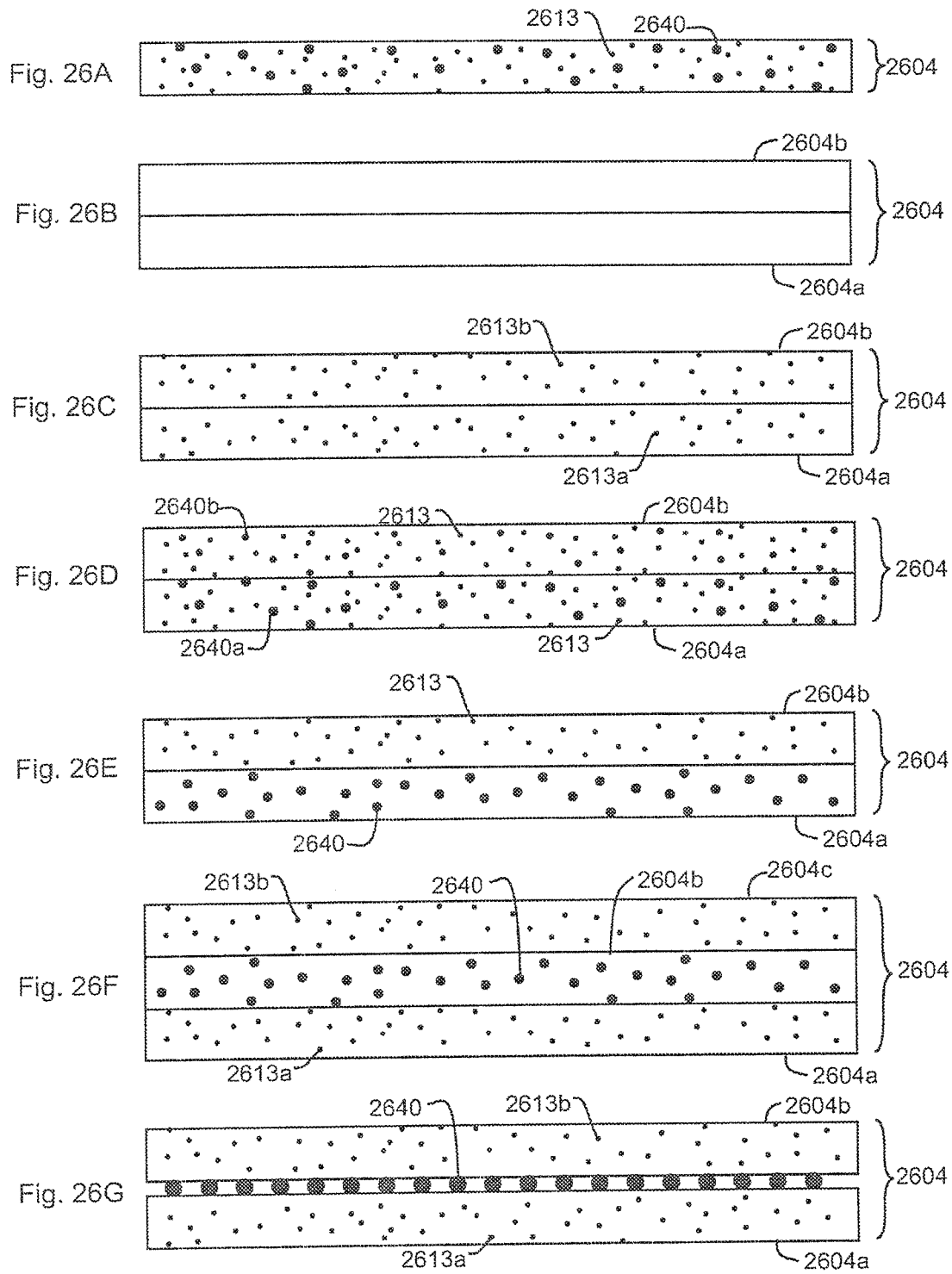

QUANTUM DOT FILMS, LIGHTING DEVICES, AND LIGHTING METHODS

CROSS-REFERENCE TO RELATED APPLICATIONS

This application is a continuation of U.S. patent application Ser. No. 15/018,512, filed Feb. 8, 2016, which is a continuation of U.S. patent application Ser. No. 14/612,935, filed Feb. 3, 2015, now pending, which is a divisional of U.S. patent application Ser. No. 13/287,616, filed Nov. 2, 2011, now U.S. Pat. No. 9,199,842, which claims the benefit of U.S. Provisional Application No. 61/412,004, filed Nov. 10, 2010, now expired, and is a continuation-in-part of U.S. patent application Ser. No. 12/318,516, filed Dec. 30, 2008, now U.S. Pat. No. 8,343,575, all of which are incorporated herein by reference in their entirety.

BACKGROUND OF THE INVENTION

1. Field of the Invention

The present invention relates to quantum dot (QD) phosphor films, QD lighting devices, and related methods.

2. Background of the Invention

Conventional lighting devices have limited light color characteristics and poor lighting efficiency. There exists a need for cost-effective lighting methods and devices exhibiting high color purity, high efficiency, and improved light color characteristics.

BRIEF SUMMARY OF THE INVENTION

The present invention is directed to highly efficient, color pure, and color tunable quantum dot (QD) lighting methods and devices. The present invention is further related to quantum dot films (QD films) and related lighting methods and devices. The lighting devices include lighting displays for electronic devices. In certain embodiments, the invention is directed to backlighting units (BLUs) for display devices such as liquid crystal displays (LCDs), televisions, computers, mobile phones, smart phones, personal digital assistants (PDAs), gaming devices, electronic reading devices, digital cameras, and the like. The QD films of the present invention can be used in any suitable application, including BLUs, down lighting, indoor or outdoor lighting, stage lighting, decorative lighting, accent lighting, museum lighting, highly-specific wavelength lighting for horticultural, biological, and other applications; as well as additional lighting applications which will be apparent to those of ordinary skill in the art upon investigating the invention described herein.

The present invention also includes a quantum dot down-conversion layer or film suitable for use in photovoltaic applications. The QD film of the present invention can convert portions of sunlight to lower-energy light which can be absorbed by an active layer of a solar cell, wherein the converted wavelengths of light could not have been absorbed and converted to electricity by the active layer without such down-conversion by the quantum dot film. Thus, a solar cell employing the QD film of the present invention can have increased solar conversion efficiency.

The present invention includes a QD film for use as a light source, a light filter, and/or a primary light down-converter. In certain embodiments, the QD film is a primary light source, wherein the QD film is an electroluminescent film comprising electroluminescent QDs which emit photons upon electrical stimulation. In certain embodiments, the QD film is a light filter, wherein the QDs absorb light having a certain wavelength or wavelength range. The QD film filter can allow passage of certain wavelengths or wavelength ranges while absorbing or filtering others. In certain embodiments, the QD film is a down-converter, whereby at least a portion of primary light from a primary light source is absorbed by QDs in the QD film and re-emitted as secondary light having a lower energy or longer wavelength than the primary light. In preferred embodiments, the QD film is both a filter and a primary light down-converter, whereby a first portion of the primary light is allowed to pass through the QD film without being absorbed by the QDs in the QD film, and at least a second portion of the primary light is absorbed by the QDs and down-converted to secondary light having a lower energy or longer wavelength than the primary light.

In one embodiment, the present invention provides quantum dot (QD) film backlighting units (BLUs). The QD BLU suitably comprises a blue light-emitting diode (LED) and a QD film, the QD film suitably comprising a film or layer of a QD phosphor material disposed between barrier layers on each of the top and bottom sides of the QD phosphor material layer. Suitably, the LED is coupled to a light guide panel (LGP), and the QD film is disposed between the LGP and the optical films of a liquid crystal display (LCD) panel. Disposing the QD film between the LGP and the optical films of the LCD allows for efficient recycling of blue light and an increased optical path length of blue light with respect to the QD, thereby allowing for drastic decreases in the QD concentration required to achieve sufficient brightness in the QD lighting device.

Suitable barrier layers include plastic or glass plates. Suitably, the luminescent QDs emit green light and red light upon down-conversion of blue primary light from the blue LED to secondary light emitted by the QDs. In preferred embodiments, the BLU is a white light emitting BLU. Preferred embodiments include a first population of QDs which emit red secondary light and a second population of quantum dots which emit green secondary light, most preferably wherein the red and green light-emitting QD populations are excited by blue primary light to provide white light. Suitable embodiments further comprise a third population of quantum dots which emit blue secondary light upon excitation. The respective portions of red, green, and blue light can be controlled to achieve a desired white point for the white light emitted by the device. Exemplary QDs for use in the BLU devices comprise CdSe or ZnS. Suitable QDs include core/shell luminescent nanocrystals comprising CdSe/ZnS, InP/ZnS, PbSe/PbS, CdSe/CdS, CdTe/CdS or CdTe/ZnS. In exemplary embodiments, the luminescent nanocrystals include an outer ligand coating and are dispersed in a polymeric matrix. The present invention also provides display systems comprising the QD BLUs.

Suitably, the polymeric matrix surrounding the QDs is a discontinuous, composite matrix comprising at least two materials. Suitably, the first matrix material comprises amino polystyrene (APS), and the second matrix material comprises an epoxy. More suitably, the first matrix material comprises polyethyleneimine or modified polyethyleneimine (PEI), and the second matrix material comprises an epoxy. Suitable methods for preparing the QD phosphor material comprise dispersing a plurality of luminescent nanocrystals in the first polymeric material to form a mixture of the luminescent nanocrystals and the first polymeric material. The mixture is cured, and a particulate is generated from the cured mixture. Suitably, a cross-linker is added to the mixture prior to the curing. In exemplary embodiments, the particulate is generated by grinding the cured mixture. The particulate is dispersed in the second polymeric material to generate the composite matrix, and the materials are formed into a film and cured. Other suitable methods for preparing the QD phosphor material comprise dispersing a plurality of luminescent nanocrystals in the first polymeric material to form a mixture of the luminescent nanocrystals and the first polymeric material, adding the second material, forming the mixture into a film, and then curing the film.

In further embodiments, the present invention provides QD BLUs having scattering features to promote scattering of primary light from the primary light source (preferably a blue LED) and increase the optical path length of the primary light with respect to the QDs in the QD film, thereby increasing the efficiency of the QD BLU and decreasing the quantity of QDs in the system. Suitable scattering features include scattering beads in the QD film, scattering domains in the host matrix, and/or features formed on the barrier layers or the LGP.

The present invention provides novel QD phosphor materials, QD films, and related lighting methods and devices. Additionally, the QD remote phosphors of the present invention present breakthroughs in QD phosphor technology based on mechanisms for novel control of QD excitation and primary light used to excite QDs in the QD phosphor material.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 18A-18C, 19A-19D, and 20A-20D illustrate QD phosphor materials, barriers, and seals, according to certain embodiments of the present invention.

FIGS. 21A-21E and 22A-22K illustrate various light guide features in accordance with certain embodiments of the present invention.

FIGS. 23A-23H, 24A-24H, 25A-25I, and 26A-26G illustrate various spatial arrangements of QDs and scattering features, according to certain embodiments of the present invention.

Figure 27A:
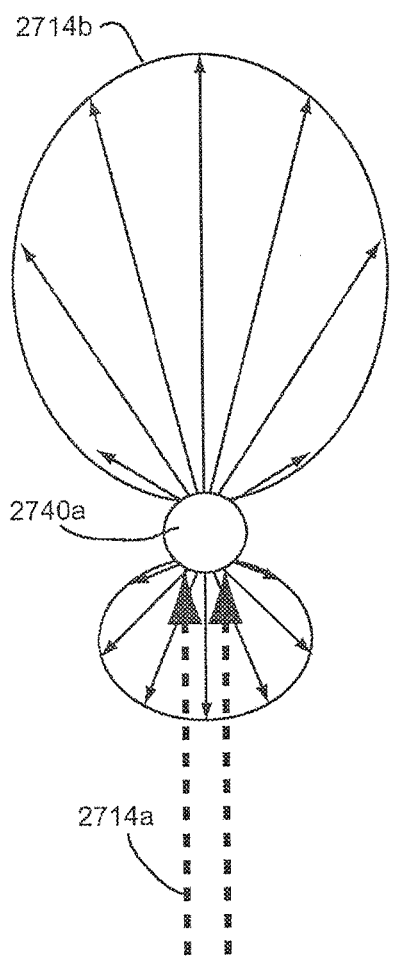
Figure 27B:
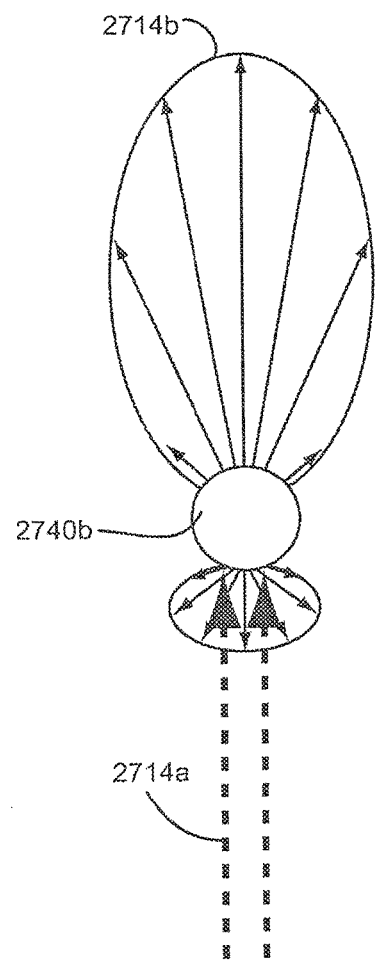
Figure 27C:
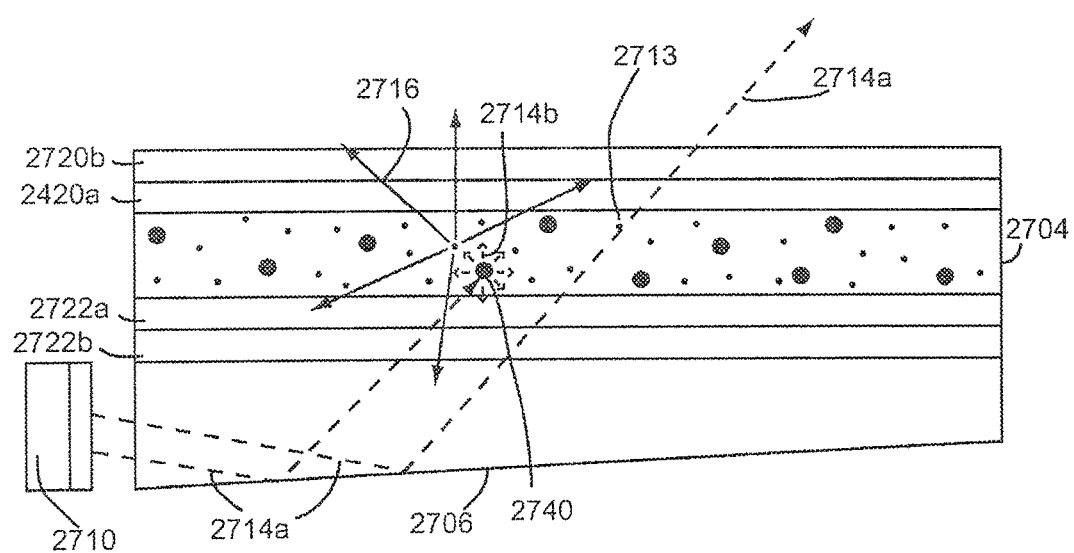
Figure 28A:
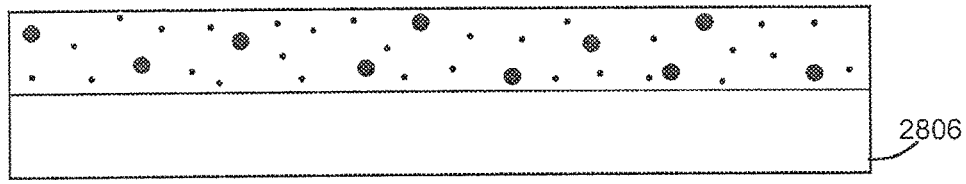
Figure 28B:
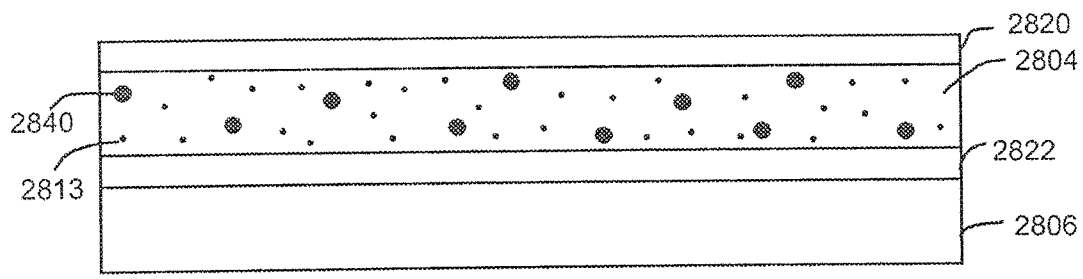
Figure 28C:
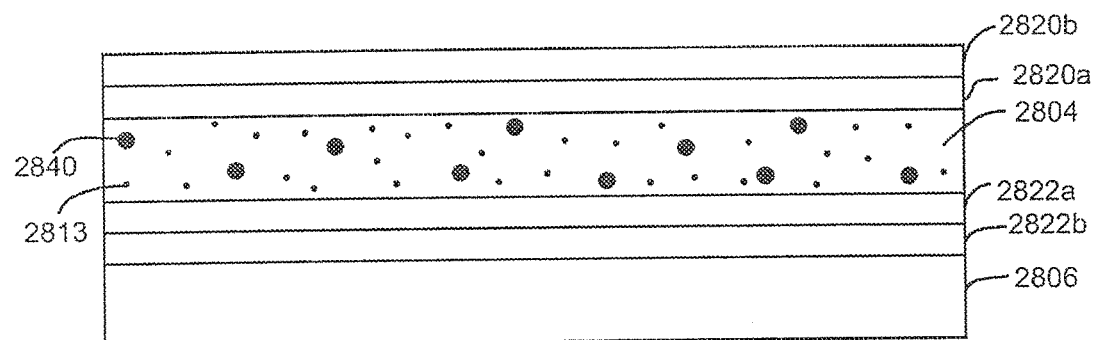
Figure 28D:
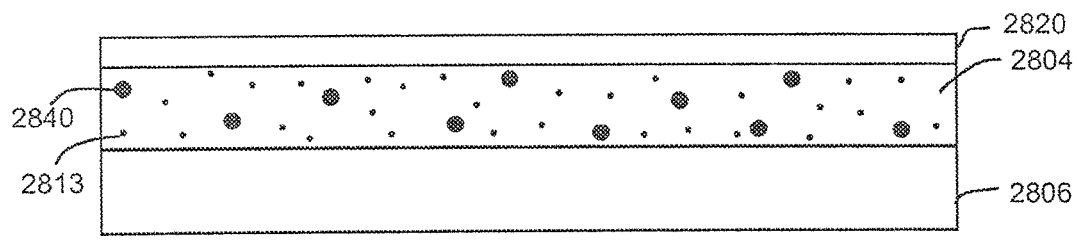
Figure 28E:
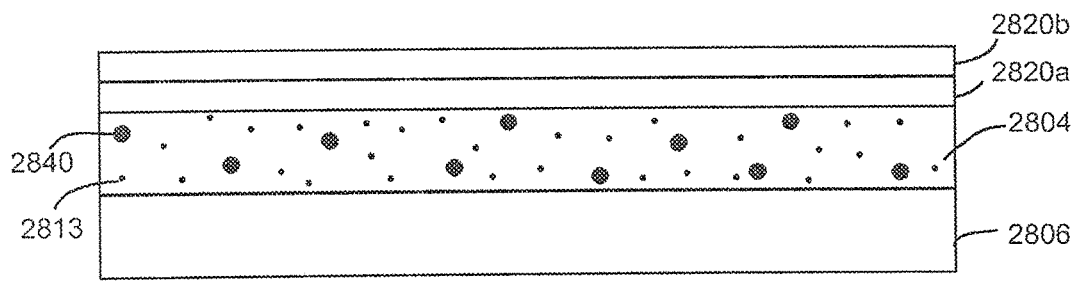
Figure 28F:
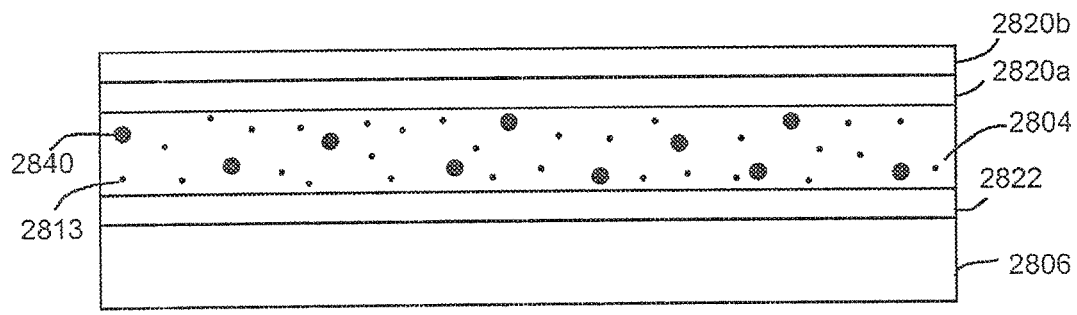

FIGS. 27A-27C illustrate scattering features and mechanisms for scattering features of the present invention.

FIGS. 28A-28F, 29A-29C, 30A-30C, and 31A-31C illustrate various LGP and barrier arrangements, and spatial arrangements of QDs and scattering features, according to certain embodiments of the present invention.

FIGS. 32 and 33A-33C show color tuning and white point generation according to certain methods and devices of the present invention.

Figure 34:
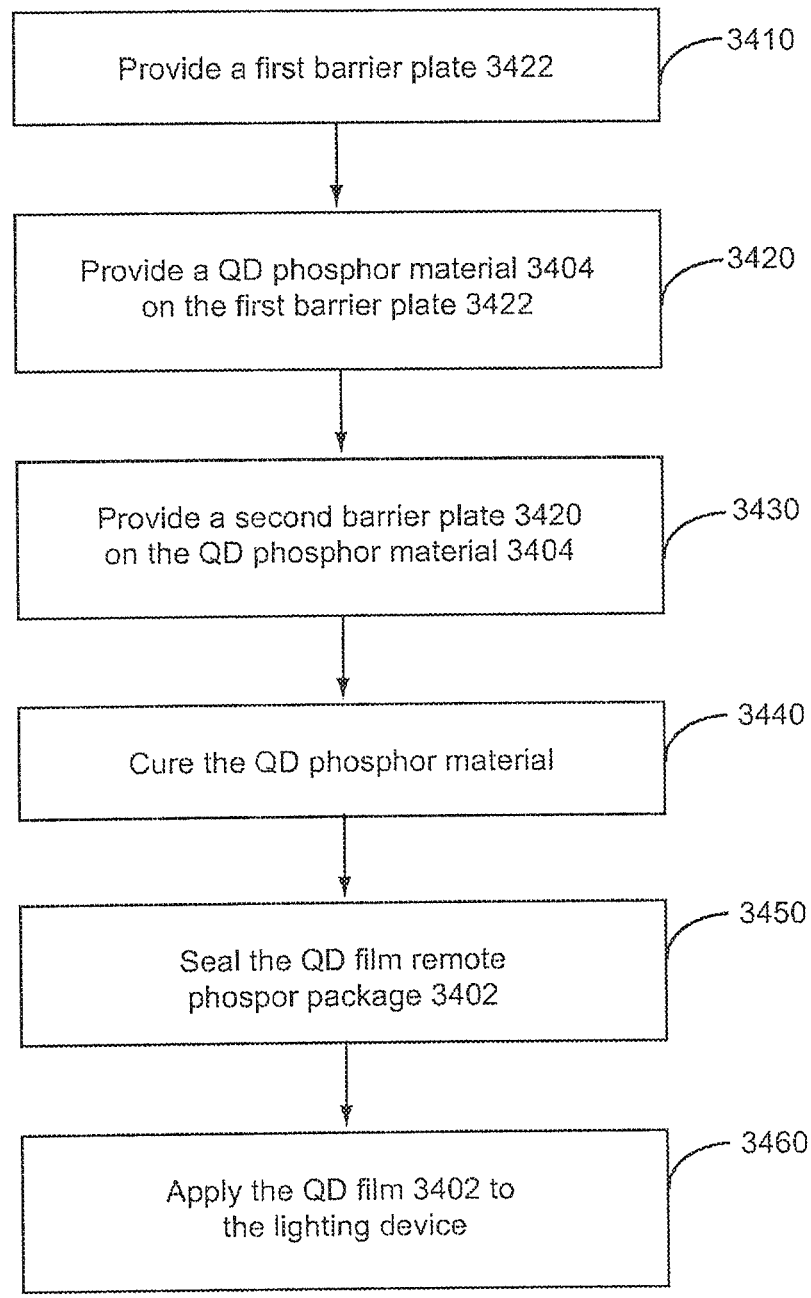
Figure 35:
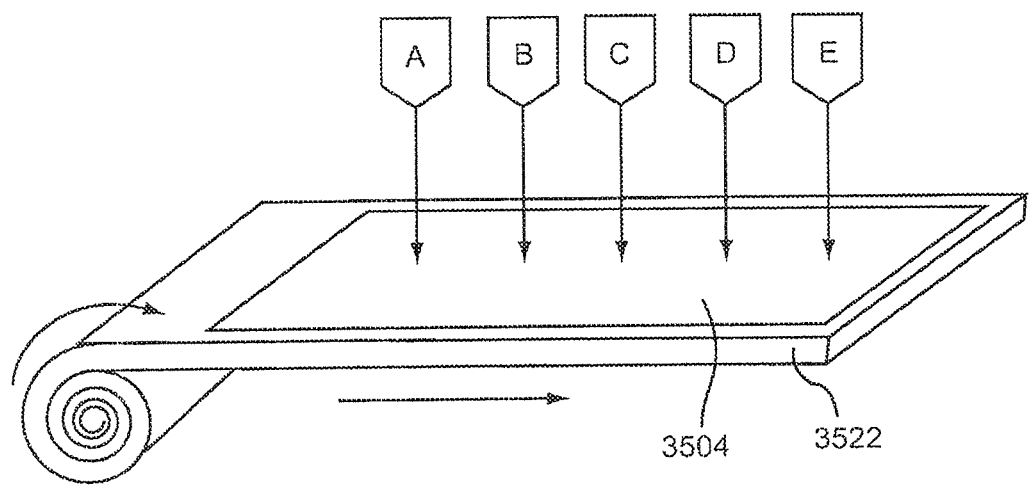

FIGS. 34-35 show QD film formation methods in accordance with the present invention.

Figure 1:
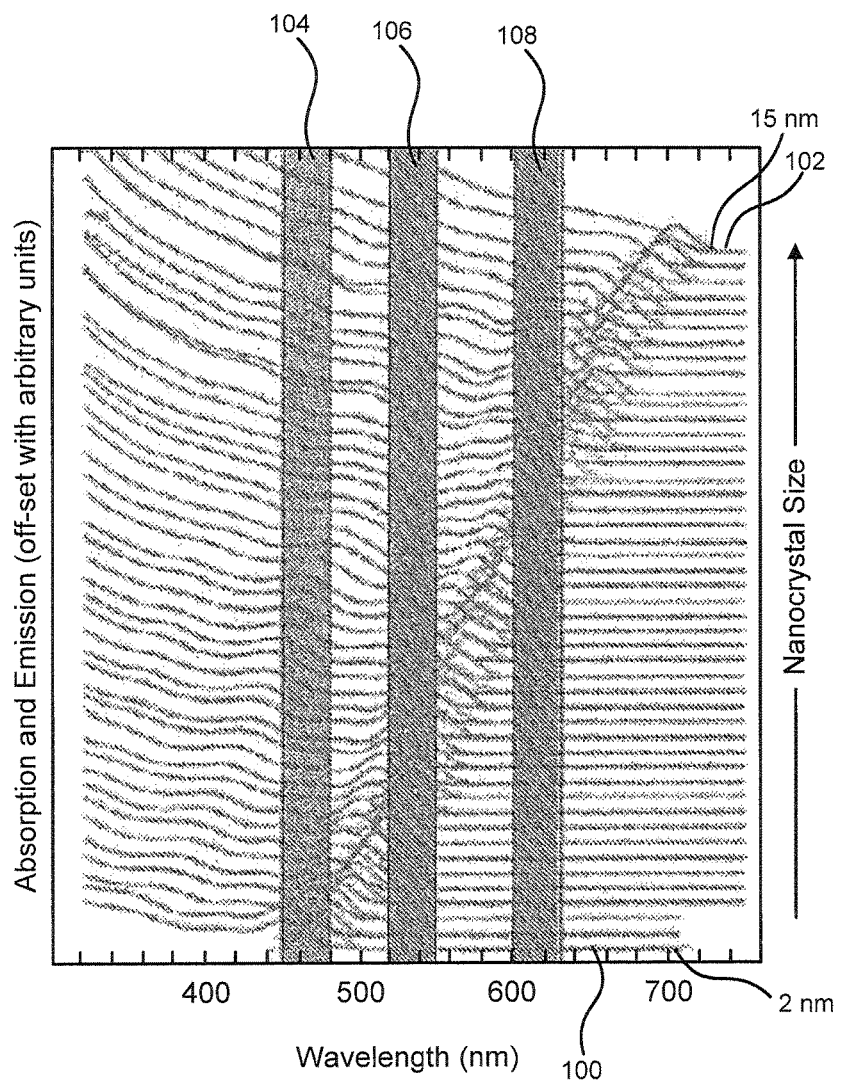
FIG. 1 shows the tunability of QD absorption and emission characteristics.
Figure 2:
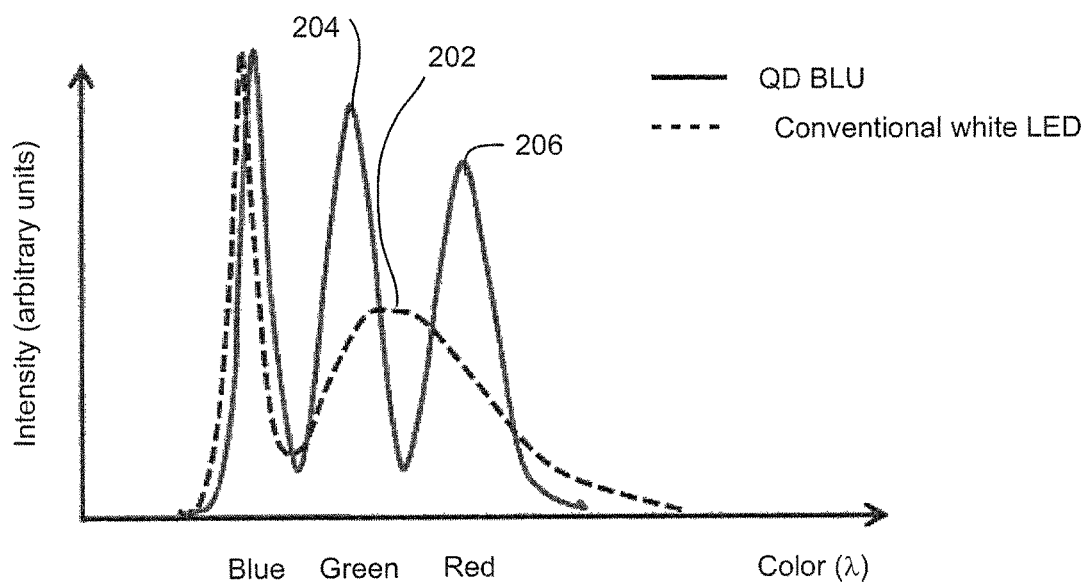
FIG. 2 shows a comparison of light color components for conventional and QD-based solid state white light (SSWL) devices.
Figure 36A:
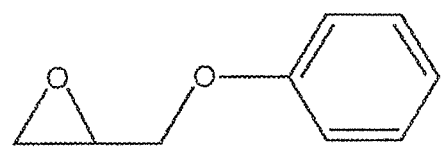
Figure 36B:
Figure 36C:

FIGS. 36A-36C show exemplary monoepoxy modifiers that can be used to produce PEI ligands. 1,2-epoxy-3-phenoxypropane is shown in FIG. 36A, 1,2-epoxydodecane in FIG. 36B, and glycidyl 4-nonylphenyl ether in FIG. 36C.

Figure 37:
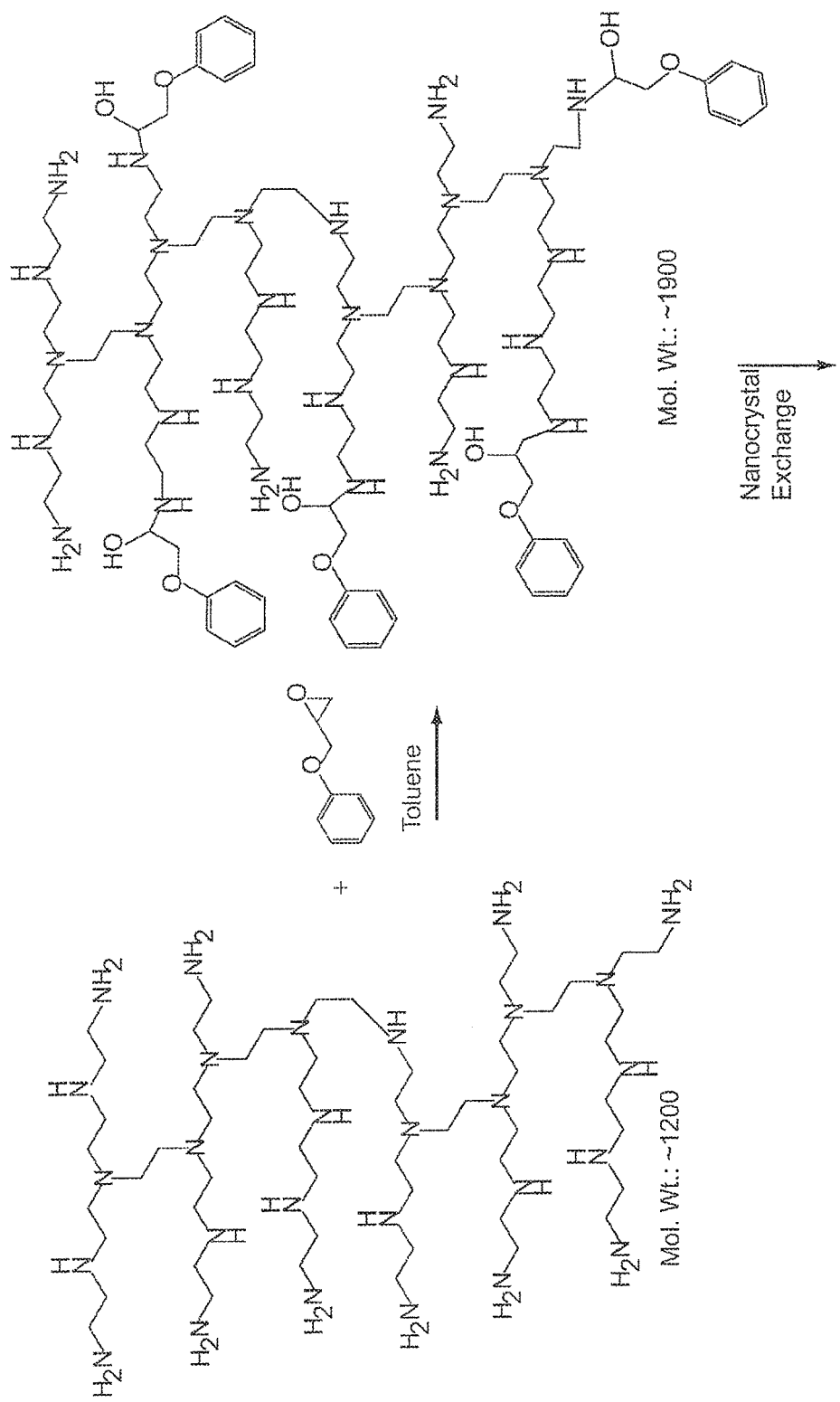

FIG. 37 illustrates a ligand formation method of the present invention.

Figure 38A:
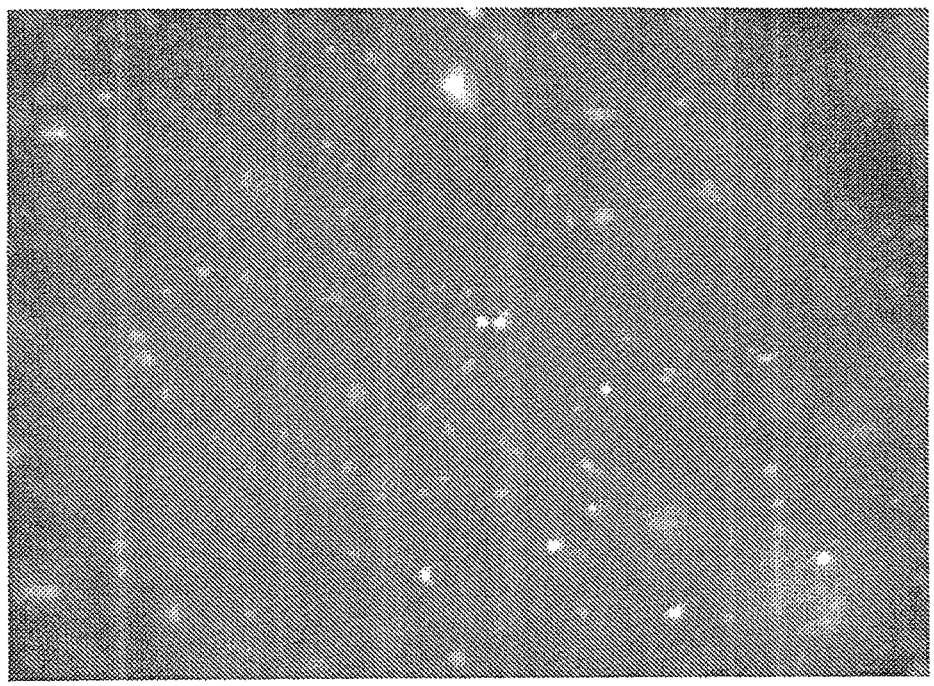
Figure 38B:
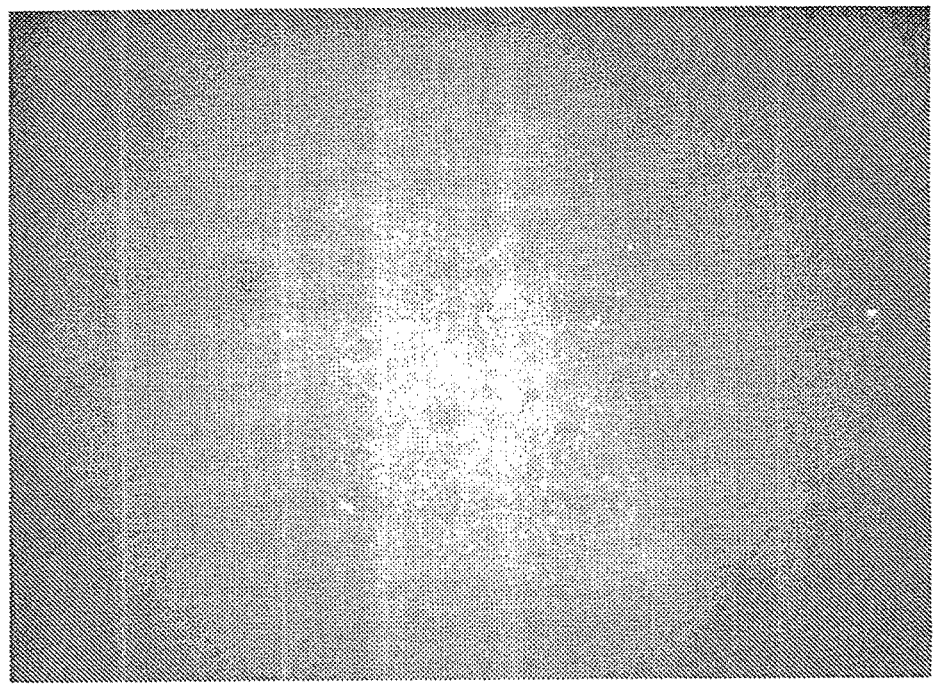

FIGS. 38A and 38B show QD phosphor materials in accordance with the present invention.

Figure 39A:
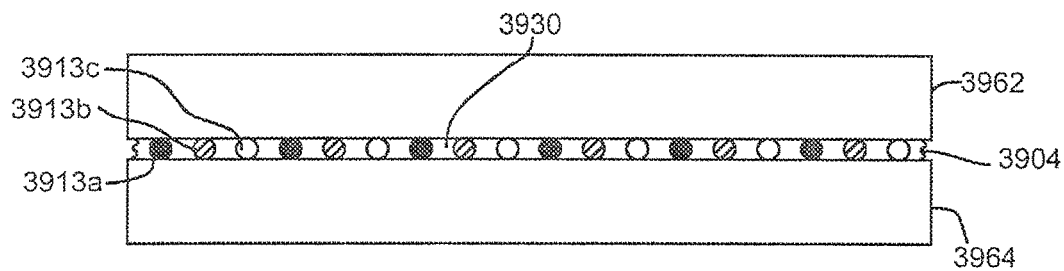
Figure 39B:
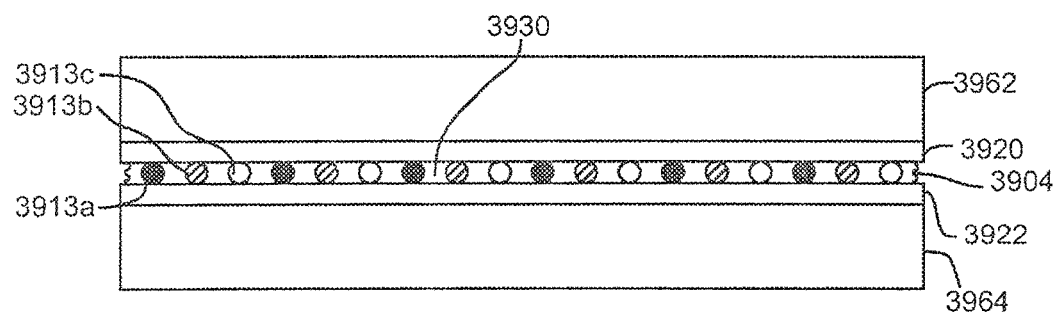
Figure 39C:
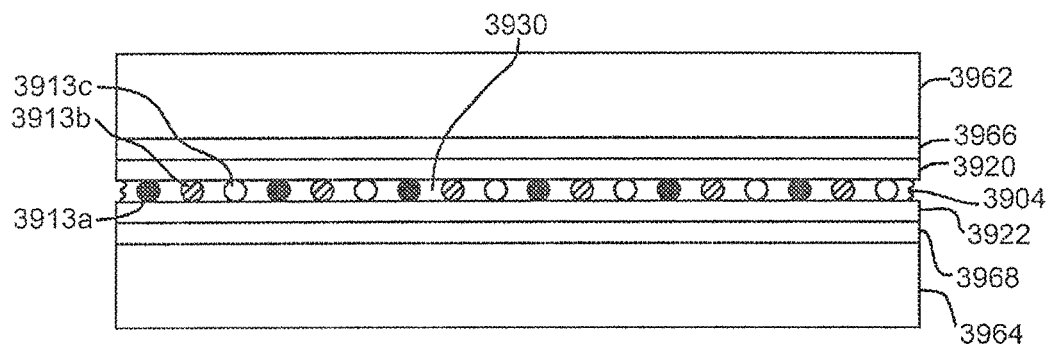

FIGS. 39A-39C show an electroluminescent backlight device including a QD film according to an embodiment of the present invention.

The present invention will now be described with reference to the accompanying drawings. In the drawings, like reference numbers indicate identical or functionally similar elements.

DETAILED DESCRIPTION OF THE INVENTION

The present invention provides QD lighting devices and QD films for use in lighting applications. It should be appreciated that the particular implementations shown and described herein are examples of the invention and are not intended to otherwise limit the scope of the present invention in any way. Indeed, for the sake of brevity, conventional electronics, manufacturing, semiconductor devices, and quantum dot, nanocrystal, nanowire, nanorod, nanotube, and nanoribbon technologies and other functional aspects of the systems (and components of the individual operating components of the systems) may not be described in detail herein.

Color Purity and Tunability

Control of light color emission plays a prominent role in many lighting applications, including down-lighting and displays. There is a great need for methods and devices which allow for precise color point control and adjustability, especially in energy-efficient, mixed-color lighting applications such as remote phosphor solid-state white lighting (SSWL). The present invention addresses this issue by providing novel mechanisms to toggle individual light color components in mixed-color lighting applications. The level of precision and control made possible by the present invention has yet to be achieved by conventional techniques. Particularly in the field of SSWL lighting, conventional lighting methods and devices lack the ability to provide highly pure white light, especially high-purity white light which is also highly tunable to exhibit different white points for different lighting applications and display devices. Conventional lighting relies on lackluster filtering technology to filter out undesirable light energy rather than addressing the source of the problem—the light sources. For example, conventional LCD BLU technology suffers from uncontrollable emission wavelengths and broad spectral widths which must be filtered out by the LCD color filters, resulting in wasted light energy, inefficiency, and high operating temperatures.

The present invention provides high color purity and tunability of light based on the novel QD phosphor materials, QD films, and corresponding lighting methods and devices. Additionally, the QD remote phosphors of the present invention present breakthroughs in QD phosphor technology based on mechanisms for novel control of primary light used to excite QDs in the QD phosphor material of the present invention. The present invention includes novel embodiments in which primary light is manipulated to control color and brightness, and increase the absorption of primary light and subsequent emission of secondary light by QDs.

In certain embodiments, the present invention provides a backlighting unit (BLU) for display applications. The BLUs of the present invention include emission-tunable quantum dots (QDs) as a phosphor material, such as size-tunable QDs. Using a primary light source to excite the QDs, the BLUs can produce light of a pure, saturated color emitted by a population of QDs having a uniform size distribution, or light of a mixture of different colors emitted by a blend of differently-sized quantum dots. With this QD size-tunability, unique spectrum engineering is achieved with a QD BLU having a precisely-defined white point. As discussed in more detail below, the white point of the QD BLU is adjusted by tuning the QD characteristics, including the size distribution of multiple QD populations which emit the light color components of the BLU.

Compared to traditional display phosphors, the QD phosphor of the QD BLU of the present invention exhibits extremely high spectral purity, color saturation, color resolution, and color gamut. As shown in FIG. 1, the QDs exhibit precise emission characteristics dependent upon QD size, which can be accurately tuned to provide consistent emission characteristics independent of excitation conditions. The emission spectrum is defined by a single Gaussian peak, which arises from the band-edge luminescence. The emission peak location is determined by the core particle size as a direct result of quantum confinement effects. For instance, by adjusting the particle diameter in the range of 2 nm and 15 nm (100 and 102), as shown in FIG. 1, the emission can be precisely tuned over the entire visible spectrum. FIG. 1 represents the absorption and emission peaks for nanocrystals of increasing size (from 2 nm to 15 nm). The initial peak (lower wavelength) indicates the absorption wavelength and the later peak (higher wavelength) the emission wavelength in nanometers. With increasing size of the nanocrystals, the absorption and emission peak wavelengths shift from about 450 nm to about 700 nm, and can be tuned over this range. The vertical shaded bars on FIG. 1 indicate visible light wavelengths in the blue 104, green 106, and red 108 ranges. Tunability of the QD size and narrow spectral width for individual color components allows for achievement of a precise white point or other mixed color using multiple different QD populations, irrespective of the primary light source wavelength.

Conventional LCD backlights exhibit limited color properties. For example, as can be seen in FIG. 2, which shows a spectrum plot of intensity versus color for a conventional inorganic phosphor backlight (blue LED+YAG phosphor), yellow light 202 from the YAG phosphor is broad-spectrum, low-intensity yellow light. The result of this non-tunable, poor-quality yellow light is wasted light energy and less than 10% of NTSC standard color accuracy. To the contrary, the emission from the green and red light-emitting QD phosphor shown in FIG. 2 (green peak 204 and red peak 206), according to one example embodiment of the present invention, exhibits high-purity, high-intensity, and fully tunable light. This results in higher energy efficiency and greater than 100% NTSC color accuracy. QD BLUs of the present invention can be tuned to achieve any target white point with precision accuracy. Not only does the narrow emission prevent photon waste at the edges of the visible spectrum by the eye, but it also allows a superior optimization of color rendering index and power conversion efficiency.

Figure 3:
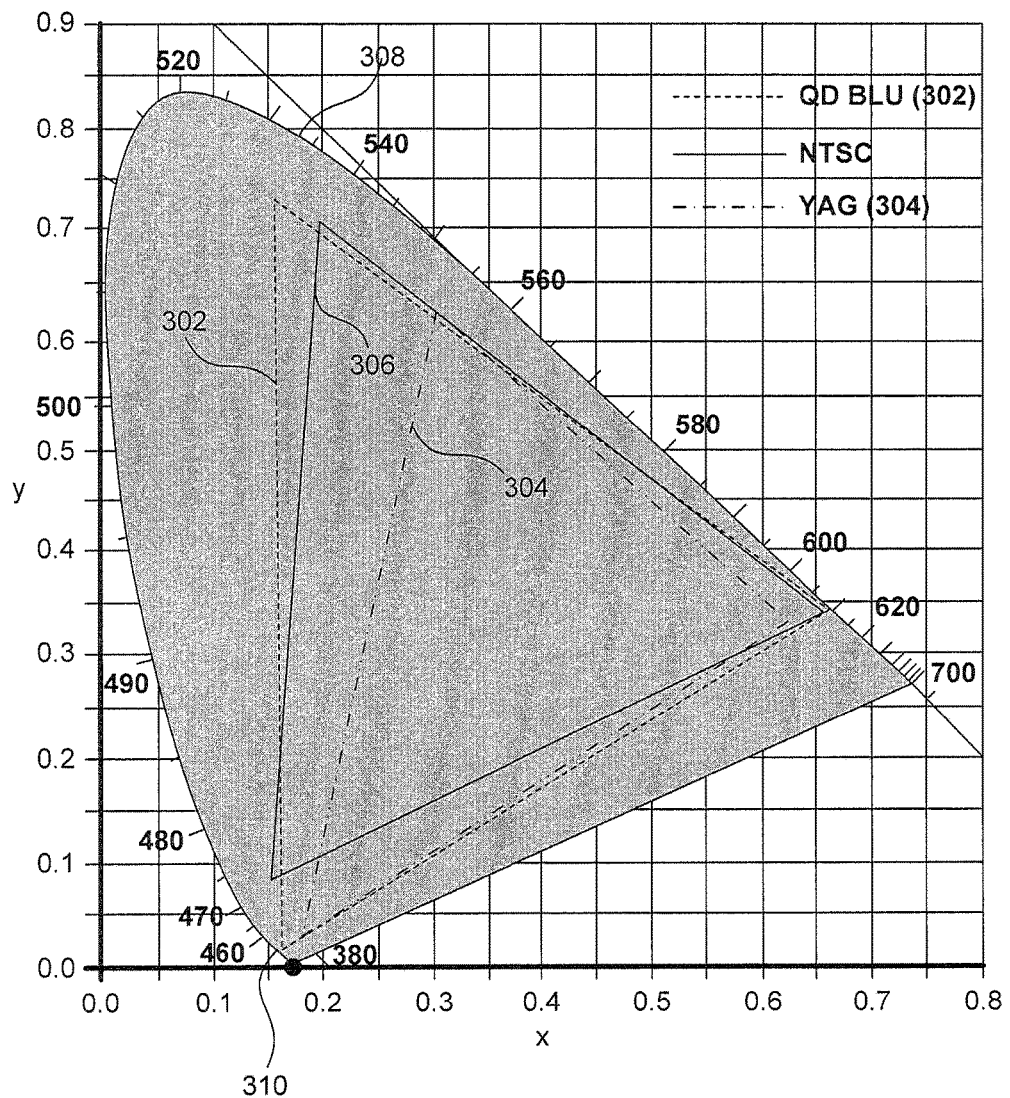
FIG. 3 shows a CIE chart and color gamuts for the QD BLU, a conventional BLU, and the NTSC standard.

As can be seen in the standard Commission Internationale de l'Eclairage (CIE) chart shown in FIG. 3, which illustrates the color gamut 302 for one example QD BLU embodiment of the present invention, the QD BLU of the present invention provides improvements in color gamut over conventional BLU phosphors such as YAG 304. The high color purity of the individual red, green, and blue (RGB) color components expands the array of potential colors, as illustrated by the larger QD BLU color gamut triangle 302. Notably, the purity of the individual red 306, green 308, and blue 310 light components allows for a more pure tri-color white light.

Color filtering has been a problematic issue in LCD technology since its development. Wide spectral emission of conventional BLU phosphors requires extensive color filtering to eliminate undesirable emission and provide pure color components of red, green, and blue light. Conventional LCD color filters rely heavily on various dyes, pigments, and metal oxides to absorb undesirable wavelengths of light produced by conventional BLU phosphors. These absorptive materials suffer from short lifetime due to severe photodegradation, as well as lifetime variance between different color filters for different respective colors, which causes different display color components to change at different rates over time. Such deterioration of absorptive materials adversely affects emission color, purity of individual color components, white point of the display, brightness, and display lifetime. Extensive resources have been dedicated to research and development of color filters for LCDs, but it remains difficult to find or produce affordable, high-quality color filters having suitable absorptivity and transmissivity for conventional LCD BLUs.

The QD BLU of the present invention provides a long-needed solution to color filtering problems in LCD color filter technology. Unlike conventional LCD BLUs, the QD BLUs of the present invention are highly adaptable to existing LCD color filters, and can be accurately tuned for compatibility with a wide variety of different LCD color filters of different display devices. With the QD BLU of the present invention, existing LCD color filters can be chosen based on availability, quality, cost, layer thickness, etc., rather than tailored to be compatible with conventional BLU emission characteristics. Individual light color components of the QD BLU phosphor can be precisely tailored to emit at very specific wavelengths of light and very narrow spectral widths compatible with the chosen color filters. With such narrow spectral widths and emission tunability, an additional benefit of the present invention is improved lifetime of display color filters. The narrow spectral emission of the QD phosphor requires less absorption by the absorptive color filter materials, resulting in less deterioration and increased lifetime of the color filters.

As can be seen in FIG. 1, the emission spectrum of the QD phosphor material of the present invention is tunable to fit a variety of color filters for different lighting devices. With less light filtered from individual light color components, less light energy is absorbed by the filter material compared to traditional BLU sources such as YAG.

Brightness and Efficiency

Energy efficiency is a critical feature in the field of consumer electronics, and displays consume a large portion of device power. Display power consumption highly affects many features of electronic display devices, including battery requirements in mobile display applications, as well as device operating temperature and panel lifetime, especially in large display applications. In conventional display devices, a majority of the energy consumed by the device is dedicated to the display, particularly the display BLU. The QD BLUs of the present invention exhibit breakthrough efficiency improvements in display BLUs.

The QD BLU of the present invention provides improved efficiency over conventional BLUs due to the efficient use of primary light, resulting in a reduction in wasted light energy. Conventional BLU phosphors exhibit broad emission spectra, so a large amount of the light produced is filtered out by color filters (e.g., LCD color filters) to produce sharper color components (e.g., RGB). This broad spectrum filtering results in wasted light energy, decreased brightness, and higher display operating temperatures. With the QD BLU of the present invention and the narrow bandwidth emission of the size-tuned quantum dots, minimal light produced by the phosphor material is wasted via color filtering. Drastically reduced light filtering is required with the QD phosphors of the present invention, as compared with a conventional phosphor material. As explained above with respect to FIG. 2, the narrow emission spectrum of the QD phosphor material results in more light being emitted through the color filter rather than filtered out, and thus increased brightness and efficiency. The increased color purity and lighting efficiency of the QD BLU of the present invention presents an energy-efficient increase in the overall display brightness.

Some development in quantum dot phosphors has been made, for example, as disclosed in U.S. Pat. Nos. 7,374,807, 7,645,397, 6,501,091, 6,803,719, U.S. patent application Ser. No. 12/799,813, filed Apr. 29, 2010, U.S. patent application Ser. No. 12/076,530, filed Mar. 19, 2008, U.S. patent application Ser. No. 12/609,736, filed Oct. 30, 2009, and U.S. patent application Ser. No. 12/609,760, filed Oct. 30, 2009, the disclosure of each of which is incorporated herein by reference in its entirety. For example, the Quantum Rail™ (QR) available from Nanosys™, shown in FIGS. 4A-4D, includes a QD-based remote phosphor package 400 which provides color quality improvements over conventional BLUs. As explained in further detail below, the novel QD BLUs of the present invention present advantages over conventional BLUs as well as QR phosphor packages.

Figures 4A, 4B:
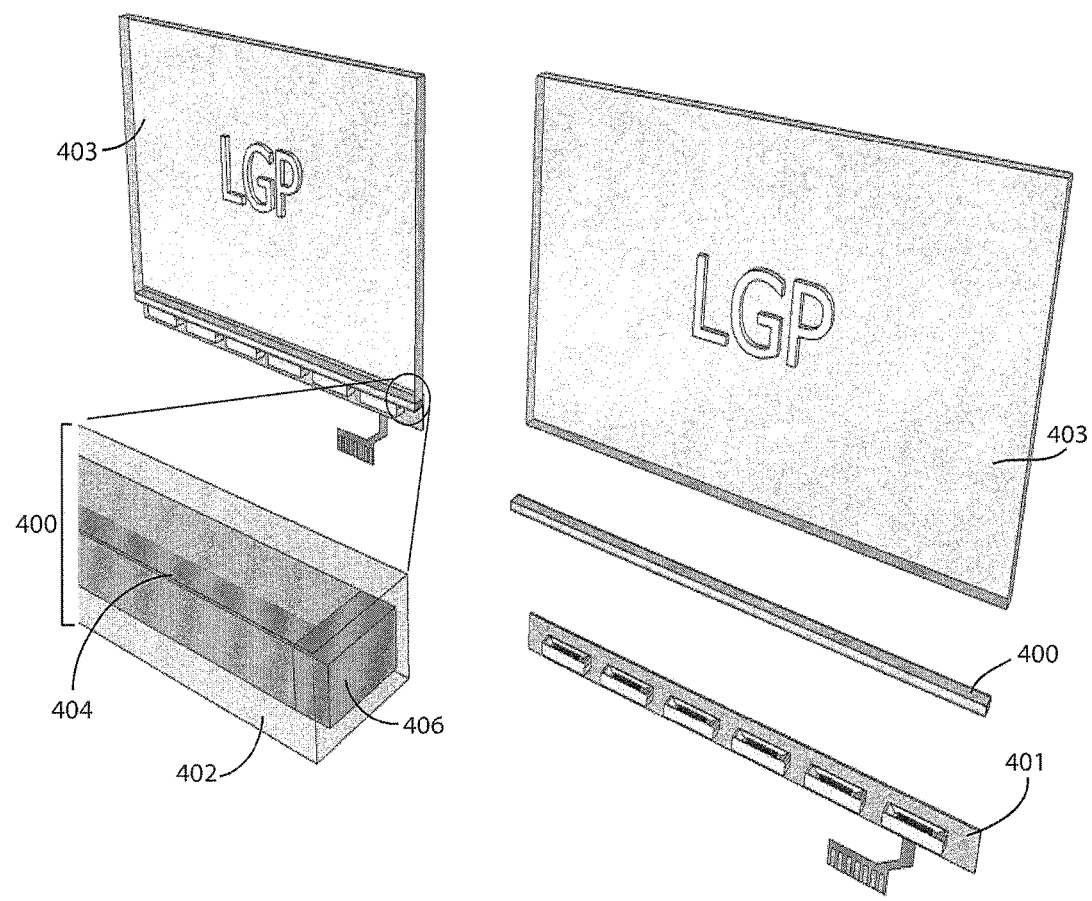
FIGS. 4A-4D show a prior art Quantum Rail™ remote phosphor package.
Figure 4C:
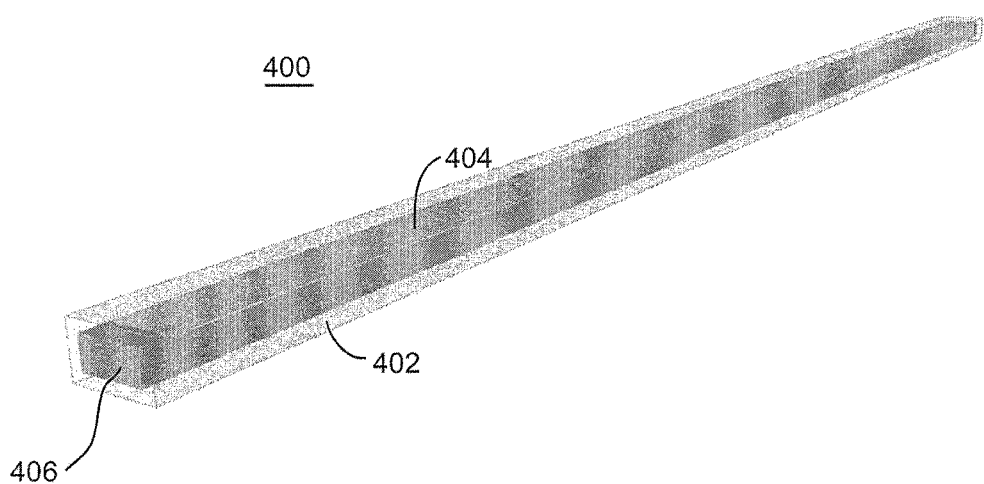
Figure 4D:
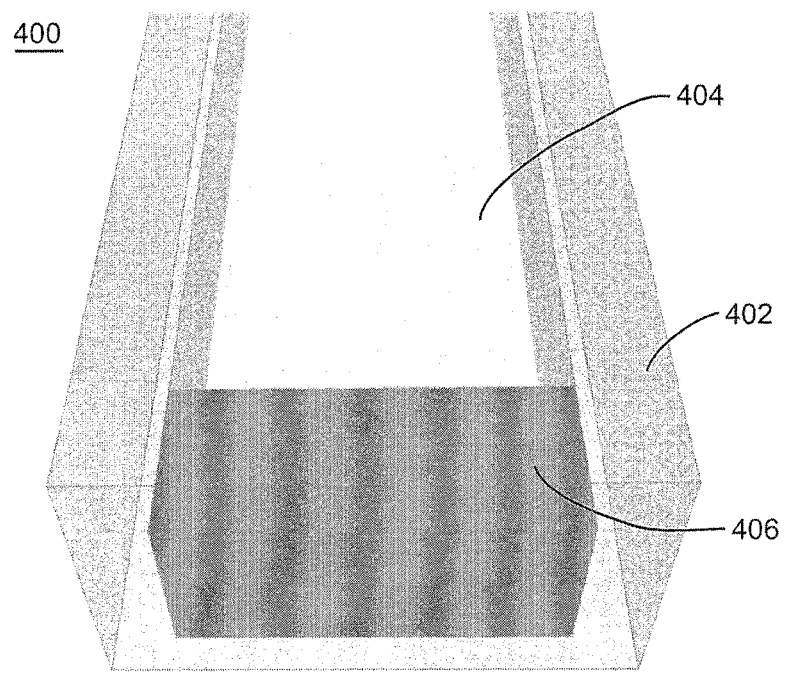

In conventional BLUs encompassing blue LEDs, such as YAG-coated blue LED BLUs, conventional phosphors are used to convert a portion of the blue light to red and green to cover the entire visible spectrum, and the phosphors are commonly placed in direct contact with the LEDs. In the Nanosys™ Quantum Rail™ (QR) BLU referenced above, luminescent QDs are mixed into a polymer to form the active material 404, and the active material is sealed 406 in a glass capillary tube 402 to form the QR 400. As shown in FIG. 4A, the QR package is disposed adjacent the LEDs 401, between the LEDs 401 and the light guide panel (LGP) 403 of the BLU. Due to the organic constituents surrounding the quantum dots which deteriorate under high operating temperatures and high light flux, the QDs have limited lifetimes when exposed to the heat and light flux found in close proximity to LEDs, thereby limiting the QR BLU lifetime. Additional issues with the QRs include lack of control and accuracy in positioning the QRs adjacent the LEDs, reliability and optical issues associated with adhering or gluing the QRs in place, and susceptibility to mechanical damage.

Figure 5:
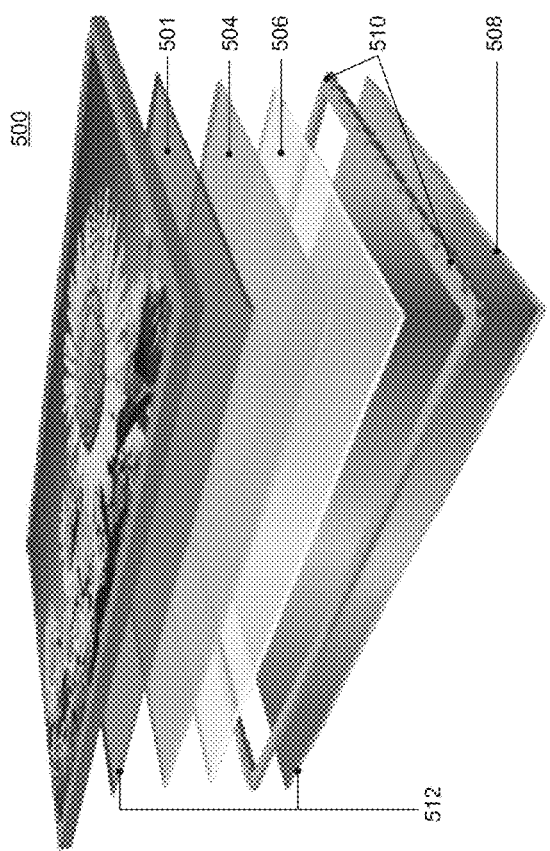
FIG. 5 shows a conventional liquid crystal display (LCD) stack.

FIG. 5 shows a conventional LED backlit LCD display 500, which shows components of the BLU 512, including the brightness enhancing films (BEFs) 501, diffuser layer 504, LGP 506, LED housing 510, and reflector 508.

Figure 6A:
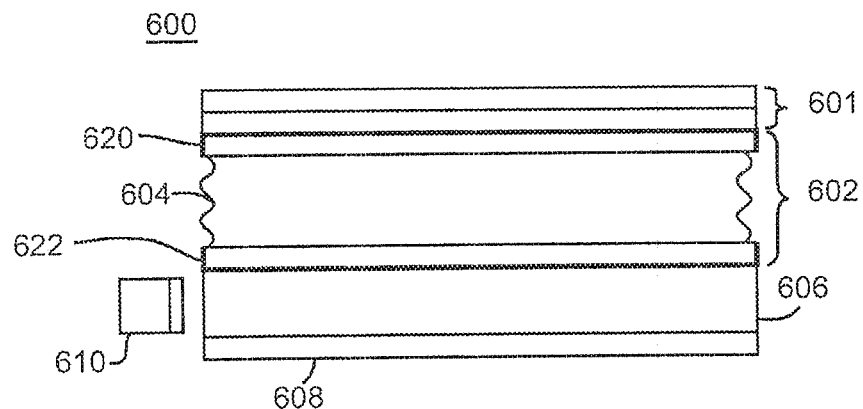
FIGS. 6A-6C show a QD film BLU and light recycling mechanisms according to one embodiment of the present invention.
Figure 6B:
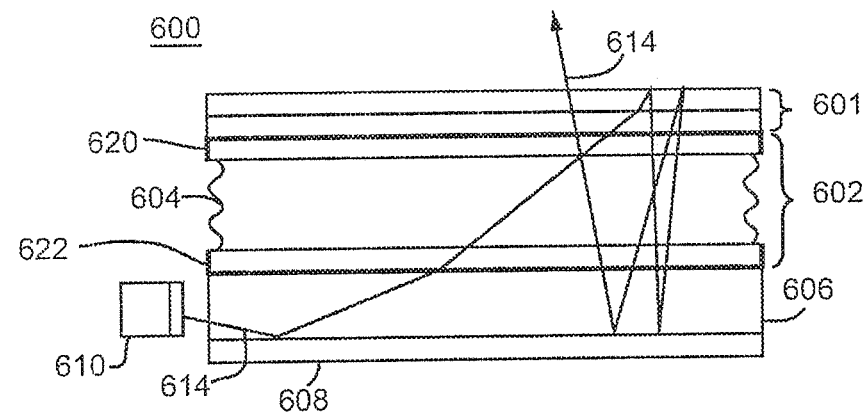

According to one exemplary embodiment of the present invention, as shown in FIGS. 6A and 6B, a lighting device 600 (e.g., a display BLU) comprises a QD film remote phosphor package 602 which includes a film comprising QD phosphor material 604 sandwiched or disposed between two barrier layers 620, 622. The QD film is disposed above a light guide panel (LGP), and at least one primary light source 610 is located adjacent the LGP, whereby the primary light source is in optical communication with the QD phosphor material. When primary light 614 is emitted by the primary light source, the primary light travels through the LGP and toward the QD film. The QD film and the primary light source are disposed such that the primary light travels through the QD phosphor material of the remote phosphor package and excites the QDs in the QD phosphor material, thereby causing secondary light emission from the QD film. Light emitted from the remote phosphor package and the lighting device can include secondary light emitted by the phosphor material, primary light which passes completely through the QD film, or preferably a combination thereof. In the exemplary embodiment shown in FIGS. 6A and 6B, the QD film BLU 600 further comprises a bottom reflective film or layer 608, one or more light extraction layers (not shown in FIG. 6) near the top and/or bottom of the LGP, and one or more brightness-enhancing films 601 disposed over the QD film, such that the QD film is sandwiched or disposed between the BEFs (e.g., reflective polarizer films or prism films) and the LGP having a reflective film and one or more light extraction layers.

Figure 6C:
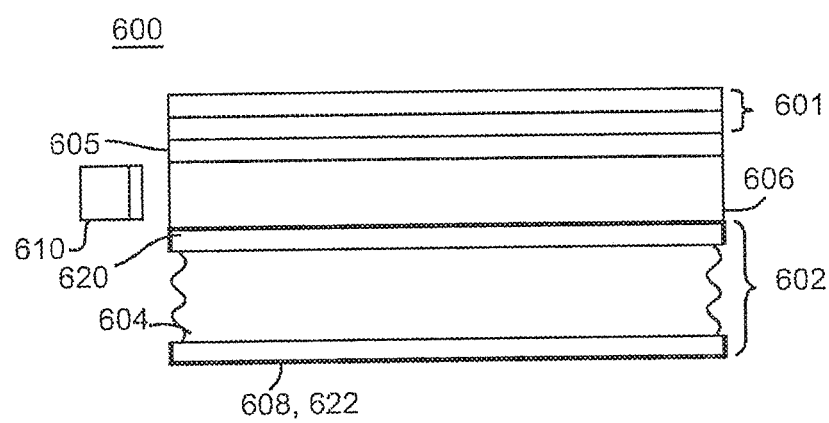

As shown in the example embodiment of FIG. 6A-6C, the lighting methods and devices of the present invention are aimed at positioning the quantum dot down conversion layer in a more favorable position, preferably in the form of a QD film layer 602 comprising a QD phosphor layer 604 disposed between the reflective film 608 and the BEFs 601 of a LCD BLU—e.g., between the reflective film 608 and the LGP 606, or between the LGP 606 and the BEFs 601 of a LCD BLU. Suitably, the QD film 602 comprises a top barrier 620 and a bottom barrier 622, wherein these barriers house and protect the QD phosphor material 604 from external environmental conditions. With the QD film disposed at such location adjacent to the LGP, rather than near the LEDs 610, the light flux and temperature at the QD phosphor material will be considerably lower, resulting in longer lifetimes for the QD phosphor material and the QD BLU. Additionally, film assembly installation is simplified and mechanical damage issues are resolved. Many additional advantages are achieved with the QD film embodiments of the present invention, as discussed in more detail below.

QD Phosphor Quantity Reduction

Much to the surprise of the inventors, the disposition of the QD film between certain layers of a LCD results in phenomenal and highly unexpected improvements in brightness of secondary light emitted by the QDs, allowing for a very high reduction in optical density (i.e., reduction in the quantity of QDs). With less QDs required to achieve a desired level of brightness and white point, the optical density of the QD phosphor material (or QD concentration) can be decreased drastically (e.g., as much as 15× or 25× reduction) compared to QR lighting devices, thus larger display surface areas can be achieved using less QDs, and cost is drastically reduced in proportion to the QD quantity reduction. By disposing the QDs between the BEFs 601 and the LGP 606 of a display, the effective path length of the primary light is greatly increased with respect to the QD phosphor material. As shown in FIG. 6B, primary light 614 is essentially recycled by BEFs 601 and reflective film 608 at the bottom of the LGP, as well as reflection and scattering caused by additional features such as the diffusion features or layers and differences in refractive indices of the display layers and the QD film. This recycling causes the primary light 614 to pass through the QD film 602 repeatedly at a variety of angles before a portion of the primary light eventually escapes the BLU. The path length of the primary light 614 in the QD phosphor material is increased due to the high-angle rays transmitted through the QD phosphor material, resulting in more QD absorption (and reemission) in the QD film.

The path length of the primary light and QD absorption can be further increased by manipulation of primary light according to systems and methods of the present invention. In certain embodiments, this manipulation and increased absorption of primary light is achieved with the addition of scattering features such as scattering beads or particles associated with the QD film, as shown in FIGS. 27A and 27B. Since QD phosphors are isotropic emitters by nature, they emit light in all directions from the QD surface. Unlike QDs, excitation light sources such as LEDs emit light more unidirectionally since they are Lambertian emitters, meaning the intensity of light emitted from the LED is highest at the normal to the emission surface and decreases at increasing angles away from the normal. The combination of Lambertian primary light emitters and isotropic secondary emitters can cause many problems, including unidirectional primary light and low QD absorbance, low efficiency, high QD quantity requirements, and non-uniform color and brightness distribution—both across the display surface area and from various viewing-angles. Methods and devices of the present invention improve color uniformity and brightness uniformity, increase efficiency, and reduce QD quantity requirements. With the uniform emission direction of primary and secondary light and the increased QD absorbance of primary light made possible by the present invention, the overall light emitted from the QD BLU has more predictable characteristics, thereby allowing for improved control over color and other emission characteristics of the QD BLU.

This highly efficient use of primary light allows for a reduction in both the quantity of QDs and the amount of primary light required to create a desired emission brightness and white point. By manipulating the primary light according to the methods and devices of present invention, precise control of the primary and secondary light components emitted by the device can be achieved. Unlike traditional methods for increased remote phosphor emission, this improved control of light components can be achieved without increasing the amount of primary light required, and without increasing the amount of QD phosphor material. Surprisingly, and most notably, this effect can be achieved even with a significant decrease in the QD quantity. The novel embodiments of the present invention allow for an unexpected reduction in quantum dots (e.g., 10-25× reduction)—required to produce a desired brightness and white point for a QD film layer according to the present invention.

QDs offer many benefits as phosphors for BLUs. However, due to the high cost of display-quality QD phosphor production, applications of QD phosphors are usually limited to low phosphor quantity applications such as molecular labeling. The QD BLUs of the present invention provide QD phosphor BLU embodiments having a low quantity of QDs in the QD phosphor. Minimizing the quantity of QDs required in a QD BLU system is desirable for many reasons. In addition to the high cost of QD mass production, QD phosphors are highly sensitive to environmental conditions. QD quantity reduction simplifies integration of QDs with other materials, and reduces the amount of non-QD materials required in a QD BLU system. For example, less QDs will reduce the quantity of necessary matrix materials, barrier materials, and primary light, thereby making the QD BLU system smaller, thinner, lighter, and more efficient. This reduction in materials greatly reduces the production cost of QD BLUs, making QD BLUs cost-competitive with conventional display BLUs. The reduction in QDs also allows for QD BLUs for larger displays and creates the possibility of using QD phosphor materials over an increased surface area, such as in QD film BLUs according to certain embodiments of the present invention, as described in more detail below. Notably, unlike conventional QD phosphors, the QD film of the present invention has a surface area which is much larger than the surface area of the primary lights.

Color and Brightness Uniformity

As an additional advantage of the present invention, the spatial configuration of the QD film provides improvements in brightness and color uniformity across the display viewing plane. Due to the increased surface area of the QD phosphor material and the location of the phosphor disposed evenly over the LGP surface area, brightness and color uniformity issues associated with the QR BLU are eliminated. Conventional display BLUs are highly engineered to provide uniform light distribution over the display viewing plane, and the QD BLU of the present invention includes a QD film advantageously integrated between the LGP and BEF to make use of the high uniformity of primary light emitted from the LGP. For example, in white light QD film BLU embodiments of the present invention, the white point can be more precisely controlled due to the uniformity, control, and predictability of both primary light and secondary light emitted by the QDs. The primary light characteristics at the primary light source are non-uniform and difficult to control. With the QD film disposed as a layer of the BLU stack, as in the present invention, the primary light characteristics at the point of interaction with the QDs is more uniform and predictable due to the uniform dispersion of primary light throughout the LGP and upon transmission out of the LGP. Additionally, the surface area of primary light emission from the LGP is much larger than the small surface area of light emission near the primary light source. Thus, the QD film BLU improves predictability, uniformity, and control of QD absorbance and emission, as well as overall light emission from the lighting device.

Dispersion of primary light in the QD phosphor material improves uniformity of directional emission between primary and secondary light, thereby allowing for more uniform emission and brightness of all colors of light emitted by the QD BLU. Additionally, diffusion in the QD phosphor material in the QD film will enable elimination of the external diffusion layer, thereby decreasing device thickness.

Temperature Reduction and Lifetime Improvement

QDs are highly sensitive to temperature. In the QR BLU referenced above, the remote phosphor package is disposed adjacent and very near the primary light source, resulting in higher operating temperatures seen by the QDs. The QD lighting devices and methods of the present invention allow for placement of the QD phosphor materials further from the primary light source, thereby greatly reducing the QD operating temperature and addressing problems stemming from the temperature sensitivity of the QD phosphor material. With the reduction in primary light required to cause secondary emission from the QDs, another benefit of the present invention includes increased efficiency and lower energy and operating temperature requirements of the QD BLU system and the overall display device. Additionally, due to the decreased density of QDs per unit area in the QD film embodiment, light flux can be reduced significantly (e.g., 100×) compared to QR BLUs. Thus, the QD film BLU of the present invention improves the QD phosphor stability, integrity, and lifetime.

Manufacturing, Lighting Device Integration, and Mechanical Integrity

Integration and alignment is improved and made easier with the QD film of the present invention, and the QD film is more compatible with existing display features including planar display layers such as LGPs, optical films, diffuser films, color filter films, polarizer films, and mask films. Integration and alignment can be difficult in QR BLU embodiments as well as conventional BLUs. For example, dimensional control of QR packaging can impair alignment of the QRs in the BLU and interfere with control and predictability of the direction in which primary light is emitted. In the QD film embodiment of the present invention, optically connecting the primary light source and the remote phosphor package is simplified and made easier due to the remote phosphor configuration and location in the BLU. Compared to QR BLUs, the QD film of the present invention improves integration for large displays and allows for larger displays comprising QD BLUs. QR BLUs can be difficult to incorporate properly into large displays due to the requirement of either more QRs or longer QRs. Tight dimensional control is difficult to achieve in QR production, especially for QRs having long lengths. Also, alignment of QRs for large display sizes is challenging from a manufacturing perspective due to the longer length required for alignment of QRs. In the QD film of the present invention, improved alignment of the primary light source and the QD phosphor presents the possibility of larger QD BLU displays. With the fully-compatible, process-ready QD film of the present invention, existing or conventional alignment techniques can be employed in aligning the primary light source with the light transmission layer, including existing tooling assemblies and techniques for LED-LGP alignment. Additionally, since the QD phosphor material can be distributed evenly over the entire viewing plane, the QD film allows for embodiments wherein the primary light source is mounted on the back side of the display, rather than or in addition to edge alignment of the primary light source.

Compared to QR BLUs and conventional display BLUs, the QD film BLU of the present invention provides many added benefits including ease of BLU manufacturing and integration into display devices. While QRs present challenging issues associated with the phosphor package production, including filling small capillaries 402 with a phosphor material 404 and sealing the small capillaries with an end seal 406, convenient roll-to-roll manufacturing is possible with the QD film BLU of the present invention. This allows for convenient large-scale roll-to-roll processing using conventional film line processing techniques, whereby QD films and packaging can be manufactured and cut to size, then further processed. Roll-to-roll processing techniques similar to those used in tape-coating can be employed. The QD phosphor material can be deposited by painting, spraying, solvent-spraying, wet-coating, and additional coating and deposition methods known to those of ordinary skill in the art. The planar layer structure of the QD film package is compatible with existing display features including planar display layers such as LGPs and LCD filters, polarizers, and glass planes. This planar structure reduces spatial alignment and coupling issues associated with QRs and conventional phosphors. Additionally, the uniformity in phosphor density over the entire display surface area provides greater predictability and control between various devices, thereby simplifying adaptation of the BLU of the present invention for different lighting applications and devices.

As an added benefit, the QD film allows for the elimination of certain layers in display BLUs, such as diffusion layers, as discussed in more detail below. This further simplifies manufacturing and allows for thinner lighting devices.

The QD film embodiment of the present invention provides for improvements in mechanical integrity of the QD remote phosphor packaging. Compared to QR remote phosphors, the QD film finds added strength with the increased surface area for light flux, stronger barrier materials, and disposition between existing planar layers of a display which act as additional mechanical protective barriers.

The QD film of the present invention provides enhanced efficiency over QR phosphor packages due to the decrease in loss of primary light made possible by the present invention. In QR BLUs, difficulties associated with alignment and optical coupling of the primary light source and the QR can cause light from the primary source to be wasted as the primary light is reflected off of the QR or otherwise escapes into the environment, or undesirably transmits into the LGP and must be filtered out by the display. Elimination of integration issues with the QD film embodiment of the present invention increases predictability and control of the primary light, thereby greatly decreasing the amount of wasted primary light and improving device efficiency.

QD Film Features and Embodiments

In certain embodiments, the present invention is related to display devices. As used herein, a display device refers to any system with a lighting display. Such devices include, but are not limited to, devices encompassing a liquid crystal display (LCD), televisions, computers, mobile phones, smart phones, personal digital assistants (PDAs), gaming devices, electronic reading devices, digital cameras, and the like.

While specific embodiments described herein refer to BLUs for display devices, the QD films of the present invention can be used in any suitable application, including but not limited to down lighting, indoor or outdoor lighting, stage lighting, decorative lighting, accent lighting, museum lighting, and highly-specific wavelength lighting for horticultural, biological, or other applications, as well as additional lighting applications which will be apparent to those of ordinary skill in the art upon investigating the invention described herein.

As used herein, the "display" or "display panel" of the lighting display device includes all layers and components specifically related to the display function of the device, including display light sources, phosphor materials, light guide panels (LGPs), diffuser materials and layers, reflector materials and layers, optical materials and layers such as brightness-enhancing films (BEFs), PCB panels for lighting control, color filters, polarizing prisms, polarizing filters, glass films, protective films, and the like. The "viewing plane" of the display, as referred to herein, is the portion of the display output seen by the user or observer of the display device.

As used herein, a "backlighting unit" (BLU) refers to the portion of the display which generates light for the lighting display device, including primary and secondary light. Components of the BLU will typically include, but are not restricted to, one or more primary light sources, the QD film, one or more LGP, BEFs, diffuser layers, reflective films, related components, and the like.

The primary light source is optically coupled with the phosphor material of the invention, such that the primary and secondary sources are in optical communication with one another. As used herein, the terms "optically coupled" and "optically connected" refer to elements connected by light, such as primary light, whereby light can transmit from a first element to the second element to which the first element is optically coupled or connected. The primary light source can include any light source capable of creating secondary light emission from the secondary light source (the QD phosphor). An appropriate primary light source will have an excitation energy capable of exciting the QDs of the QD phosphor material, thereby initiating secondary light emission. An ideal primary light source will also exhibit high efficiency, low operating temperatures, high flux, and high brightness. Additional considerations for choosing the primary light source can include availability, cost, size, tolerance, emission color and purity, spectral width, direction of emitted light, lifetime, quality, consistency of features, and compatibility with the phosphor package, the BLU, and the display device. The primary light source can be any suitable light source, such as a LED, a blue or ultraviolet sources such as blue or UV LEDs, a laser, an arc lamp, a black-body light source, and other solid state light sources. Preferred embodiments will include a LED primary light source. Preferably, the primary light source is a blue or UV light source, most preferably a blue LED which emits in the range of 440-470 nm, more preferably 450-460. For example, the primary light source can be a GaN LED such as a GaN LED which emits blue light at a wavelength of 450 nm.

In preferred embodiments, a portion of the blue light emitted by the blue primary light source will be apportioned to absorbance and reemission by the QDs, and a portion of the blue primary light will function as a blue light component of the light emitted by the QD BLU and the display device. In these embodiments, light emitted by the QD BLU will include a mixture of primary light from the primary source and secondary light emitted from the QDs upon absorbance and reemission.

While reference is made to a single primary light source throughout this application, such singularity is referred to merely for the sake of simplicity in the description, and embodiments having more than one primary light source are also implied. As will be understood by persons having ordinary skill in the relevant art, the invention may comprise either a single primary light source or a plurality of primary light sources, depending on the requirements of the particular embodiment or application. Additionally, the one or more primary light sources can be disposed along the edge of the display and/or below the various display layers (e.g., behind the LGP), as explained in more detail below.

Figure 7A:
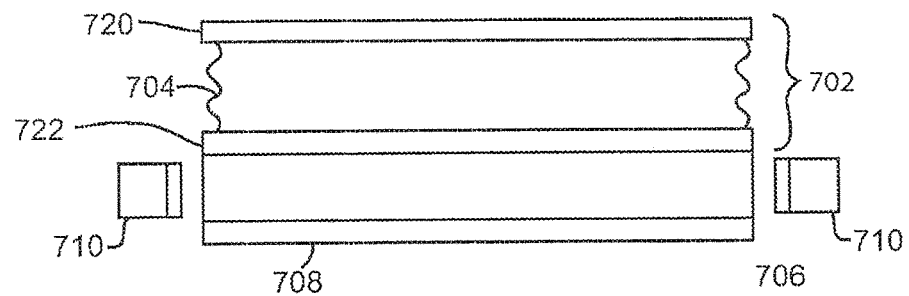
FIGS. 7A-7C show various primary light source arrangements for the QD lighting device of the present invention.
Figure 7B:
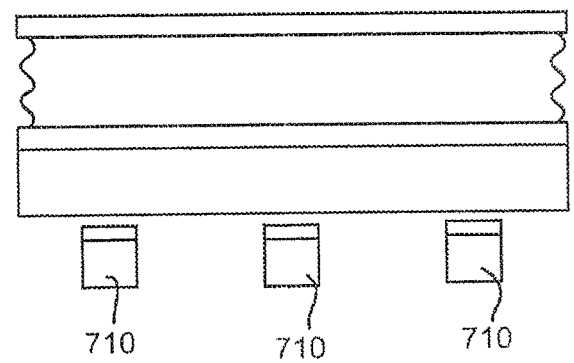
Figure 7C:
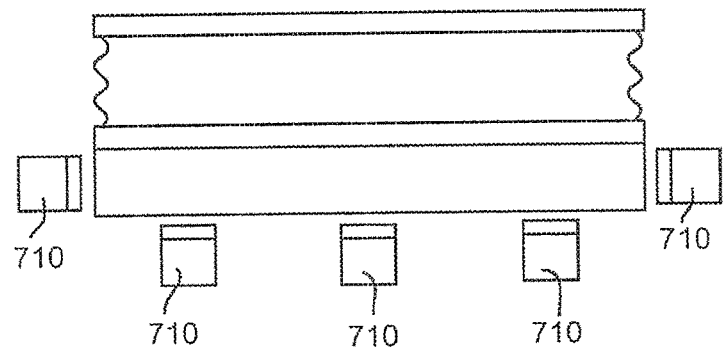

The BLUs of the present invention can include any number, arrangement, spacing, and location of primary light sources, including edge-lit and/or rear-lit arrangements, as shown in FIGS. 7A-7C, depicting edge-lit (FIG. 7A), rear-lit (FIG. 7B), and combined edge- and rear-lit (FIG. 7C) BLUs. As will be understood by those of ordinary skill in the art, the disposition and quantity of primary light sources 710 will depend on the requirements of the lighting device, and will include any conceivable configuration not limited to the embodiments described herein.

In preferred embodiments, the QD BLU includes a QD film remote phosphor package disposed between and adjacent to layers of the display. Suitably, the QD film is disposed on or above the LGP, suitably between the LGP and one or more optical films of the LCD BLU, such as BEFs. The QD film includes a QD phosphor material, preferably disposed between one or more barrier layers on each side of the QD phosphor material. Suitably, the QD film is optically connected to the primary light source via the LGP upon which the QD film is disposed, such that primary light travels through the LGP and transmits into the QD film. In preferred embodiments, the QD film comprises one or more scattering features, such as scattering particles, to enhance secondary light emission, as described in more detail below.

QD Film Remote Phosphor Package

As referred to herein, the "remote phosphor package" or "QD film" of the present invention includes the QD phosphor material and packaging materials associated therewith, as described in more detail below. The remote phosphor package of the present invention is "remote" in the sense that the primary light source and the phosphor material are separate elements, and the phosphor material is not integrated with the primary light source as a single element. The primary light is emitted from the primary light source and travels through one or more external media before reaching the QD phosphor material of the QD film.

Figure 8:
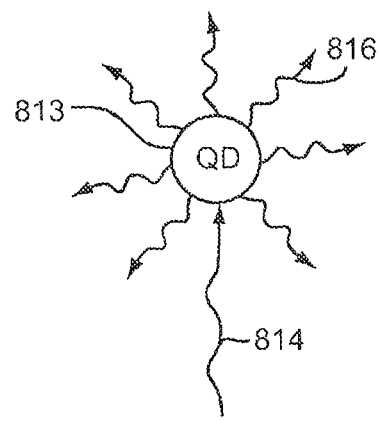
FIG. 8 illustrates primary light absorbance and secondary light emission in a QD, in accordance with the present invention.
Figure 9:
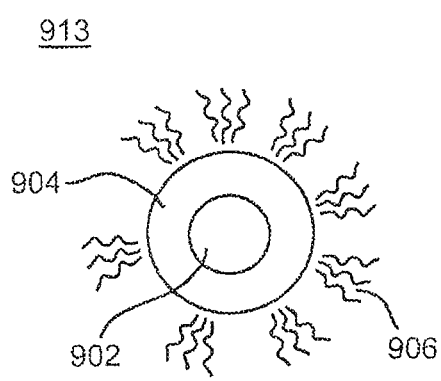
FIG. 9 shows a ligand-coated QD in accordance with the present invention.
Figure 10:
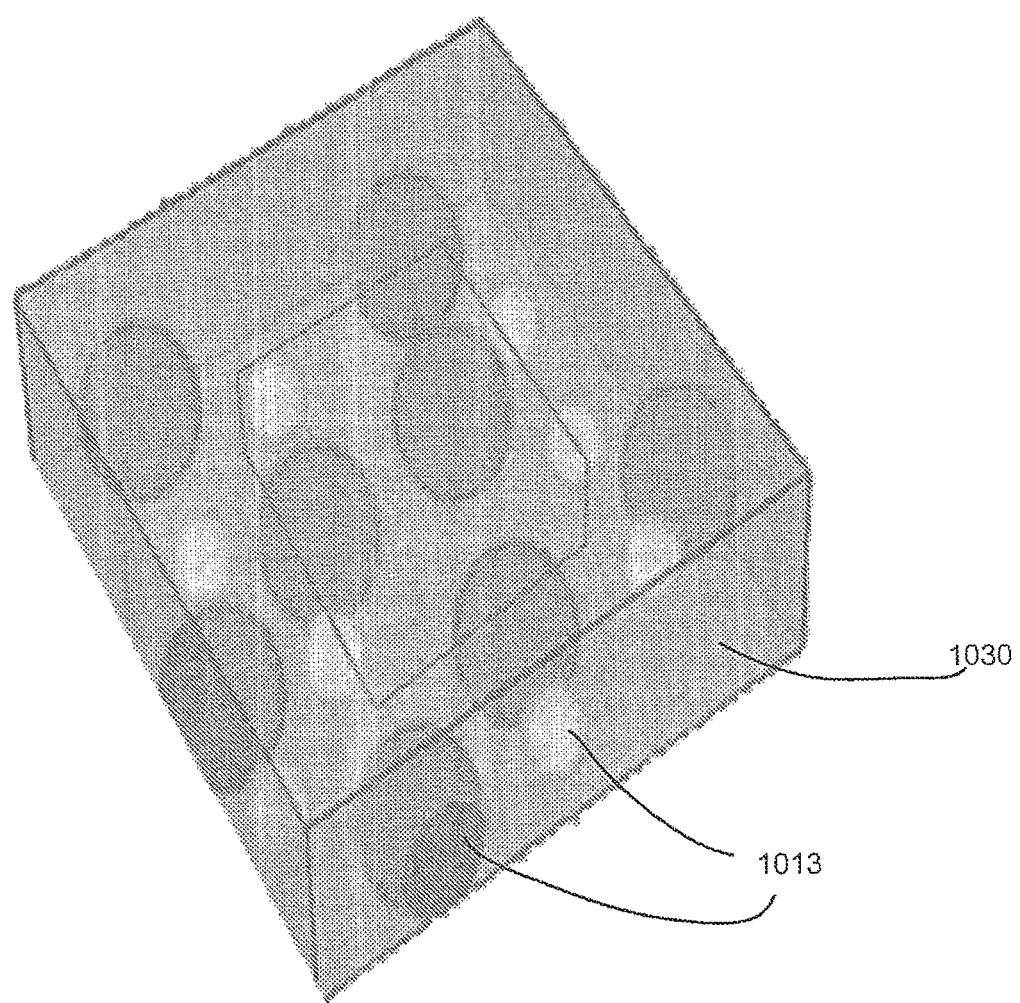
FIG. 10 shows a QD phosphor material comprising QDs embedded in a matrix, in accordance with the present invention.

The remote phosphor package of the present invention includes a QD phosphor material comprising at least one population of light-emitting quantum dots (QDs), also referred to herein as QD phosphors, secondary light sources, or secondary light-emitting QDs. As shown in FIG. 8, the QD 813 provides secondary light emission 816 upon down-conversion of primary light 814 absorbed by the QD. As shown in FIG. 9, the QDs of the present invention suitably comprise a core/shell QD 900, including a core 902, at least one shell 904 coated on the core, and an outer coating including one or more ligands 906, preferably organic polymeric ligands. In preferred embodiments, the remote phosphor package will comprise a QD phosphor material 1000, as shown in FIG. 10, the QD phosphor material including QDs 1013 embedded or dispersed in one or more matrix materials 1030, such that the QD phosphor material comprises a QD-matrix material composite.

Suitable QDs, ligands, and matrix materials include any such suitable materials known to those of ordinary skill in the art, including but not limited to those mentioned herein. As referred to herein, the "QD phosphor material" of the present invention refers to the QD phosphors (i.e., the secondary light-emitting QDs and associated ligands or coatings) and any matrix materials associated therewith. In preferred embodiments, the QD phosphor material will further comprise one or more scattering features, as described in further detail below.

The present invention provides various compositions comprising luminescent quantum dots. The various properties of the luminescent QDs, including their absorption properties, emission properties and refractive indices, can be tailored and adjusted for various applications. As used herein, the term "quantum dot" or "nanocrystal" refers to nanostructures that are substantially monocrystalline. A nanocrystal has at least one region or characteristic dimension with a dimension of less than about 500 nm, and down to on the order of less than about 1 nm. As used herein, when referring to any numerical value, "about" means a value of ±10% of the stated value (e.g. about 100 nm encompasses a range of sizes from 90 nm to 110 nm, inclusive). The terms "nanocrystal," "quantum dot," "nanodot," and "dot," are readily understood by the ordinarily skilled artisan to represent like structures and are used herein interchangeably. The present invention also encompasses the use of polycrystalline or amorphous nanocrystals.

Typically, the region of characteristic dimension will be along the smallest axis of the structure. The QDs can be substantially homogenous in material properties, or in certain embodiments, can be heterogeneous. The optical properties of QDs can be determined by their particle size, chemical or surface composition; and/or by suitable optical testing available in the art. The ability to tailor the nanocrystal size in the range between about 1 nm and about 15 nm enables photoemission coverage in the entire optical spectrum to offer great versatility in color rendering. Particle encapsulation offers robustness against chemical and UV deteriorating agents.

Additional exemplary nanostructures include, but are not limited to, nanowires, nanorods, nanotubes, branched nanostructures, nanotetrapods, tripods, bipods, nanoparticles, and similar structures having at least one region or characteristic dimension (optionally each of the three dimensions) with a dimension of less than about 500 nm, e.g., less than about 200 nm, less than about 100 nm, less than about 50 nm, or even less than about 20 nm or less than about 10 nm. Typically, the region or characteristic dimension will be along the smallest axis of the structure. Nanostructures can be, e.g., substantially crystalline, substantially monocrystalline, polycrystalline, amorphous, or a combination thereof.

QDs (or other nanostructures) for use in the present invention can be produced using any method known to those skilled in the art. For example, suitable QDs and methods for forming suitable QDs include those disclosed in: U.S. Pat. No. 6,225,198, US Patent Application Publication No. 2002/0066401, filed Oct. 4, 2001, U.S. Pat. Nos. 6,207,229, 6,322,901, 6,949,206, 7,572,393, 7,267,865, 7,374,807, U.S. patent application Ser. No. 11/299,299, filed Dec. 9, 2005, and U.S. Pat. No. 6,861,155, each of which is incorporated by reference herein in its entirety.

The QDs (or other nanostructures) for use in the present invention can be produced from any suitable material, suitably an inorganic material, and more suitably an inorganic conductive or semiconductive material. Suitable semiconductor materials include any type of semiconductor, including group II-VI, group III-V, group IV-VI and group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and appropriate combinations of two or more such semiconductors.

In certain aspects, the semiconductor nanocrystals or other nanostructures may comprise a dopant from the group consisting of: a p-type dopant or an n-type dopant. The nanocrystals (or other nanostructures) useful in the present invention can also comprise II-VI or III-V semiconductors. Examples of II-VI or III-V semiconductor nanocrystals and nanostructures include any combination of an element from Group II, such as Zn, Cd and Hg, with any element from Group VI, such as S, Se, Te, Po, of the Periodic Table; and any combination of an element from Group III, such as B, Al, Ga, In, and Tl, with any element from Group V, such as N, P, As, Sb and Bi, of the Periodic Table. Other suitable inorganic nanostructures include metal nanostructures. Suitable metals include, but are not limited to, Ru, Pd, Pt, Ni, W, Ta, Co, Mo, Ir, Re, Rh, Hf, Nb, Au, Ag, Ti, Sn, Zn, Fe, FePt, and the like.

While any method known to the ordinarily skilled artisan can be used to create nanocrystal phosphors, suitably, a solution-phase colloidal method for controlled growth of inorganic nanomaterial phosphors is used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," J. Am. Chem. Soc. 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," J. Am. Chem. Soc. 115:8706 (1993), the disclosures of which are incorporated by reference herein in their entireties. This manufacturing process technology leverages low cost processability without the need for clean rooms and expensive manufacturing equipment. In these methods, metal precursors that undergo pyrolysis at high temperature are rapidly injected into a hot solution of organic surfactant molecules. These precursors break apart at elevated temperatures and react to nucleate nanocrystals. After this initial nucleation phase, a growth phase begins by the addition of monomers to the growing crystal. The result is freestanding crystalline nanoparticles in solution that have an organic surfactant molecule coating their surface.

Utilizing this approach, synthesis occurs as an initial nucleation event that takes place over seconds, followed by crystal growth at elevated temperature for several minutes.

Parameters such as the temperature, types of surfactants present, precursor materials, and ratios of surfactants to monomers can be modified so as to change the nature and progress of the reaction. The temperature controls the structural phase of the nucleation event, rate of decomposition of precursors, and rate of growth. The organic surfactant molecules mediate both solubility and control of the nanocrystal shape. The ratio of surfactants to monomer, surfactants to each other, monomers to each other, and the individual concentrations of monomers strongly influence the kinetics of growth.

In semiconductor nanocrystals, photo-induced emission arises from the band edge states of the nanocrystal. The band-edge emission from luminescent nanocrystals competes with radiative and non-radiative decay channels originating from surface electronic states. X. Peng, et al., J. Am. Chem. Soc. 30:7019-7029 (1997). As a result, the presence of surface defects such as dangling bonds provide non-radiative recombination centers and contribute to lowered emission efficiency. An efficient and permanent method to passivate and remove the surface trap states is to epitaxially grow an inorganic shell material on the surface of the nanocrystal. X. Peng, et al., J. Am. Chem. Soc. 30:7019-7029 (1997). The shell material can be chosen such that the electronic levels are type I with respect to the core material (e.g., with a larger bandgap to provide a potential step localizing the electron and hole to the core). As a result, the probability of non-radiative recombination can be reduced.

Core-shell structures are obtained by adding organometallic precursors containing the shell materials to a reaction mixture containing the core nanocrystal. In this case, rather than a nucleation-event followed by growth, the cores act as the nuclei, and the shells grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and ensure solubility. A uniform and epitaxially grown shell is obtained when there is a low lattice mismatch between the two materials.

Exemplary materials for preparing core-shell luminescent nanocrystals include, but are not limited to, Si, Ge, Sn, Se, Te, B, C (including diamond), P, Co, Au, BN, BP, BAs, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and appropriate combinations of two or more such materials. Exemplary core-shell luminescent nanocrystals for use in the practice of the present invention include, but are not limited to, (represented as Core/Shell), CdSe/ZnS, InP/ZnS, PbSe/PbS, CdSe/CdS, CdTe/CdS, CdTe/ZnS, as well as others.

In suitable embodiments, CdSe is used as the nanocrystal material, due to the relative maturity of the synthesis of this material. Due to the use of a generic surface chemistry, it is also possible to substitute non-cadmium-containing nanocrystals. Exemplary luminescent nanocrystal materials for use in the display BLU device include CdSe or ZnS, including core/shell luminescent nanocrystals comprising CdSe/CdS/ZnS, CdSe/ZnS, CdSeZn/CdS/ZnS, CdSeZn/ZnS, InP/ZnS, PbSe/PbS, CdSe/CdS, CdTe/CdS or CdTe/ZnS. Most preferably, the quantum dots of the present invention will include core-shell QDs having a core comprising CdSe and at least one encapsulating shell layer comprising CdS or Zn—most preferably at least one encapsulating shell layer comprising CdS and at least one encapsulating shell layer comprising ZnS.

The luminescent nanocrystals can be made from a material impervious to oxygen, thereby simplifying oxygen barrier requirements and photostabilization of the QDs in the QD phosphor material. In exemplary embodiments, the luminescent nanocrystals are coated with one or more organic polymeric ligand material and dispersed in an organic polymeric matrix comprising one or more matrix materials, as discussed in more detail below. The luminescent nanocrystals can be further coated with one or more inorganic layers comprising one or more material such as a silicon oxide, an aluminum oxide, or a titanium oxide (e.g., $SiO_2$, $Si_2O_3$, $TiO_2$, or $Al_2O_3$), to hermetically seal the QDs.

As described in further detail below, the QDs used in the present invention will be chosen based on the desired emission properties of the display application for which the QD BLU is used. Preferred QD characteristics include high quantum efficiency (e.g., about 90% or greater), continuous and tunable emission spectrum, and narrow and sharp spectral emission (e.g., less than 40 nm, 30 nm or less, or 20 nm or less full width at half max (FWHM)).

In preferred embodiments, the QDs will include at least one population of QDs capable of emitting red light and at least one population of QDs capable of emitting green light upon excitation by a blue light source. The QD wavelengths and concentrations can be adjusted to meet the optical performance required, as discussed in more detail below. In still other embodiments, the QD phosphor material can comprise a population of QDs which absorb wavelengths of light having undesirable emission wavelengths, and reemit secondary light having a desirable emission wavelength. In this manner, the QD film comprises at least one population of color-filtering QDs to further tune the lighting device emission and reduce or eliminate the need for color filtering.

The QDs of the present invention are preferably coated with one or more ligand coatings, embedded in one or more matrix materials, and/or sealed by one or more barrier layers. Such ligands, matrix materials, and barriers can provide photostability of the QDs and protect the QDs from environmental conditions including elevated temperatures, high intensity light, external gasses, moisture, and other harmful environmental conditions. Additional effects can be achieved with these materials, including a desired index of refraction in the host matrix material, a desired viscosity or QD dispersion/miscibility in the host matrix material, and other desired effects. In preferred embodiments, the ligand and matrix materials will be chosen to have a sufficiently low thermal expansion coefficient, such that thermal curing does not substantially affect the QD phosphor material.

The luminescent QDs (or other nanostructures) useful in the present invention preferably comprise ligands conjugated to, cooperated with, associated with, or attached to their surface. In preferred embodiments, the QDs include a coating layer comprising ligands to protect the QDs from external moisture and oxidation, control aggregation, and allow for dispersion of the QDs in the matrix material. Suitable ligands and matrix materials, as well as methods for providing such materials, are described herein. Additional suitable ligands and matrix materials, as well as methods for providing such materials, include any group known to those skilled in the art, including those disclosed in U.S. patent application Ser. No. 12/79,813, filed Feb. 4, 2000, U.S. patent application Ser. No. 12/076,530, filed Mar. 19, 2008, U.S. patent application Ser. No. 12/609,736, filed Oct. 30, 2009, U.S. patent application Ser. No. 11/299,299, filed Dec. 9, 2005, U.S. Pat. Nos. 7,645,397, 7,374,807, 6,949,206, 7,572,393, and 7,267,875, the disclosure of each of which is incorporated herein by reference in its entirety. Additionally, suitable ligand and matrix materials include any suitable materials in the art.

As explained in more detail in U.S. patent application Ser. No. 12/79,813, filed Feb. 4, 2000, suitable ligand structures include multi-part ligand structures, such as a 3-part ligand, in which the head-group, tail-group and middle/body-group can each be independently fabricated and optimized for their particular function, and then combined into an ideally functioning complete surface ligand. With the development of such multi-part ligands, control of the loading density of the nanocrystals in the matrix can be achieved to optimize quantum yield, optical scattering, tuning of the refractive index, and QD density in the host matrix. The ligand molecule can be synthesized using a generalized technique allowing three separate groups to be synthesized separately and then combined.

Preferably, the ligands comprise one or more organic polymeric ligands. Suitable ligands provide efficient and strong-bonding QD encapsulation with low oxygen permeability, precipitate or segregate into domains in the matrix material to form a discontinuous dual-phase or multi-phase matrix, disperse favorably throughout the matrix material, and are commercially available materials or can be easily formulated from commercially available materials.

Suitable ligands include, e.g., polymers, glassy polymers, silicones, carboxylic acid, dicarboxylic acid, polycarboxylic acid, acrylic acid, phosphonic acid, phosphonate, phosphine, phosphine oxide, sulfur, amines, amines which combine with epoxides to form an epoxy, monomers of any of the polymeric ligands mentioned herein, any of the matrix materials mentioned herein, monomers of any of the polymeric matrix materials mentioned herein, or any suitable combination of these materials. Suitably, the QD ligands will include amine-containing organic polymers such as amino silicone (AMS) (e.g., AMS-242 and AMS-233, sold by Gelest™, and GP-998, sold by Genesee Polymers Corp.™); and poly-ether amines such as Jeffamine™. Suitable ligands include ligands having one or more QD-binding moieties such as an amine moiety or a dicarboxylic acid moiety. Exemplary amine ligands include aliphatic amines, such as decylamine or octylamine; and polymeric amines.

Figure 11A:
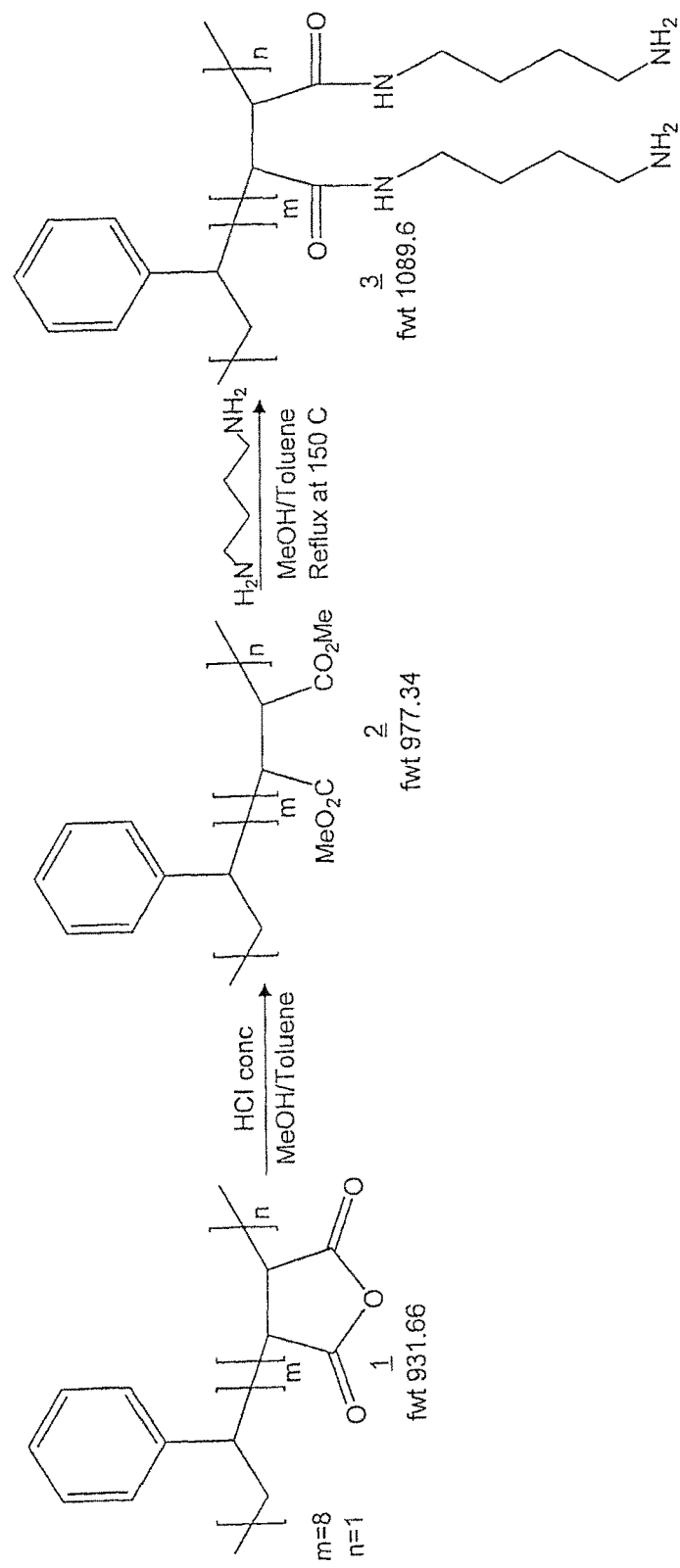
FIGS. 11A-11B show ligand and QD film formation methods of the present invention.

In preferred embodiments, the ligand material comprises a pendant amine functional polystyrene (referred to herein as amino polystyrene or APS) to coat and provide photostability for the QDs, preventing unwanted changes in QD emission characteristics. Suitable APS ligands include, for example, copolymers that comprise a styrene monomer and a monomer bearing an amine moiety, preferably a primary amine moiety. An exemplary APS ligand is shown in FIG. 11A. As shown in the example embodiment of FIG. 11A, the APS is synthesized from styrene maleic anhydride (SMA), such as commercially available SMA (e.g., Sartomer™ SMA EF80). The anhydride is converted to dimethyl ester in quantitative yield, then the methyl ester is transformed by reaction with diamine to amide, which concurrently produces a pendant primary amine. Following this reaction, the polymer is purified by precipitation and size-selection can be used to obtain a suitable molecular weight fraction. In this example embodiment for synthesizing the APS ligand, all manipulations were performed under a dry, oxygen-free, nitrogen atmosphere using standard Schlenk technique. The reagents, intermediate and APS product were handled and stored inside a glove box. Hexane, toluene and methanol were de-oxygenated and dried using an MBraun™ MP-SPS solvent system. The formula weight of the polymers were estimated using a 'polymer unit' containing 8 styrene monomers and 1 maleic anhydride (or malonate derivatives). To synthesize the styrene maleic dimethylester copolymer (2), the SMA copolymer (1) (150 g) was added to a 2 L, 3-neck round bottom flask (RBF). Methanol (196 mL) and toluene (275 mL) were measured with an addition funnel before addition to the RBF reaction flask. Hydrochloric acid concentrated (3 drops) was added to the RBF and the temperature was set to 110° C., causing the reaction solution to reflux. After refluxing the reaction solution for 2 days (about 48 hours) the heat was removed and the reaction solution cooled to room temperature. Sample analysis by FTIR spectroscopy revealed that anhydride had been converted to ester. The volatiles were removed from the reaction solution by rotational evaporation. The product was dissolved with diethyl ether (600 mL) portion-wise, by adding diethyl ether (100 mL), swirling by hand, and decanting into a 2 L separatory funnel. The product was washed with water (5×250 mL) in the separatory funnel. The volatiles were again removed by rotational evaporation with a vacuum line until the product was a brittle, white foam that was crushed to a powder. The product was subjected to vacuum until a pressure of less than 100 mtorr had been reached for more than 4 hours. The product (142 g) was stored in the glove box. Analysis of the isolated product by FTIR indicated ester without anhydride. Next, synthesis of the styrene maleic diamine copolymer (3) began with the addition of the styrene maleic dimethylester copolymer (2) (140 g) to a 2 L, 3-neck RBF, and the RBF reaction flask was fitted with a reflux condenser and an addition funnel. Toluene (850 mL) was added and the reaction solution was heated to 50° C. While the reaction solution was being heated, 1,4-diaminobutane (71.0 g) was transferred to a 250 mL Schlenk flask. On the Schlenk line, the diaminobutane was washed into the RBF dissolved in methanol (75 mL total) by cannula. Then the reaction solution temperature was increased to 140° C., and the reaction solution was turbid but stirred freely. The reaction solution was refluxed at 140° C. for 9 days. After refluxing for 6 days, analysis of the sample by FTIR revealed that the ester had been converted to amide. The reaction solution was refluxed until day 9 when it was cooled to room temperature. For work-up and purification, the reaction solution was transferred drop-wise to a 5 L, 3-neck RBF that contained 1500 mL of hexanes. The top phase was decanted, and the product was washed with hexane (500 mL) and the top phase was decanted again. The volatiles were removed by vacuum transfer to leave a colorless, brittle foam. The foam was subjected to vacuum until the pressure was less than 200 mtorr. The product was then dissolved in a 1:1 mixture of toluene and methanol (1 L), forming a turbid solution. The solution was filtered into a separate Schlenk flask through a coarse, sintered glass filter using a closed inert-atmosphere filtration system. The solution was added drop-wise to 8.0 L of rapidly stirring hexanes in a mechanically stirred 12 L, 3 neck RBF. The addition occurred over about 2 h and caused the polymer to precipitate. The polymer was washed with hexanes (150 mL) and dried under vacuum to a pressure of less than 200 mtorr which produced a brittle, white foam. Periodically during the volatiles removal process, the solids were broken-up and scraped off the flask walls to facilitate drying. The product was subjected to vacuum of less than 100 mtorr for at least 4 h. The resulting product was a brittle, white foam that was crushed into a white powder (128 g). The Schlenk technique is preferred to synthesize APS that will provide successful stabilization of the QDs.

The APS material provides improvements over conventional materials in formation of a complete QD coating, photo-stabilization, barrier properties, curability, ease of deposition, and compatibility with matrix materials, such as epoxy.

In more preferred embodiments, the ligand material comprises a polyethyleneimine or a modified polyethyleneimine to coat and, e.g., improve solubility and/or photostability for the QDs, preventing unwanted changes in QD emission characteristics. Preferably, the polyethyleneimine or modified polyethyleneimine is branched. A modified polyethyleneimine can be conveniently produced by reaction of a polyethyleneimine with another compound, e.g., with an electrophile such as benzyl bromide, benzyl chloride, or an epoxy. Preferably, a modified polyethyleneimine for use in the invention is produced by reaction of a polyethyleneimine with a monoepoxy. Most preferably, a modified polyethyleneimine for use in the invention is produced by reaction of a branched polyethyleneimine with a monoepoxy. The polyethyleneimine can be reacted with greater than 0 and less than or equal to 1 equivalent of the monoepoxy per equivalent of primary amine on the polyethyleneimine. Preferably, the polyethyleneimine is reacted with between about 0.05 and about 0.80 equivalent of the monoepoxy per equivalent of primary amine on the polyethyleneimine, more preferably with between about 0.10 and about 0.75 equivalent of the monoepoxy per equivalent of primary amine, or with between about 0.20 and about 0.75 equivalent of the monoepoxy per equivalent of primary amine, e.g., with about 0.25 equivalent of the monoepoxy per equivalent of primary amine, with about 0.40 equivalent of the monoepoxy per equivalent of primary amine, with about 0.50 equivalent of the monoepoxy per equivalent of primary amine, with about 0.60 equivalent of the monoepoxy per equivalent of primary amine, or with about 0.70 equivalent of the monoepoxy per equivalent of primary amine. Without limitation to any particular mechanism, it is thought that the monoepoxy reacts primarily with free primary amines on the polyethyleneimine, although some reaction with secondary amines of the polyethyleneimine can also occur. Thus, exemplary suitable modified polyethyleneimines include branched polymers having a polyethyleneimine backbone, where a portion of the amines have been derivatized, for example, by reaction with a monoepoxy. The percentage of the primary amines that are derivatized optionally varies, e.g., from greater than 0% to less than or equal to 100%. Optionally, the percentage of primary amines that are modified is between about 5% and about 80%, between about 10% and about 75%, or between about 20% and about 70%, e.g., about 25%, about 40%, about 50%, about 60%, or about 70%. Optionally, the amount of monoepoxy used to modify a polyethyleneimine is between about 0.25 and about 0.875 times the weight of the polyethyleneimine that is to be modified, e.g., between about 0.40 and about 0.70 times the weight of the polyethyleneimine, e.g., about 0.50 times the weight of the polyethyleneimine.

A number of monoepoxies are known in the art that are suitable for reaction with polyethyleneimine to produce modified polyethyleneimine ligands. Typically, a suitable monoepoxy has a molecular weight less than about 1000, preferably less than about 500, and more preferably less than about 400 or less than about 300. The monoepoxy can include a polar moiety and/or a nonpolar moiety. The monoepoxy can include a hydrocarbon moiety, which can be saturated or unsaturated, e.g., an aliphatic or aromatic moiety or a combination thereof. Preferred monoepoxies for reaction with polyethyleneimine to produce a modified polyethyleneimine ligand include 1,2-epoxy-3-phenoxypropane (MW 150.1772), 1,2-epoxydodecane (MW 184.32), and glycidyl 4-nonylphenyl ether (MW 276.41), shown in FIGS. 36A-36C (respectively).

For ease of reference, "PEI" as used herein refers to unmodified polyethyleneimine ligands and to ligands derived from polyethyleneimine, and therefore includes both unmodified and modified polyethyleneimines.

As noted above, modified polyethyleneimines can be synthesized from polyethyleneimines and monoepoxies. As shown in the example embodiment of FIG. 37, a modified polyethyleneimine is synthesized from polyethyleneimine, such as a commercially available polyethyleneimine (e.g., Epomin® SP-012 (MW 1200) from Nippon Shokubai Co., Ltd.) and monoepoxy, such as a commercially available monoepoxy (e.g., 1,2-epoxy-3-phenoxypropane from Sigma-Aldrich). Following synthesis of the PEI, ligand exchange with QDs is performed to coat the QDs with the PEI ligand.

In this example embodiment for synthesizing the PEI ligand, the apparatus was set up using a 5 L, 4-neck round bottom flask equipped with a stirring bar, 1 L addition funnel, hose adapter, thermocouple in the reaction solution and short path distillation head with receiving flask and thermometer to measure vapor temperature. Additionally the distillation head was attached to a bubbler containing a one-way valve. Also a valve was placed on the hose between the bubbler and distillation head. Once the apparatus was connected to a Schlenk line by the hose adapter, nitrogen gas could be passed into the reaction flask, across the surface of the reaction solution and out the bubbler attached to the distillation head. Also the one way valve on the bubbler allowed vacuum to be applied to the whole apparatus from the hose adapter without pulling air or oil from the bubbler into the reaction flask. The reaction flask was placed into a heating mantle connected to a temperature controller with thermocouple positioned to measure the reaction solution temperature.

Separately, in a glove box, precipitated CdSe/CdS/ZnS QDs were dissolved in toluene (using a volume of toluene equal to 20 to 25% of the volume of QD growth solution), and transferred to a Schlenk flask; total volume of the QDs and toluene was 2.5 L. Also hexane (540 mL) was transferred to a separate Schlenk flask in the glove box. Toluene and hexane were obtained from Sigma-Aldrich and used as received.

The apparatus was attached to the Schlenk line on the hose adapter and polyethyleneimine SP-012 (240 g, from Nippon Shokubai Co., Ltd., used as received) was added. While stirring, with the valve on the hose between the distillation head and bubbler open, the apparatus was placed under vacuum to a pressure of less than 300 mtorr and back flushed with nitrogen three times. Then the valve on the hose was closed and 1,2-epoxy-3-phenoxypropane (150 g, 1.00 mole, from Sigma-Aldrich, used as received) was added to the reaction solution by syringe. Toluene (800 mL) was transferred by cannula and then added to the reaction flask after measurement in the addition funnel. The reaction flask was heated to 100° C. for 30 minutes. Then the valve on the hose between the distillation head and bubbler was opened and about 200 mL of distillate was collected (or about 25% of the toluene) over about half an hour. The valve between the distillation head and bubbler was closed and the solution of QDs dissolved in toluene was removed from the glove box and transferred into the addition funnel by cannula. Then the solution of QDs in toluene was added to the reaction flask over 15 to 30 minutes. Upon completion of QD/toluene addition, the reaction solution was heated at 100° C. for 30 minutes. Then the valve on the line between the distillation head and bubbler was opened and about 750 mL of distillate was collected (or about 25% of the toluene). Following distillate collection, the distillation head was removed and the reaction flask sealed with a stopper. The reaction solution was cooled to 60° C. Hexane was transferred into the addition funnel by cannula from the Schlenk flask and added to the reaction solution at a moderate rate while stirring. Upon complete mixing, the stirring was ceased and the solution allowed to settle as it cooled to room temperature. The relatively colorless upper phase was carefully removed by cannula leaving the intensely colored lower phase (containing the QDs with the PEI ligand) in the reaction flask. In this example, approximately 0.50 equivalent of 1,2-epoxy-3-phenoxypropane per equivalent of primary amines on the polyethyleneimine was used to modify the polyethyleneimine.

In a related example embodiment, a PEI ligand was synthesized by modifying polyethyleneimine basically as described above but with glycidyl 4-nonylphenyl ether. In this example, approximately 0.25 equivalent of glycidyl 4-nonylphenyl ether per equivalent of primary amines on the polyethyleneimine was used to modify the polyethyleneimine. This exemplary glycidyl 4-nonylphenyl ether-modified PEI gave similar solubility behavior when exchanged onto QDs as did the exemplary 1,2-epoxy-3-phenoxypropane-modified PEI while preserving more of the primary amines, which can result in better binding of the ligand to the QDs and subsequent improvement in quantum yield.

The PEI ligands provide improvements over conventional materials in formation of a complete QD coating, photostabilization, barrier properties, curability, ease of deposition, and compatibility with matrix materials, such as epoxy. Other advantages of the PEI materials over conventional materials and APS materials include: polyethyleneimine is inexpensive and readily available from many sources in pure enough form to be used directly in modification and ligand exchange reactions; water and oxygen impurities in the polyethyleneimine can be easily removed from the reaction flask prior to ligand exchange without requiring any additional equipment; PEI ligand exchange can be readily accomplished on a large amount of nanocrystals in the course of a few hours; various nanocrystals (e.g., QDs that emit green, red or a mixture of the two) can be exchanged easily using similar procedures; the exchanged nanocrystal-PEI combination can be removed from the reaction solvent by precipitation with hexane and most of the solvent removed by simple decantation; the nanocrystal-PEI combination can be produced with a high concentration of nanocrystals (for example, up to thirty times the concentration used in the final formulation), making the extremely concentrated mixture easy to formulate, store, and/or ship; the nanocrystal-PEI combination does not contain volatile solvent so can be stored or shipped safely; the nanocrystal-PEI combination disperses well into commercially available epoxies so can be easily mixed with a curable matrix, for example, immediately before film fabrication; and since the matrix is relatively common and commercially available the viscosity of the pre-cure mixture can be easily modified to meet requirements for film coating and fabrication. In addition to these factors, modification of polyethyleneimine with a monoepoxy such as 1,2-epoxy-3-phenoxypropane adds other desirable properties such as: improved precipitation from hexane; improved solubility of the PEI-QDs, resulting in smaller, more predictable nanocrystal domains in the cured matrix and fewer large insoluble particle defects in the resulting QD film; a more fluid exchanged nanocrystal-PEI combination that makes mixing more facile at the stage immediately preceding coating the film; and decreased number of QDs required during production of the film to achieve a desired level of brightness and white point. Exemplary desirable characteristics for modified polyethyleneimine ligands (which can influence choice of monoepoxy or other reagent employed to produce the modified ligand) thus include: enhanced solubility in the exchange reaction solvent (which results in fewer insoluble clusters); a sufficient number of remaining primary amines to bind to the QDs; and enhanced dispersion in the epoxy (or other) matrix, producing fewer visual large particle defects and less tendency to settle in the epoxy during storage (before addition of the cross-linker and curing of the matrix). Further, desirable modified polyethyleneimine ligands are transparent, do not reduce quantum yield via energy transfer or light absorption, do not yellow/brown during final device operation, and do not photoreact and cause increased degradation of device performance over time.

In certain embodiments, the QD ligands can include a polymerizable group (i.e., a functional group which can react to set the polymer) to incorporate the ligand (whether bound to the nanostructure or provided in excess) into a polymeric matrix. For example, a (meth)acrylate group can polymerize when initiated by radicals, and an epoxide group can polymerize when initiated by cationic or anionic initiators. For example, in a preferred embodiment, epoxide groups polymerize when initiated by amines.

Generally, the polymeric ligand is bound to a surface of the nanostructure. Not all of the ligand material in the composition need be bound to the nanostructure, however. The polymeric ligand can be provided in excess, such that some molecules of the ligand are bound to a surface of the nanostructure and other molecules of the ligand are not bound to the surface of the nanostructure. The excess ligand can optionally be polymerized into a matrix in which the nanostructure is embedded. The composition can include a solvent, a cross-linker, and/or an initiator (e.g., a radical or cationic initiator), to facilitate such incorporation.

The phosphor material of the present invention further comprises a matrix material in which the QDs are embedded or otherwise disposed. The matrix material can be any suitable host matrix material capable of housing the QDs. Suitable matrix materials will be chemically and optically compatible with the BLU components, including the QDs and any surrounding packaging materials or layers. Suitable matrix materials include non-yellowing optical materials which are transparent to both the primary and secondary light, thereby allowing for both primary and secondary light to transmit through the matrix material. In preferred embodiments, the matrix material completely surrounds the QDs and provides a protective barrier which prevents deterioration of the QDs caused by environmental conditions such as oxygen, moisture, and temperature. The matrix material can be flexible in applications where a flexible or moldable QD film is desired. Alternatively, the matrix material can include a high-strength, non-flexible material.

Preferred matrix materials will have low oxygen and moisture permeability, exhibit high photo- and chemical-stability, exhibit favorable refractive indices, and adhere to the barrier or other layers adjacent the QD phosphor material, thus providing an air-tight seal to protect the QDs.

Preferred matrix materials will be curable with UV or thermal curing methods to facilitate roll-to-roll processing. Thermal curing is most preferred.

Suitable matrix materials for use in QD phosphor material of the present invention include polymers and organic and inorganic oxides. Suitable polymers for use in the matrixes of the present invention include any polymer known to the ordinarily skilled artisan that can be used for such a purpose. In suitable embodiments, the polymer will be substantially translucent or substantially transparent. Suitable matrix materials include, but are not limited to, epoxies, acrylates, norborene, polyethylene, poly(vinyl butyral):poly(vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with difunctional monomers, such as divinylbenzene; cross-linkers suitable for cross-linking ligand materials, epoxides which combine with ligand amines (e.g., APS or PEI ligand amines) to form epoxy, and the like.

The QDs used the present invention can be embedded in a polymeric matrix (or other matrix material) using any suitable method, for example, mixing the nanocrystals in a polymer and casting a film, mixing the nanocrystals with monomers and polymerizing them together, mixing the nanocrystals in a sol-gel to form an oxide, or any other method known to those skilled in the art. As used herein, the term "embedded" is used to indicate that the luminescent nanocrystals are enclosed or encased within the polymer that makes up the majority component of the matrix. It should be noted that luminescent nanocrystals are suitably uniformly distributed throughout the matrix, though in further embodiments they can be distributed according to an application-specific uniformity distribution function.

The ligands and/or matrix material can also include a cross-linker and/or an initiator, e.g., for incorporation of the ligand and nanostructures into a matrix. In one class of embodiments, the cross-linker is an epoxy cross-linker.

Figure 12A:
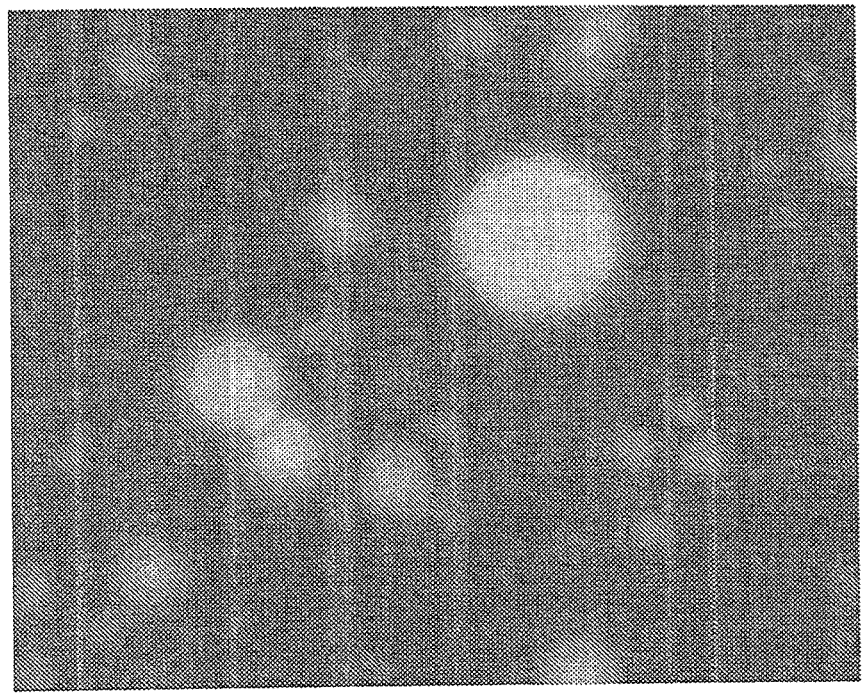
FIGS. 12A-12B show QD phosphor materials in accordance with the present invention.
Figure 12B:
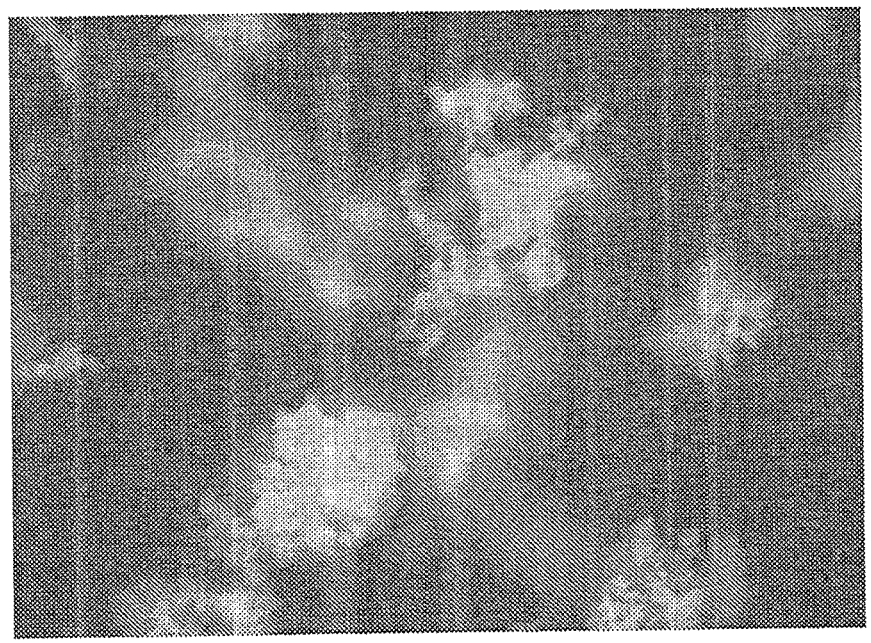

A discontinuous or multi-phase encapsulation material is preferred so that the QDs are protected in domains of a hydrophobic material which is impermeable to moisture and oxygen. FIG. 12A shows a QD phosphor material comprising an AMS-epoxy emulsion, and FIG. 12B shows an APS-epoxy QD phosphor material. In preferred embodiments, the matrix material comprises an epoxy. Preferably, the QD ligands comprise APS and the matrix material comprises epoxy, whereby the QD phosphor material comprises domains of APS-coated QDs dispersed throughout the epoxy matrix to form a multi-phase material, as shown in FIG. 12B. Most preferably, the QD ligands comprise PEI and the matrix material comprises epoxy, whereby the QD phosphor material comprises domains of PEI-coated QDs dispersed throughout the epoxy matrix to form a multi-phase material. FIG. 38A shows a polyethyleneimine-epoxy QD phosphor material, and FIG. 38B shows a modified polyethyleneimine-epoxy QD phosphor material.

Preferred QD phosphor materials include APS or PEI and epoxies, such as Loctite™ epoxy E-30CL or epoxies from Epic Resins (Palmyra, Wis.) where the viscosity specification for part A is 15 to 40K centipoise (cP) (preferably 30 to 40K cP) and the viscosity specification for part B is 3 to 25K cP (preferably 7.5 to 10K cP). Preferably, the QD phosphor material includes QDs comprising APS or PEI ligands and one or more epoxide polymer that polymerizes and cross-links when mixed with the APS or PEI, wherein excess amines cross-link the epoxy.

In a preferred method of forming the QD phosphor material, the QDs are provided in a solvent (e.g., toluene), and the QD-solvent mixture is added to a mixture of the ligand material to coat the QDs. Preferably, the first (ligand) material comprises an amine-containing polymer, suitably APS, or most preferably PEI.

In a preferred embodiment, a QD-toluene mixture is added to a mixture of APS and toluene to provide APS-coated QDs. A matrix material is added to the solvent mixture, followed by evaporation of the solvent. Preferably, an epoxide polymer is added to the mixture, whereby the epoxide is cross-linked by amines of the excess ligand material. Due to the immiscibility of the APS in the epoxy, APS-coated QDs are located in spatial domains throughout the epoxy matrix material. The QD phosphor material is formed from this QD-APS-epoxy mixture, which is preferably mixed with additional base epoxy material, which is wet-coated onto a substrate and cured to form the QD film, as shown in FIG. 12B. The mixture can be coated on a barrier layer or the LGP and thermally or UV cured. Thermal curing is preferred. The curing can be performed in phases. For example, the QD phosphor material can be formed in layers, wherein each layer is cured individually. Preferably, the QD film is deposited on a bottom barrier film and partially cured to the bottom barrier film, then a top barrier film is deposited on the QD material, and the QD material curing is then continued.

In a more preferred embodiment, QDs are coated with a PEI ligand, e.g., as described above by combining a QD-toluene mixture with a solution comprising the PEI ligand. Carrying on from the example embodiment detailed above describing synthesis of polyethyleneimine modified with 1,2-epoxy-3-phenoxypropane and exchange of this modified polyethyleneimine ligand onto QDs to prepare the QD phosphor material, part B (96 g), the amine part of Loctite™ E-30CL epoxy cure resin, was stirred in a separate 5 L, 3-neck round bottom flask on the Schlenk line. The solution was degassed to a pressure of less than 100 mtorr and back flushed with nitrogen 3 times. Then the QD-PEI solution (i.e., the intensely colored lower phase that contained the QDs with the PEI ligand) was added to the solution of part B of the epoxy resin by cannula with stirring. If the QD-PEI solution were too thick to transfer then some toluene (up to 500 mL) could be added to facilitate transfer by cannula. Upon completion of the transfer, the solution was mixed for 1 hour before the solvent was removed by vacuum transfer to a pressure of less than 200 mtorr with stirring. The product, a thick oil, was transferred and stored in the glove box. When ready to form the QD film, the product is optionally mixed with additional part B of the epoxy resin to achieve a desired color point, then mixed with part A (the epoxide part of the epoxy resin), whereby the epoxide is cross-linked by amines of any excess ligand material and/or by the amines of part B of the resin. Due to the immiscibility of the PEI in the epoxy, PEI-coated QDs are located in spatial domains throughout the epoxy matrix material. Typically, the PEI-QD domains are relatively small (e.g., on the order of 100 nm in diameter) and uniformly distributed throughout the epoxy matrix. The QD phosphor material is formed from this QD-PEI-epoxy mixture, which is wet-coated onto a substrate and cured to form the QD film. The mixture can be coated on a barrier layer or the LGP and thermally or UV cured. Thermal curing is preferred. The curing can be performed in phases. For example, the QD phosphor material can be formed in layers, wherein each layer is cured individually. Preferably, the QD film is deposited on a bottom barrier film and partially cured to the bottom barrier film, then a top barrier film is deposited on the QD material, and the QD material curing is then continued.

Figure 11B:
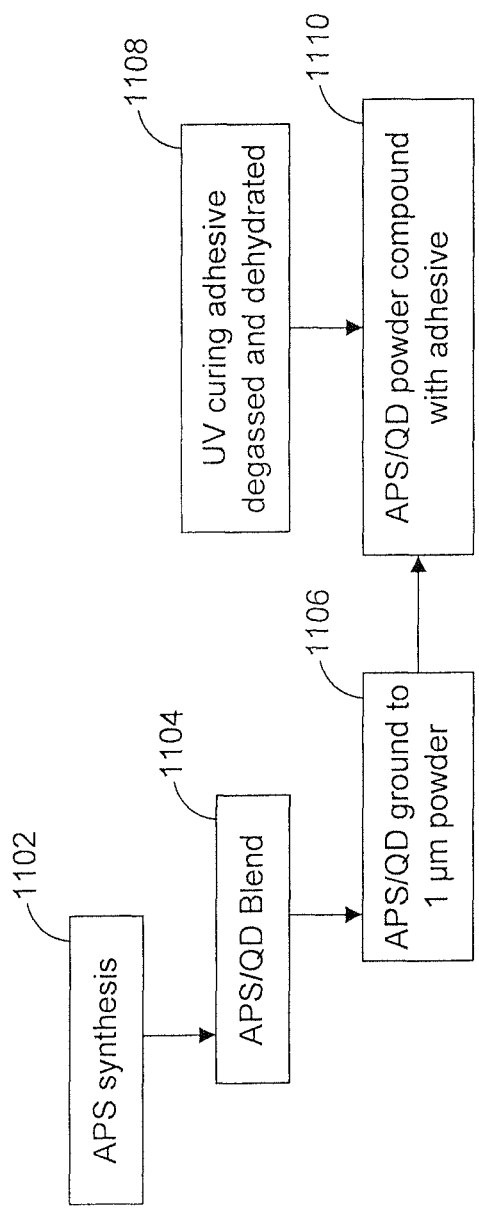

In another preferred method of preparing the QD phosphor material, as shown in FIG. 11B, a first polymeric material is synthesized 1102, and a plurality of QDs are dispersed in a first polymeric material (e.g., APS or polyethyleneimine) to coat the QDs with the first polymeric material (e.g., APS or polyethyleneimine ligands) and form a mixture of the QDs and the first polymeric material 1104. Upon solvent evaporation, the mixture is cured, and a particulate is generated from the cured mixture 1106. Suitably, a cross-linker is added to the mixture prior to the curing. The particulate can be generated by grinding or ball milling the cured mixture to form a fine or coarse powder of the QD-APS or QD-polyethyleneimine material. Suitably, the QD-APS or QD-polyethyleneimine particles are about 1 μm in diameter. At this point, the particulate is preferably dispersed in a second polymeric material (e.g., epoxy) to generate the composite QD phosphor material, which can be formed into a film and cured 1108, 1110. Alternatively, the particles can be coated with an oxide such as an aluminum oxide, a silicon oxide, or a titanium oxide (e.g., $SiO_2$, $Si_2O_3$, $TiO_2$, or $Al_2O_3$), thereby forming an outer oxide layer on the particles. The oxide layer can be formed using atomic layer deposition (ALD) or other techniques known in the art. The oxide-coated powder particles can be applied directly to the lighting device (e.g., disposed upon or embedded within the LGP), or disposed in a matrix material, such as epoxy, and formed into the QD film. In certain embodiments, the oxide-coated powder particles can be used in a lighting device without additional barrier materials for sealing the QD phosphor material (e.g., without barrier layers).

In some embodiments, the above-mentioned APS-epoxy ligand-matrix mixture or PEI-epoxy ligand-matrix mixture can be employed using any substitute for the epoxy matrix material, although epoxy is preferred due to its adhesive properties, density close to APS and PEI, commercial availability, and low cost. Suitable epoxy substitutes include polystyrene, norborene, acrylates, hydrosilated APS, or any solid plastic.

In some embodiments, the matrix is formed from the ligand material coating the QDs. A cross-linker can be provided to react with moieties on the ligand. Similarly, an initiator (e.g., a radical or cationic initiator) can be provided. In embodiments in which no other precursors of the second matrix material are provided, the matrix optionally consists essentially of the first material polymeric ligand and/or a cross-linked or further polymerized form thereof, as well as any residual solvent, cross-linker, initiator, and the like. In one embodiment, the QDs are coated with AMS ligands, and a poly(acrylonitrile ethylene styrene) (AES) matrix is provided by cross-linking the AMS ligands using a cross-linking agent.

The QD phosphor material and QD film of the present invention can be any desirable size, shape, configuration and thickness. The QDs can be embedded in the matrix at any loading ratio that is appropriate for the desired function, depending on the desired color and/or brightness output of the BLU, as explained in more detail below. The thickness and width of the QD phosphor material can be controlled by any method known in the art, such as wet coating, painting, spin coating, screen printing. In certain QD film embodiments, the QD phosphor material can have a thickness of 500 μm or less, preferably 250 μm or less, more preferably 200 μm or less, more preferably 50-150 μm, most preferably 50-100 μm. The QD film can have a thickness of 100 μm, about 100 μm, 50 μm, or about 50 μm. The QD phosphor material can be deposited as one layer or as separate layers, and the separate layers may comprise varying properties, as explained in more detail below. The width and height of the QD phosphor material can be any desired dimensions, depending on the size of the viewing panel of the display device. For example, the QD phosphor may have a relatively small surface area in small display device embodiments such as watches and phones, or the QD phosphor may have a large surface area for large display device embodiments such as TVs and computer monitors. Methods for forming the QD BLUs of the present invention can include forming a large QD film and cutting the QD film into smaller QD films to form individual lighting devices, as discussed in more detail below.

In certain embodiments of the present invention, the matrix material in which the QD phosphors are embedded can be comprised of other layers of the BLU, such as one or more of the LGP, barrier layers, BEFs, diffuser layers, or other suitable layers of the BLU, such that the QDs are embedded therein, whereby at least a portion of the primary light transmitted therethrough is absorbed by the QDs and down-converted to secondary light emitted by the QDs. In embodiments where the QD phosphors are embedded within an existing layer of the device, and embodiments where the QD phosphors are not surrounded by a matrix material, the QDs preferably comprise an outer oxide coating, such as a silicon oxide, a titanium oxide, or an aluminum oxide (e.g., $SiO_2$, $Si_2O_3$, $TiO_2$, or $Al_2O_3$). The oxide-coated QDs can be directly deposited onto and/or directly dispersed within, one or more layers of the lighting device.

As will be understood by those of ordinary skill in the art, the components and materials described herein can be chosen to have a specific index of refraction, depending on the particular application and the desired effect. The terms "refractive index," "index of refraction," or "refractive indices," as used herein, indicates the degree to which the material bends light. As will be understood by persons of ordinary skill in the art, the refractive index of each of the materials described herein can be determined by determining the ratio of the speed of light in a vacuum divided by the speed of light in the material. Each of the components and materials of the lighting device of the present invention can be chosen to have a desired refractive index or indices, including the matrix materials, ligand materials, barrier layers, and/or other materials.

In one preferred class of embodiments, the one or more matrix materials has a low index of refraction and can be index-matched to the one or more barrier layers, LGP, BEFs, and/or other layers of the device.

Figure 13A:
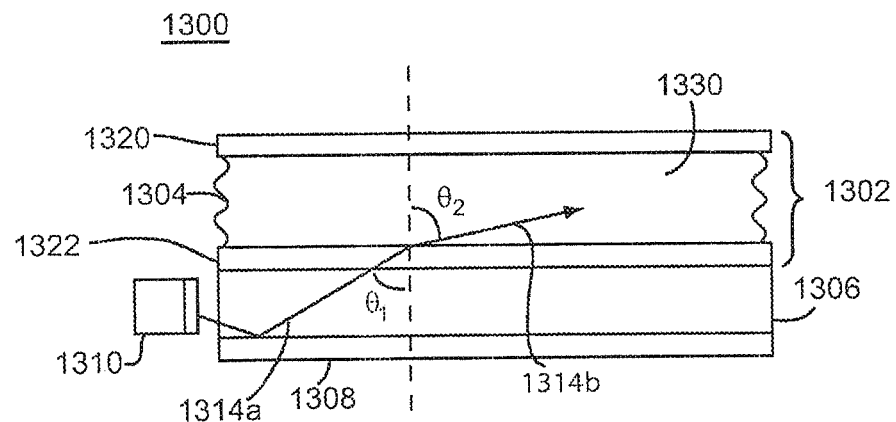
FIGS. 13A-13B illustrate optical features and mechanisms in accordance with the present invention.

In another embodiment, at least one matrix material 1330 of the QD phosphor material 1304 has a lower refractive index than adjacent layers in the lighting device, whereby the angle of primary light entering the QD phosphor material is increased from $0_1$ to $O_2$ upon entering the QD phosphor material. As shown in FIG. 13A, in one example embodiment, primary light 1314a is refracted in the QD phosphor material layer 1304, which has a lower index of refraction than that of the LGP. The angle of light entering the QD phosphor material 1304 increases, thereby increasing the path length of primary light in the QD phosphor material. Consequently, this increases the probability that the primary light 1314*b* will be absorbed by quantum dots in the QD phosphor material. With a longer path length of primary light and an increased chance of secondary emission by the QDs, a lower QD concentration is required to achieve any given brightness of secondary light. As will be appreciated by those of ordinary skill in the art, the one or more barrier layers 1320, 1322 can be index-matched to another material, such as the LGP 1306 or the matrix material 1330, or can have a distinct index of refraction.

Figure 13B:
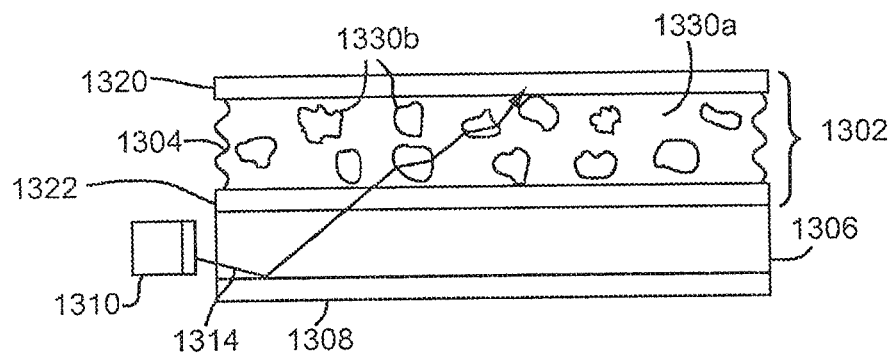

In yet another embodiment, the QD phosphor material includes at least one matrix and/or ligand material having a different refractive index than another matrix and/or ligand material in the QD phosphor layer. For example, the QD film can include a first matrix material having a relatively low index of refraction and a second material having a higher index of refraction. The second material can include one or more matrix or ligand materials. In one example embodiment, as shown in FIG. 13B, the QD film 1302 includes at least a first material 1330*a* having a first index of refraction, n1, and at least a second material 1330*b* having a second index of refraction, n2, wherein n2 is different than n1, whereby the index-mismatch causes light refraction—particularly primary light refraction—in the QD film. In one embodiment, as shown in FIG. 13B, n2 is lower than n1, whereby the second material 1330*b* refracts primary light 1314 in the QD film. In one embodiment, the QDs are embedded in the second material 1330*b*.

As will be understood by those of ordinary skill in the art, the matrix materials can be chosen to properly balance the necessary transparency or other properties with the advantageous effects of tailoring the refractive index of the matrix materials.

Barriers

In preferred embodiments, the QD film comprises one or more barrier layers disposed on either one or both sides of the QD phosphor material layer. Suitable barrier layers protect the QDs and the QD phosphor material from environmental conditions such as high temperatures, oxygen, and moisture. Suitable barrier materials include non-yellowing, transparent optical materials which are hydrophobic, chemically and mechanically compatible with the QD phosphor material, exhibit photo- and chemical-stability, and can withstand high temperatures. Preferably, the one or more barrier layers are index-matched to the QD phosphor material. In preferred embodiments, the matrix material of the QD phosphor material and the one or more adjacent barrier layers are index-matched to have similar refractive indices, such that most of the light transmitting through the barrier layer toward the QD phosphor material is transmitted from the barrier layer into the phosphor material. This index-matching reduces optical losses at the interface between the barrier and matrix materials.

The barrier layers are suitably solid materials, and can be a cured liquid, gel, or polymer. The barrier layers can comprise flexible or non-flexible materials, depending on the particular application. Barrier layers are preferably planar layers, and can include any suitable shape and surface area configuration, depending on the particular lighting application. In preferred embodiments, the one or more barrier layers will be compatible with laminate film processing techniques, whereby the QD phosphor material is disposed on at least a first barrier film, and at least a second barrier film is disposed on the QD phosphor material on a side opposite the QD phosphor material to form the QD film according to one embodiment of the present invention. Suitable barrier materials include any suitable barrier materials known in the art. For example, suitable barrier materials include glasses, polymers, and oxides. Suitable barrier layer materials include, but are not limited to, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof. Preferably, each barrier layer of the QD film comprises at least 2 layers comprising different materials or compositions, such that the multi-layered barrier eliminates or reduces pinhole defect alignment in the barrier layer, providing an effective barrier to oxygen and moisture penetration into the QD phosphor material. The QD film can include any suitable material or combination of materials and any suitable number of barrier layers on either or both sides of the QD phosphor material. The materials, thickness, and number of barrier layers will depend on the particular application, and will suitably be chosen to maximize barrier protection and brightness of the QD phosphor while minimizing thickness of the QD film. In preferred embodiments, each barrier layer comprises a laminate film, preferably a dual laminate film, wherein the thickness of each barrier layer is sufficiently thick to eliminate wrinkling in roll-to-roll or laminate manufacturing processes. The number or thickness of the barriers may further depend on legal toxicity guidelines in embodiments where the QDs or other QD phosphor materials comprise heavy metals or other toxic materials, which guidelines may require more or thicker barrier layers. Additional considerations for the barriers include cost, availability, and mechanical strength.

In preferred embodiments, the QD film comprises two or more barrier layers adjacent each side of the QD phosphor material, preferably two or three layers on each side, most preferably two barrier layers on each side of the QD phosphor material. Preferably, each barrier layer comprises a thin polymer film having a thin oxide coating on at least one side of the polymer film. Preferably, the barrier layers comprise a thin PET film coated with a thin layer of silicon oxide (e.g., $SiO_2$ or $Si_2O_3$) on one side. For example, preferred barrier materials include Ceramis™ CPT-002 and CPT-005, available from Alcan™. In another preferred embodiment, each barrier layer comprises a thin glass sheet, e.g., glass sheets having a thickness of about 100 μm, 100 μm or less, 50 μm or less, preferably 50 μm or about 50 μm.

Figure 14A:
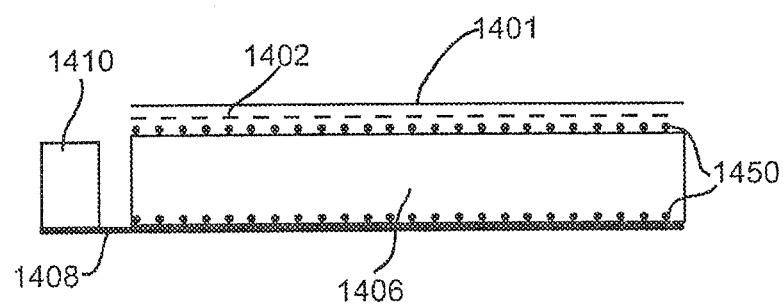
FIG. 14A-14C illustrate barrier films and materials according to certain embodiments of the present invention.
Figure 14B:
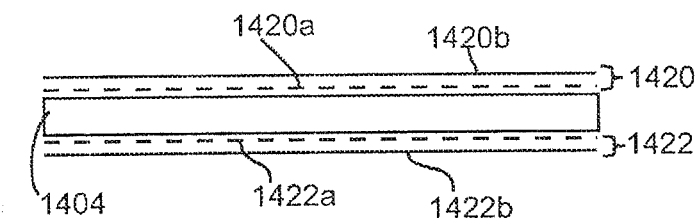

As shown in the example embodiment of FIG. 14A, the QD BLU 1400 includes a primary light source 1410, LGP 1406 having optional light extraction features 1450, reflective film 1408 disposed beneath the LGP, BEFs 1401, and QD film 1402 disposed between the LGP and BEFs. As shown in FIG. 14B, the QD film 1402 includes a top barrier 1420 and a bottom barrier 1422. Each of the barriers 1420 and 1422 includes a first sublayer 1420*a*/1422*a* adjacent the QD phosphor material 1404, and at least a second sublayer 1420*b*/1422*b* on the first layer 1420*a*/1422*a*. In preferred embodiments, the materials and number of sublayers are chosen to minimize pinhole alignment between the adjacent sublayers. In preferred embodiments, each of the top barrier 1420 and bottom barrier 1422 comprises a first sublayer 1420*a*/1422*a* comprising silicon oxide, and a second sublayer 1420*b*/1422*b* comprising PET. Preferably, the first sublayer 1420*a*/1422*a* comprising silicon oxide is disposed directly adjacent the QD phosphor material 1404, and the second sublayer 1420*b*/1422*b* comprising PET is disposed over the first sublayer 1420*a*/1422*a* such that the first sublayer 1420*a*/1422*a* is disposed between the QD phosphor material 1404 and the second sublayer 1420*b*/1422*b*. In one example embodiment, the QD phosphor material has a thickness of about 50 μm, each of the first sublayers comprising silicon oxide has a thickness of about 8 µm, and each of the second sublayers comprising PET has a thickness of about 12 µm.

Figure 14C:
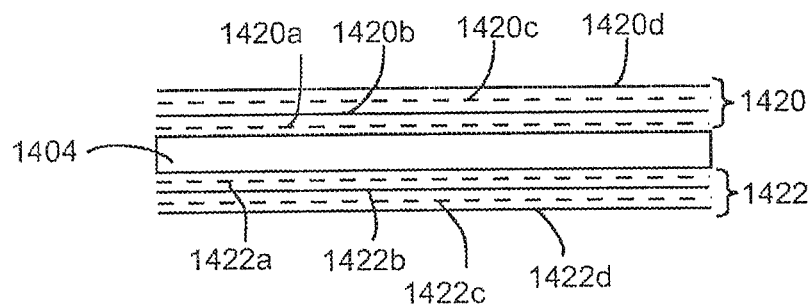

In a preferred embodiment, as shown in FIG. 14C, the top and bottom barriers each comprise a dual barrier (i.e., 2 barrier layers). The top barrier 1420 comprises a first barrier layer and a second barrier layer, wherein the first barrier layer comprises a first sublayer 1420a and a second sublayer 1420b, and the second barrier layer comprises a first sublayer 1420c and a second sublayer 1420d. The bottom barrier 1422 comprises a first barrier layer and a second barrier layer, wherein the first barrier layer comprises a first sublayer 1422a and a second sublayer 1422b, and the second barrier layer comprises a first sublayer 1422c and a second sublayer 1422d. Preferably, the first sublayers 1420a, 1420c, 1422a, and 1422c comprise silicon oxide and the second sublayers 1420b, 1420d, 1422b, and 1422d comprise PET. In one example embodiment, the QD phosphor material has a thickness of about 100 µm, each of the first sublayers comprising silicon dioxide has a thickness of about 8 µm, and each of the second sublayers comprising PET has a thickness of about 12 µm.

Figure 15A:
FIGS. 15A-15I illustrate various exemplary barriers and barrier features in accordance with the present invention.
Figure 15B:
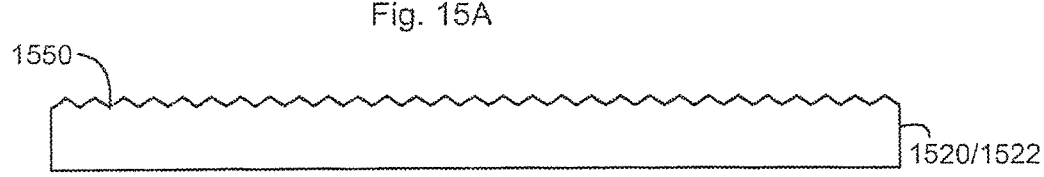
Figure 15C:
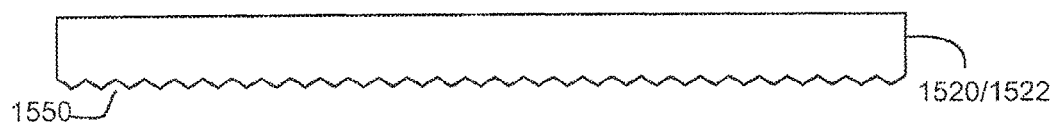
Figure 15D:
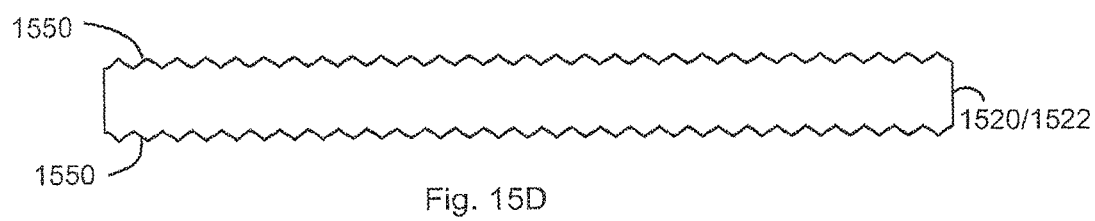
Figure 15:
Figure 15F:
Figure 15G:
Figure 15H:
Figure 15I:
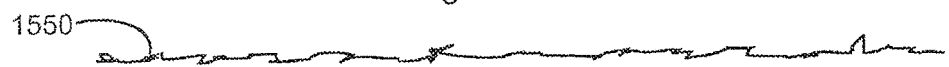

Any of the one or more barrier layers can comprise a layer having a consistent thickness and structure across the viewing plane, as shown in FIG. 15A. Any of the barrier layers may also comprise features 1550 on the top, bottom, or both the top and bottom surfaces of the barrier layer, as shown in FIGS. 15B, 15C, and 15D, respectively. As will be understood by persons of ordinary skill in the art, any suitable combination of such barrier layers with or without features 1550 can be employed. As shown in the various example embodiments shown in FIGS. 15B-15I, the features 1550 of the barrier layer can comprise any suitable texture or pattern, including prisms, pitches, lenses, bumps, wavy features, scratches, lenses, domes, or a randomly micro-textured surface. Suitably, the features can be light scattering or diffuser features—e.g., to scatter light in the QD film or to diffuse light transmitting from the top of the QD film to optically balance imperfections in the LGP, QD film, or other layer of the BLU. Suitably, the features can comprise light extraction or brightness-enhancing features to enhance light extraction and the brightness of light emitted by the BLU and/or promote recycling of primary light back into the QD phosphor material to enhance secondary light emission. Suitably, the features 1550 prevent intimate physical coupling between the QD film and adjacent layers of the BLU, particularly the LGP, thus preventing undesirable cladding effects. Suitably, the features 1550 can have a size of about 0.5-1 µm in height, and each of the features can be separated by a distance of about 0.5-1 µm. Suitably, the features comprise the same material as the barrier layer on which they are formed, and the features can be formed directly in or on the barrier layer. Features 1550 can be formed using any methods known in the art, including stamping, laser etching, chemical etching, injection molding, and extrusion.

Figure 16A:
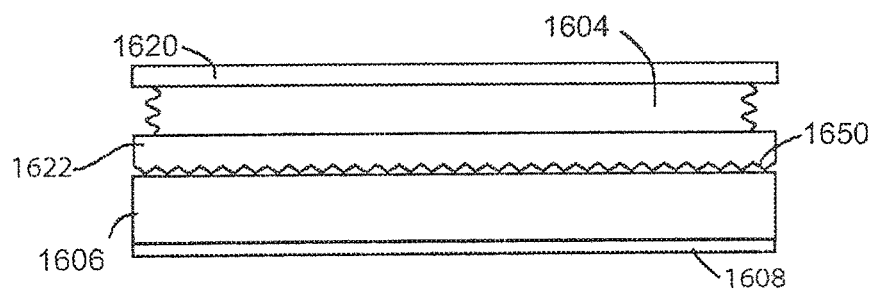
FIGS. 16A-16D illustrate various exemplary optical enhancement features in accordance with the present invention.

In one example embodiment shown in FIG. 16A, the bottom surface of the bottom barrier layer 1622 comprises anti-coupling or anti-cladding features 1650 to prevent excess optical coupling (e.g., cladding) between the LGP and the QD film. These anti-coupling or anti-cladding features 1650 prevent excess physical contact between the LGP 1606 and the QD film 1602, thereby promoting brightness uniformity over the display surface. Suitably, the features 1650 prevent excessive optical coupling between the QD film and adjacent layers of the BLU—particularly the LGP. Suitably, the features 1650 can have a size of about 0.5-1 µm in height and width, and each of the features can be separated by a distance of about 0.5-1 µm.

In certain embodiments of the invention, the top surface of the barrier plate 1620 comprises structural features 1650 which reduce total internal reflection at the interface between the top plate 1620 and the medium above the top plate (e.g., air), into which the light emits from the device. In an exemplary embodiment, the top surface of the top barrier plate 1620 is micro-textured at the air/glass interface of the barrier plate 1620 and the adjacent medium above the top plate 1620. The micro-textured surface reduces total internal reflection and increases the light extraction from the top plate. In certain embodiments, structural features 1650 on the top surface of the top plate increase light extraction by about 10% or more. The geometry of the structural features 1650 can be chosen or modified based on the wavelength(s) of light emitted from the phosphor material of the phosphor package, the refractive indices of the QD film and adjacent media, or other characteristics, as will be understood by ordinarily skilled artisans.

Figure 16B:
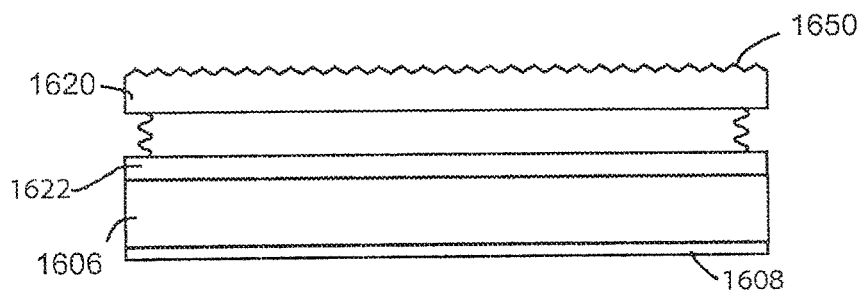
Figure 16C:
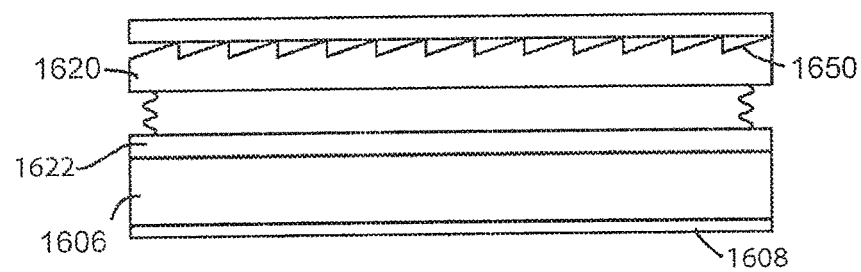
Figure 16D:
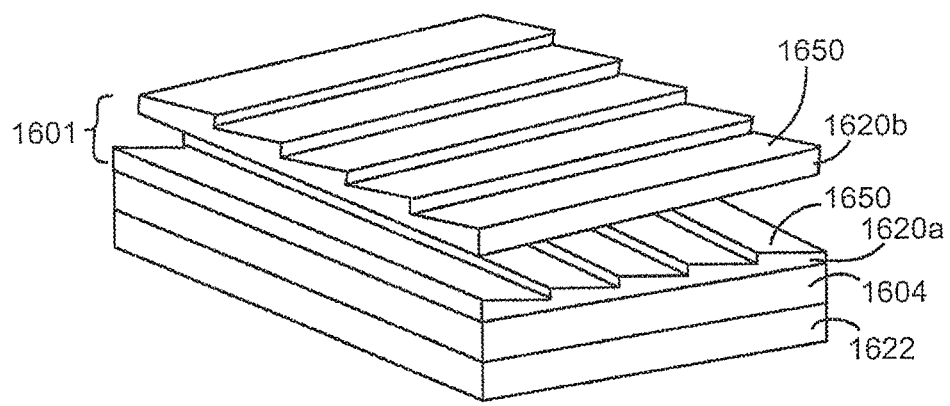

In another example embodiment, shown in FIG. 16B, the top surface of the top barrier layer 1620 comprises brightness-enhancing features 1650, such as prisms or pitches, which reflect a portion of the primary light back toward the QD film, thereby providing "recycling" of primary light back into the QD film. As referred to herein, "brightness enhancement films" (BEFs) and "brightness enhancement features" are films or features which reflect a portion of light back toward the direction from which the light was transmitted. Light traveling toward the BEF or brightness enhancement feature will be transmitted through the film or feature, depending on the angle at which the light is incident upon the film or features. For example, as shown in FIGS. 16C-16D, the brightness enhancement features 1650 of BEFs 1601 comprise prisms or prism grooves formed in parallel on the top surface of the films 1601. Light traveling upward from the LGP 1606 will transmit through the BEFs if the light is normal or perpendicular to the planar films 1601. However, such light will be reflected downward toward the LGP if the light has a higher angle. The BEFs and brightness enhancement features can be chosen to have multiple reflection angles for light of different angles, and such features and angles can be chosen to achieve a desired brightness or light "recycling." For example, a first polarizer film (or BEF) can reflect light having an angle of about 15-25 degrees from the plane perpendicular to the film (i.e., 65-75 degrees from the normal), and a second film can reflect light having an angle of about 25-35 degrees from the perpendicular plane. The BEFs can be disposed with the enhancement features 1650 disposed in opposite directions, as shown in the films 1620a, 1620b of FIG. 16D. Additional BEFs can also be included. The use of multiple-angle and multiple-direction reflection features results in "solid-angle recycling," which recycles light reaching the BEFs from various directions. In preferred embodiments of the present invention, the angles or pitches of the one or more BEFs will be chosen to reflect a significant portion of primary light toward the QD film, such that the QD quantity can be greatly reduced to achieve a desired secondary light emission from the QDs.

The BEFs and brightness enhancing features can include reflective and/or refractive films, reflective polarizer films, prism films, groove films, grooved prism films, prisms, pitches, grooves, or any suitable BEFs or brightness enhancement features known in the art. For example, the BEFs can include conventional BEFs such Vikuiti™ BEFs available from 3M™. In certain embodiments, one or more barrier layers can have brightness enhancement features formed thereon or therein, whereby the one or more barrier layers functions as both a barrier and a BEF. The barrier layer 1620 can be the bottom BEF of a BEF optical film stack. In another example embodiment, shown in FIGS. 16C and 16D, the top barrier comprises at least two layers, each layer comprising brightness-enhancing features on the top surface of the layer. The top barrier 1620 comprises a first layer 1620*a* comprising a first BEF having brightness-enhancing features 1650 on the top surface, and a second layer 1620*b* comprising a second BEF having brightness-enhancing features 1650 on the top surface, wherein the top barrier functions as both a barrier 1620 and a BEF stack 1601 comprising the first BEF barrier layer 1620*a* and the second BEF barrier layer 1620*b*. In preferred embodiments, the QD BLU comprises at least one BEF, more preferably at least two BEFs. Suitably, the BLU can comprise at least three BEFs. In preferred embodiments, at least one BEF comprises a reflective polarizer BEF (i.e., a DBEF), e.g., for recycling light which would otherwise be absorbed by the bottom polarizer film of the liquid crystal matrix module. The brightness-enhancing features and BEFs can include reflectors and/or refractors, polarizers, reflective polarizers, light extraction features, light recycling features, or any brightness-enhancing features known in the art. The BEFs and brightness-enhancing features 1650 can include conventional BEFs. For example, the BEFs can include a first layer having pitches or prisms having a first pitch angle, and at least a second layer having pitches or prisms having a second pitch angle. In still further embodiments, the BLU can include a third BEF layer having pitches or prisms having a third pitch angle. Suitable BEFs include conventional BEFs, including Vikuiti™ BEFs available from 3M™.

In certain embodiments, one or more barrier layers can be formed from an existing layer or material rather than an additional barrier material. For example, in exemplary embodiments, the matrix material surrounding the QDs can itself function as a barrier material for the QDs. In certain embodiments, the top barrier layer of the QD film can comprise a diffuser layer or a BEF film of the BLU. In still further embodiments, the LGP can act as a bottom barrier layer for the QD phosphor material; however, the LGP and the QD film are preferably not in intimate contact with one another. As will be understood by those of ordinary skill in the art, the QD phosphor barrier materials or barrier layers can include any suitable combination of one or more components, as mentioned herein.

Each barrier layer of the QD film of the present invention can have any suitable thickness, which will depend on the particular requirements and characteristics of the lighting device and application, as well as the individual film components such as the barrier layers and the QD phosphor material, as will be understood by persons of ordinary skill in the art. In certain embodiments, each barrier layer can have a thickness of 50 µm or less, 40 µm or less, 30 µm or less, preferably 25 µm or less or 20 µm or less, most preferably 15 µm or less. In certain embodiments, the barrier layer comprises an oxide coating, which can comprise materials such as silicon oxide, titanium oxide, and aluminum oxide (e.g., $SiO_2$, $Si_2O_3$, $TiO_2$, or $Al_2O_3$). The oxide coating can have a thickness of about 10 µm or less, 5 µm or less, 1 µm or less, or 100 nm or less. In certain embodiments, the barrier comprises a thin oxide coating with a thickness of about 100 nm or less, and can have a thickness of 10 nm or less, 5 nm or less, or 3 nm or less. The top and/or bottom barrier can consist of the thin oxide coating, or may comprise the thin oxide coating and one or more additional material layers.

Barrier Seal

Figure 17A:
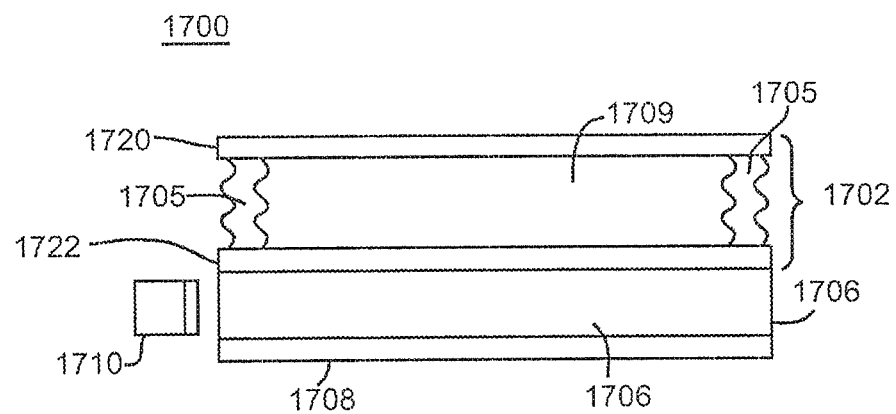
FIGS. 17A-17B show one QD phosphor material and QD phosphor material inactive regions of the present invention, according to one embodiment of the present invention.
Figure 17B:
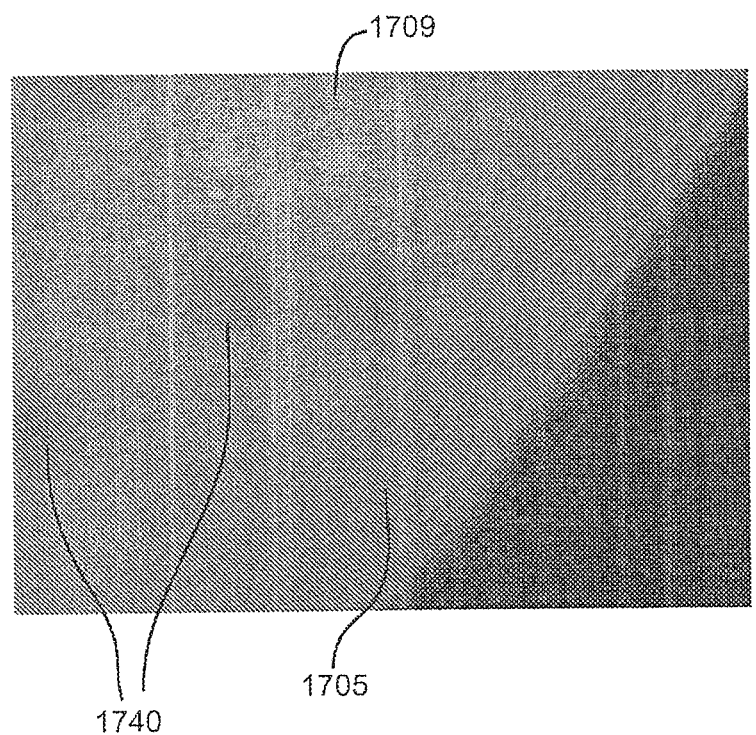

In a preferred embodiment, as shown in FIGS. 17A and 17B, the QD film 1702 comprises top and bottom barriers 1720, 1722, which can include any of the barrier embodiments described herein, and an inactive region 1705 which comprises a spatially defined region around the perimeter of the QD phosphor material which is exposed to environmental conditions such as oxygen. Preferably, the QD phosphor material provides a sufficient barrier to prevent oxygen or moisture from penetrating beyond the predetermined or predefined inactive region 1705 and into the active region 1709 of the QD phosphor material. In a preferred embodiment, the QD phosphor material comprises APS-coated or PEI-coated QDs disposed in an epoxy matrix material, and the inactive region has a width of about 1 millimeter at the outermost edge or perimeter of the QD film, and a height equal to the thickness of the QD phosphor material at said perimeter of the QD film. The dimensions of the spatial region can include any suitable dimensions and will depend on the particular device embodiment, including the particular QD phosphor materials, the number and type of barrier layers, etc. The width of the inactive region can be determined using appropriate testing procedures, and suitably comprises 2 mm or less or 1.5 mm or less, and is preferably 1 mm or less, 1 mm, or about 1 mm.

Figure 18A:
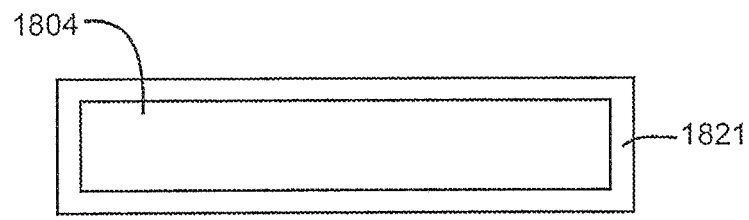
Figure 18B:
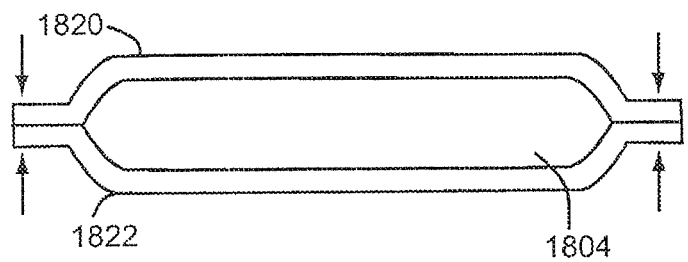
Figure 18C:
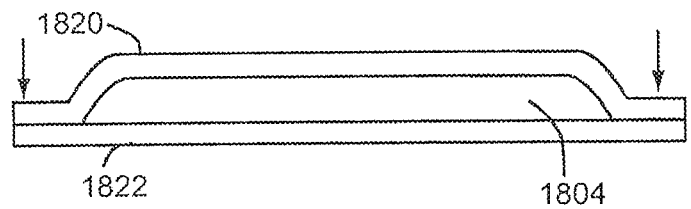

In addition to or as an alternative to the one or more barrier layers, the QD film can be edge sealed and/or hermetically sealed to protect the QD phosphor material from environmental conditions. In one example embodiment, the QD film comprises the QD phosphor material 1804 and a hermetic packaging or coating layer 1821 which completely coats the entire outer surface of the QD phosphor material, as shown in FIG. 18A. As will be appreciated by persons of ordinary skill in the art, any of the embodiments of the present invention, including those specifically described herein, can include an external hermetic coating layer on the surface of the QD phosphor material or the QD film. Suitably, the hermetic coating layer comprises an oxide, such as silicon oxide, titanium oxide, or aluminum oxide (e.g., $SiO_2$, $Si_2O_3$, $TiO_2$, or $Al_2O_3$); glass, polymer, epoxy, or any of the matrix materials described herein. The hermetic seal can be formed by any suitable methods known in the art, including spray coating, painting, wet coating, chemical vapor deposition, or atomic layer deposition.

Figure 19A:
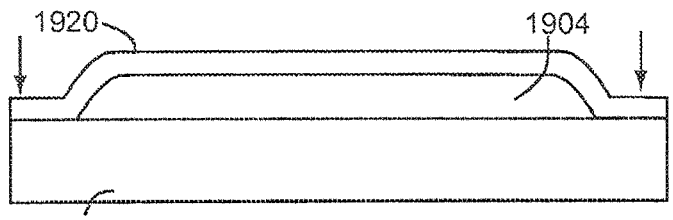
Figure 20A:
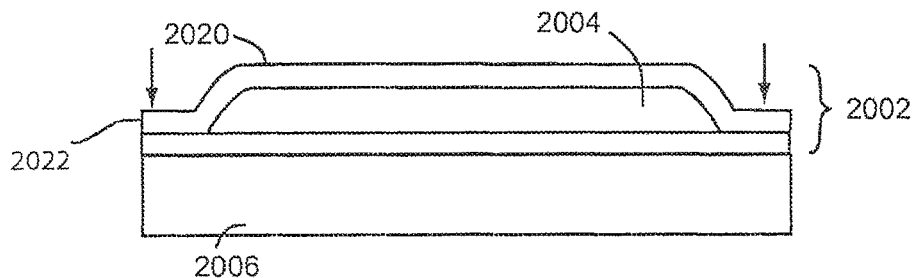

In a preferred embodiment, the top and bottom barriers are mechanically sealed. As shown in the preferred embodiments of FIGS. 18B and 18C, the top and/or bottom layers are pinched together to seal the QD film. Suitably, the edges of the barrier layers 1820 and 1822 are pinched before the QD phosphor material is fully cured. Suitably, the edges are pinched immediately following deposition of the QD film and barrier layers, so as to minimize exposure of the QD phosphor material to oxygen and moisture in the environment. The barrier edges can be sealed by pinching, stamping, melting, rolling, pressing, or the like. In one embodiment of forming the QD film, one or more barrier edges are sealed during the same process step used to cut the QD film down to the appropriate size. As shown in FIGS. 19A and 20A, the same or similar mechanical edge-seal can be employed in embodiments where the QD film comprises a bottom barrier 1922 comprising a LGP 1906 (as in FIG. 19A, showing the QD phosphor material formed directly on the combination bottom barrier layer and LGP 1906, 1922 and the top barrier layer 1920), and where the QD film 2002 is formed or deposited on the LGP 2006 prior to mechanically sealing the QD film (as in FIG. 20A, showing the QD film comprising a top barrier 2020, a bottom barrier 2022, and a QD phosphor material 2004).

Figure 19B:
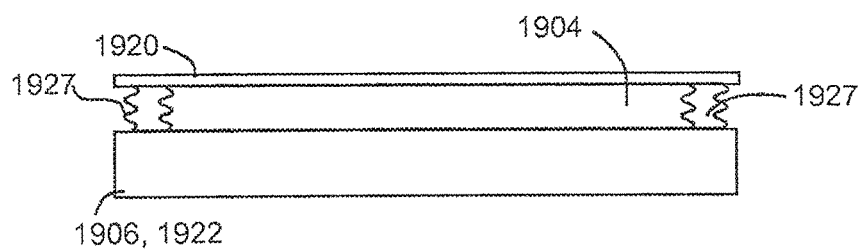
Figure 19C:
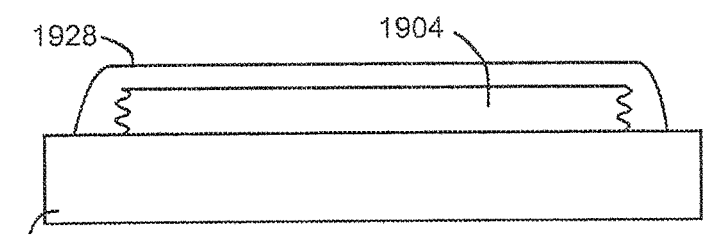
Figure 19D:
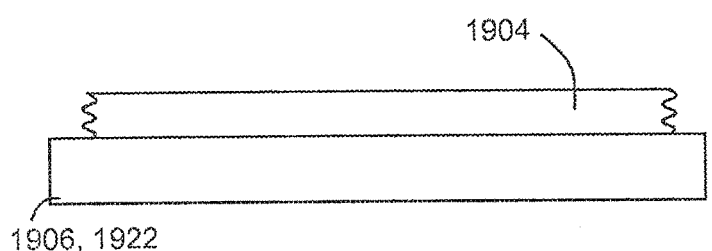
Figure 20B:
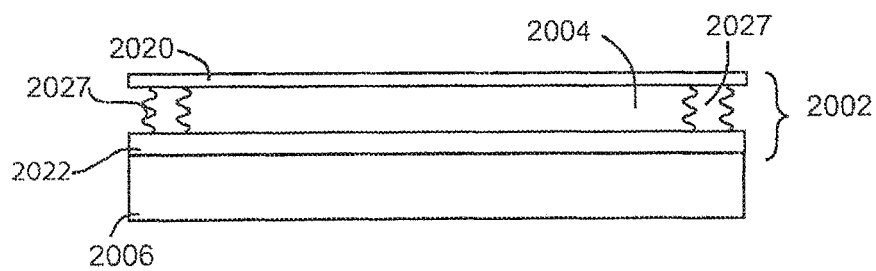
Figure 20C:
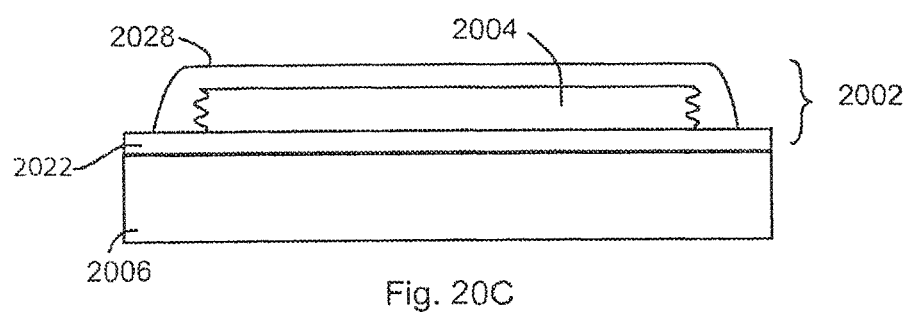
Figure 20D:
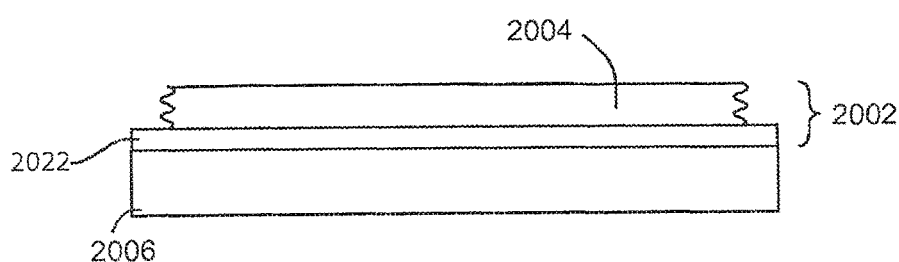

In still other embodiments, as shown in FIGS. 19B and 20B, the QD film comprises an edge seal 1927, 2027, said edge seal comprising a seal material disposed adjacent to the QD phosphor material 1904, 2004 along the perimeter of the QD phosphor material. Suitably, the edge seal comprises a suitable optical adhesive material, such as epoxy. The edge seal can comprise one or more matrix material of the QD phosphor material, including matrix materials described herein. In still other embodiments, as shown in FIGS. 19C and 20C, a seal material 1928, 2028 is formed over the QD phosphor material 1904, 2004, suitably covering the entire top surface and edges of the QD phosphor material. The seal material 1928, 2028 suitably comprises a transparent, non-yellowing optical material, including epoxy or any suitable matrix materials described herein. The seal material can comprise an oxide coating, including materials such as silicon oxide, titanium oxide, or aluminum oxide (e.g., $SiO_2$, $Si_2O_3$, $TiO_2$, or $Al_2O_3$). Suitably, the seal material is both chemically and mechanically compatible with the QD phosphor material. Suitably, the seal material is a durable, flexible material with high mechanical strength. The seal material can be deposited over the QD phosphor material or over one or more barrier materials. Additionally, one or more barrier materials can be disposed over the seal material. Suitably, the seal material is a curable material which can be cured together with the QD phosphor material—e.g., thermally cured or UV cured. In another class of embodiments, as shown in FIGS. 19D and 20D, the QD phosphor material 1904, 2004 itself provides a barrier to environmental conditions. In such embodiments, a top and/or bottom barrier can be excluded from the QD film. In such embodiments, the QDs can be optionally coated with an oxide coating or layer to provide further protection from environmental conditions, as described in more detail above.

As will be understood by persons having ordinary skill in the art, the barriers and seals described herein can be used in any suitable combination, and the barriers and seals can be chosen based on the particular application and desired characteristics of the lighting device.

Light Guide

Figure 21A:
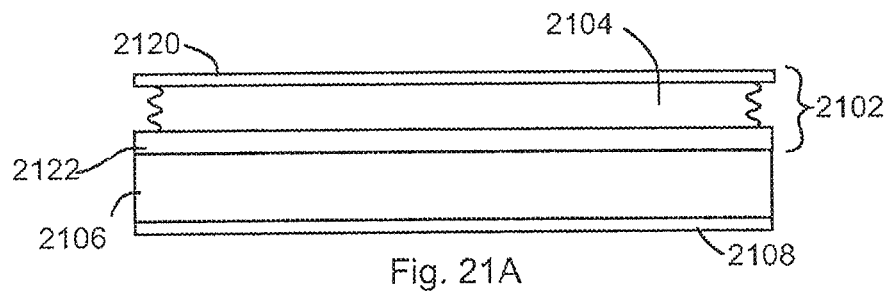
Figure 21B:
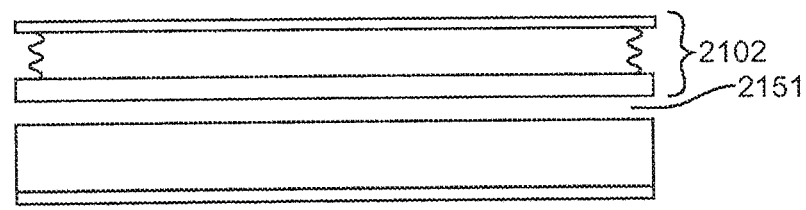
Figure 22A:
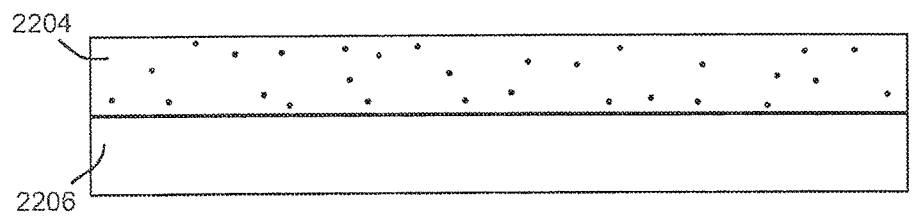
Figure 22B:
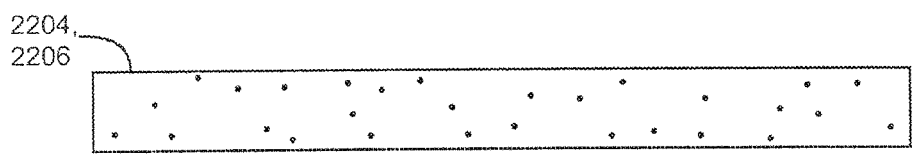
Figure 22C:
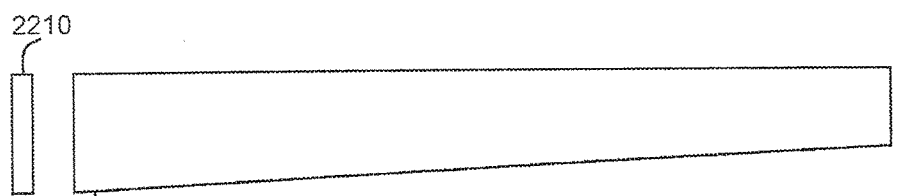
Figure 22D:
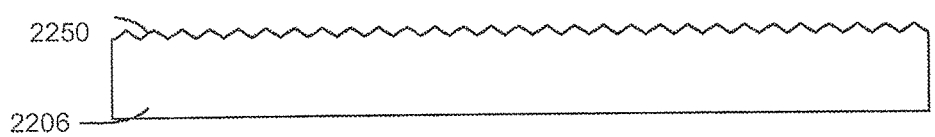
Figure 22E:
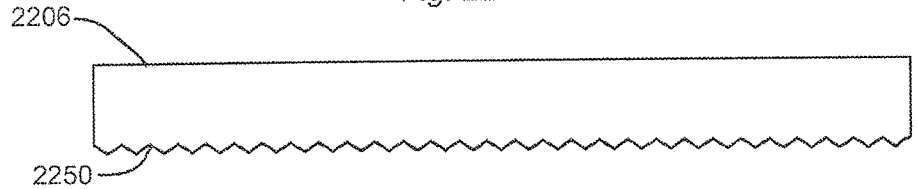
Figure 22F:
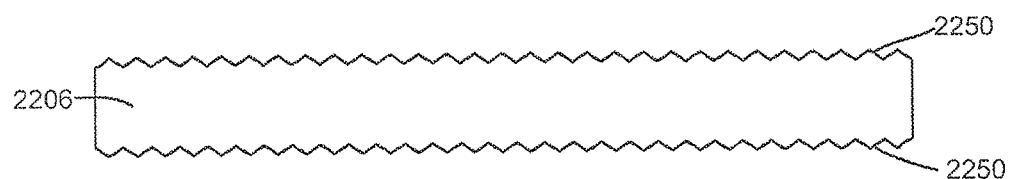
Figure 22G:
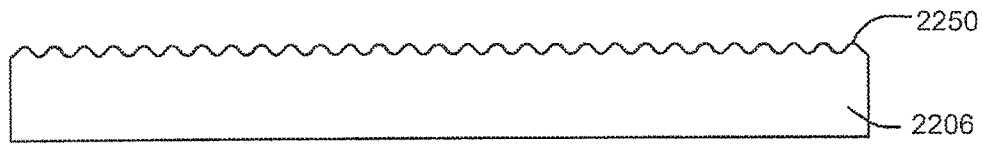
Figure 22H:
Figure 22I:
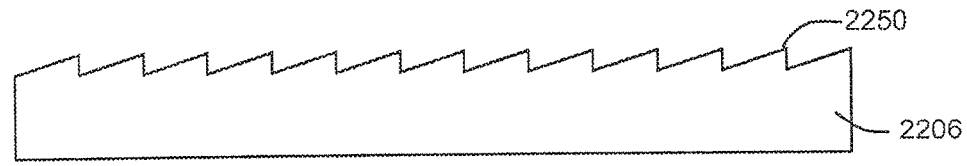
Figure 22J:

The QD film remote phosphor package of the present invention is optically connected to the primary light source, such that the remote phosphor package is in optical communication with the primary light source. In preferred embodiments, the primary light source and the QD film remote phosphor package are each optically coupled to at least one planar waveguide, herein referred to as a light guide panel (LGP), whereby each of the primary and secondary light sources is in optical communication with one another via the LGP, e.g., as shown in FIGS. 6, 7, and 13. The QD film is suitably disposed over or adjacent a LGP, and the LGP is suitably disposed over or adjacent the one or more primary light emitting sources, such as LEDs, which provide primary light to initiate secondary light emission from the phosphor material of the phosphor package. The LGP provides a light transfer medium for light emitted from the primary source to transmit through the LGP to the remote phosphor package, thereby allowing for the primary light to excite the QDs and cause secondary light emission. In another embodiment, the LGP is disposed between the remote phosphor package and the viewing plane of a lighting display, wherein light exiting the remote phosphor package transmits through the LGP to the entire viewing plane of the display surface, whereby the light is seen by a viewer of the display. The LGP can include any suitable non-yellowing optical material which is transparent to primary and secondary light, and can include any suitable LGP known to those of ordinary skill in the art. For example, the LGP can comprise any conventional LGP. Suitable LGP materials comprise polycarbonate (PC), poly methyl methacrylate (PMMA), methyl methacrylate, styrene, acrylic polymer resin, glass, or any suitable LGP materials known in the art. Suitable manufacturing methods for the LGP include injection molding, extrusion, or other suitable embodiments known in the art. In preferred embodiments, the LGP provides uniform primary light emission from the top surface of the LGP, such that primary light entering the QD film is of uniform color and brightness. The LGP can include any thickness or shape known in the art. For example, the LGP thickness can be uniform over the entire LGP surface, as shown in FIGS. 21A and 22A. Alternatively, the LGP can have a wedge-like shape, as shown in FIG. 22C.

In certain embodiments, the QD film remote phosphor package can be a separate element from the LGP, while in other embodiments the remote phosphor package can be wholly or partially integrated with the LGP. In one exemplary embodiment, the phosphor material and the LGP are disposed in a single layer, wherein the phosphor material is embedded in the LGP. In another exemplary embodiment, the QD film is disposed over the LGP, wherein the LGP is a bottom barrier material layer of the QD film. In preferred embodiments, the QD film and the LGP are separate and distinct elements, most preferably wherein excess physical coupling is minimized or eliminated between the LGP and the QD film.

Figure 21C:
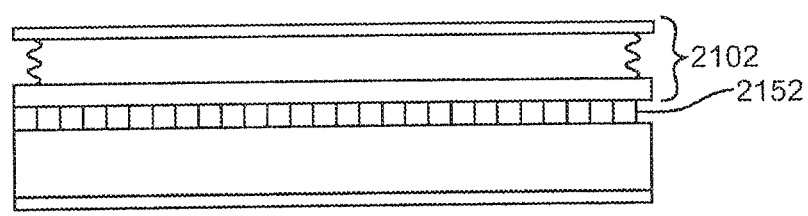
Figure 21D:
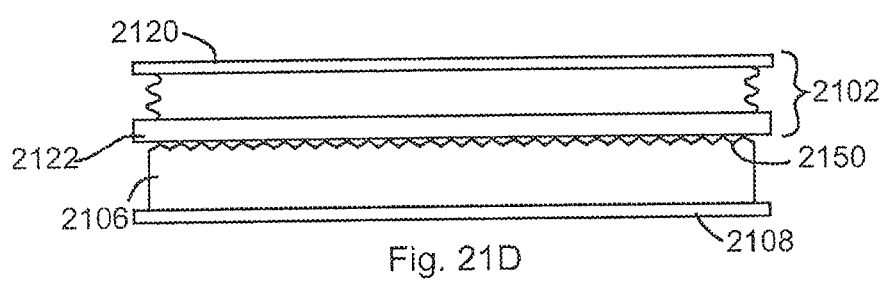
Figure 21E:
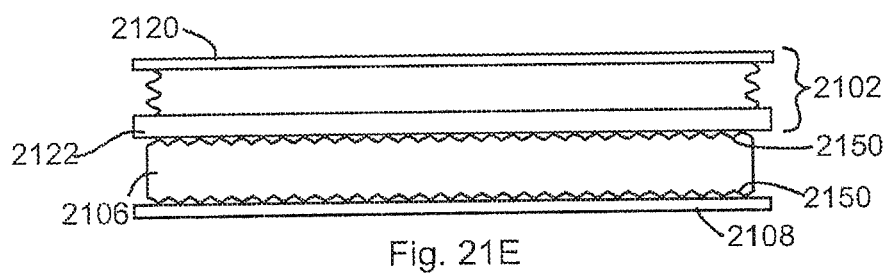
Figure 22K:
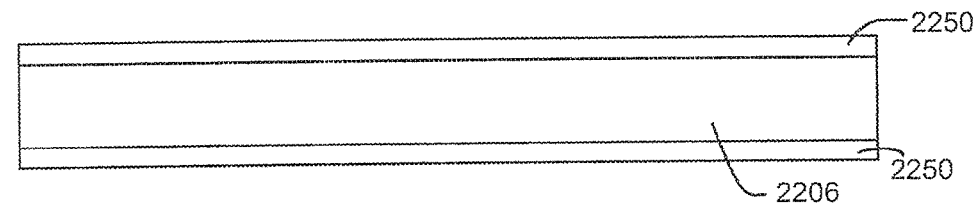

The LGP 2106, 2206, 2306 may comprise features 2150, 2250, 2350 on the top, bottom, or both the top and bottom surfaces of the LGP, as shown in FIGS. 21D, 21E, 22D-22K, 23C, and 23D. The LGP features can be located in a separate layer adjacent the LGP, as shown in FIG. 22K. As shown in the various example embodiments of FIGS. 21-23, the LGP features 2150, 2250, 2350 can comprise any suitable texture or pattern, including prisms, pitches, lenses, bumps, wavy features, scratches, any of the features described above in relation to the barrier layers, or any suitable features known in the art. Suitably, the features can include light scattering or diffuser features—e.g., to scatter light in the LGP or QD film, or to diffuse light transmitting from the top of the LGP to optically balance imperfections in the LGP or the reflector film 2108 disposed below the LGP. Suitably, the features can comprise reflecting features—e.g., at the bottom of the LGP to reflect light away from the bottom surface of the LGP and toward the top surface of the LGP. Suitably, the features can comprise brightness-enhancing features to enhance the brightness of light emitted by the BLU and/or promote recycling of primary light back into the QD phosphor material to enhance secondary light emission. Suitably, the LGP features can include anti-coupling feature—e.g., to reduce optical coupling or prevent cladding between the LGP and the QD film or other layers adjacent the LGP. Suitably, the LGP features can have a size of about 0.5-1 μm in height, and each of the features can be separated by a distance of about 0.5-1 μm. The spacers 2152 and anti-coupling features 2150 can include any suitable shape, size, and material. Suitably, the features comprise the same material as the LGP, and the features can be formed directly in or on the LGP. The LGP features can be formed using any methods known in the art, including stamping, laser etching, chemical etching, injection molding, and extrusion. As will be understood by persons of ordinary skill in the art, any suitable combination of such LGP features can be employed.

In certain embodiments, the LGP can act as a bottom barrier layer for the QD phosphor material, as shown in FIG. 22A, and suitable LGP-barrier layers will include any optically transparent, non-yellowing, oxygen- and moisture-impermeable material which is a sufficient temperature barrier for the QDs. However, the LGP and QD film are preferably not in intimate contact with one another in embodiments where the LGP and QD film are distinct layers. In preferred embodiments, the QD film and the LGP are not in intimate contact, such that an optical cladding effect between the QD film and the LGP is eliminated or minimized, whereby brightness uniformity is maintained over the display surface. In one example embodiment shown in FIG. 21B, a gap 2151, such as an air gap, exists between the LGP 2106 and the QD film 2102. In another embodiment, as shown in FIG. 21C, spacers 2152 provide a separation distance between the QD film and the LGP. Suitably, the LGP and QD film are separated or offset by a distance of about 0.5-1 µm. In another embodiment, the LGP comprises anti-coupling or anti-cladding features 2150 to prevent excess or intimate physical coupling between the LGP and the QD film. Suitably, the features 2150, 2250, 2350 or spacers 2152 prevent excess physical coupling between the LGP and adjacent layers of the BLU, particularly the QD film. Suitably, the anti-cladding or anti-coupling LGP features can have a size of about 0.5-1 µm in height and width, and each of the features can be separated by a distance of about 0.5-1 µm.

In another example embodiment, as shown in FIGS. 21D, 22D-22I, 23C, and 23D, the LGP comprises brightness-enhancing features 2150, 2250, 2350, such as prisms, lenses, domes, or pitches; on the top and/or bottom surface of the LGP. Suitably, the brightness-enhancing features comprises brightness-enhancing features on the top surface of the LGP. The brightness-enhancing LGP features can include conventional brightness-enhancing features known in the art, including those described herein. For example, the brightness-enhancing features can include pitches or prisms having a first pitch angle, additional pitches or prisms having a second pitch angle, and so on.

In another example embodiment, the LGP comprises scattering or diffuser features to scatter light in the LGP or the QD film, or to scatter light transmitting from the top of the LGP to optically balance imperfections in the LGP or the reflector film. In a preferred embodiment, the LGP comprises scattering features on the top, bottom, or top and bottom surfaces of the LGP, whereby the features promote scattering in the QD film to increase the optical path length of primary light in the QD phosphor material of the QD film.

In still other embodiments, the LGP comprises reflecting features, suitably at the bottom surface of the LGP, whereby the reflecting features reflect light away from the bottom surface of the LGP and toward the top surface of the LGP.

Figure 23A:
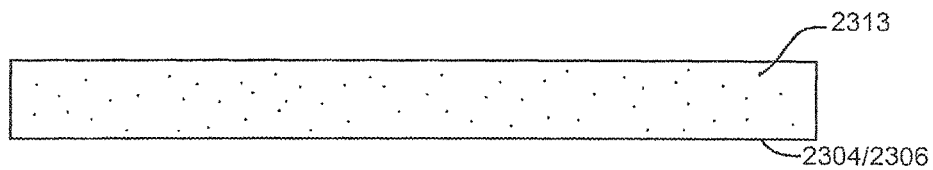
Figure 23B:
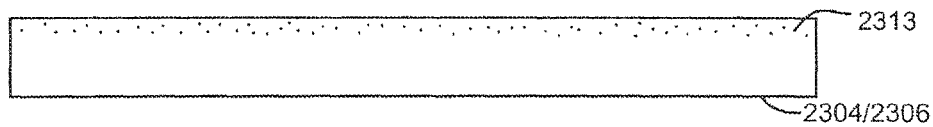
Figure 23C:
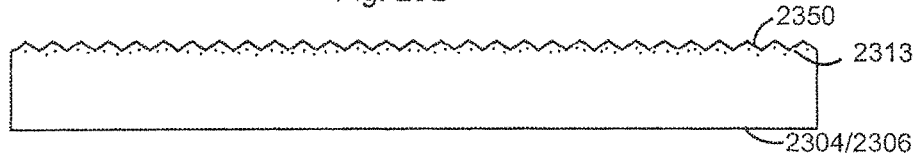
Figure 23D:
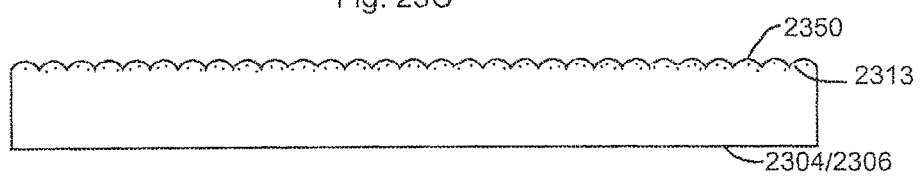
Figure 23E:
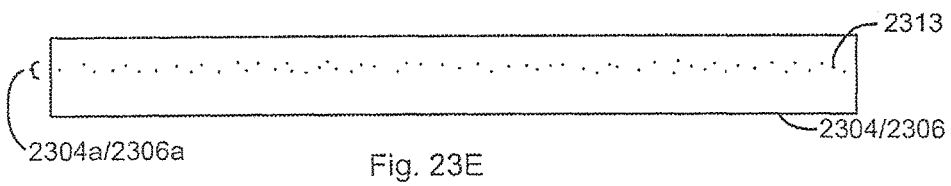
Figure 23F:
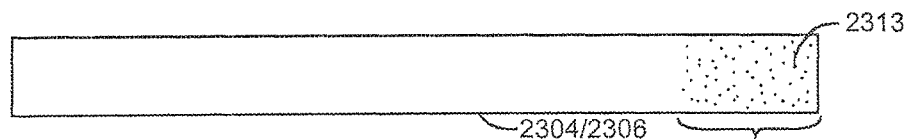
Figure 23G:
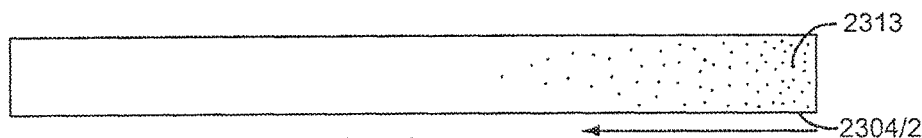
Figure 23H:
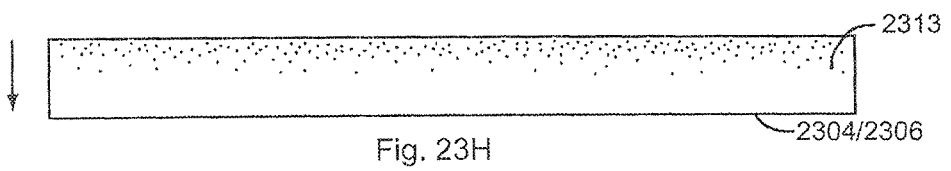

In certain embodiments, as shown in FIGS. 22B, 23A-23H, and 26A-H, the LGP comprises at least one population of secondary light-emitting QDs 2313, 2514 embedded in the LGP, such that the LGP and the QD film are integrated into the same layer. The QDs 2313 can be dispersed uniformly throughout the LGP 2306, as shown in FIG. 23A. Alternatively, the QDs can be disposed primarily or solely in a particular portion, region, or layer of the LGP, as shown in FIGS. 23B-23H. The QDs can be disposed in a top portion, region, or layer of the LGP, as shown in FIGS. 23B-23D and 23H, and the QDs can be disposed primarily in or near the LGP features 2350, as shown in FIGS. 23C and 23D. As shown in FIG. 23E, the QDs can be disposed within a middle layer or region 2306 of the LGP. As shown in FIG. 23F, the QDs can be disposed within an end portion or region 2306a of the LGP—e.g., at an end portion or region located opposite the primary light sources, or at an end portion or region located closest to the primary light sources. As shown in FIGS. 23G and 23H, the QDs can have a gradient density throughout the LGP—e.g., the QD concentration can increase toward the top, bottom, or one or more edges of the LGP.

In still other embodiments, the LGP can comprise scattering features, such as scattering beads 2440, 2540, embedded in the LGP, as shown in FIGS. 24 and 25. As shown in FIGS. 24A-H, the scattering beads 2440 can be dispersed uniformly throughout the LGP 2406, disposed primarily or solely in a particular portion, region, or layer of the LGP—such as a top, bottom, edge, perimeter, or middle portion, layer, or region of the LGP; or disposed such that the scattering beads have a gradient density throughout the LGP.

In another class of embodiments, the LGP comprises both secondary light-emitting QDs and scattering features, such as scattering beads. The LGP can comprise any suitable arrangement of QDs and scattering beads dispersed therein. Example embodiments are shown in FIGS. 25A-H. However, as will be appreciated by persons of ordinary skill in the art, the present invention encompasses any suitable arrangement, including those disclosed herein and any combination thereof. The arrangement of QDs and/or scattering features in the LGP should be chosen depending on the particular lighting method and device requirements, and these arrangements are not limited to the specific example embodiments shown or discussed herein.

Reflective Film

In preferred embodiments, the lighting device of the present invention comprises reflective features to reflect primary light toward the QD phosphor material. Preferably, the QD film BLU of the present invention comprises a reflective film disposed at the bottom of the LGP or beneath the LGP, such that the LGP waveguide 606 is disposed between the QD film 602 and the reflective film 608, as shown in the example embodiment of FIGS. 6A and 6B and the conventional BLU of FIG. 5 showing reflector film 508. The reflective film can comprise any suitable material, such as a reflective mirror, a film of reflector particles, a reflective metal film, or any suitable conventional reflectors. However, the reflective film 608 is preferably a white film. In certain embodiments, the reflector film can comprise additional functionality or features, such as scattering, diffuser, or brightness-enhancing features, including those features discussed above with respect to the LGP and barrier layers and FIGS. 21-26.

In another embodiment, as shown in FIG. 6C, the QD phosphor material layer 604 can be disposed directly above the reflective film 608. The reflective film 608 can form the bottom barrier layer 622 of the QD film, whereby the film 608, 622 forms a combination barrier film and reflective film. As shown in FIG. 6C, the QD film 602 includes a top barrier layer 620 between the QD phosphor layer 604 and the LGP 606. Optionally, the device can include a diffuser film 605 which is separate from the QD phosphor layer 604. For example, as shown FIG. 6C, the diffuser film 605 is disposed above the LGP 606, e.g., between the LGP 606 and the BEF layers 601. The bottom reflective barrier film 608, 622 can include multiple layers having different properties. In one such embodiment (not shown), the bottom reflective barrier film can include one or more plastic or polymer barrier film layers and one or more reflective material layers.

For example, the bottom reflective barrier film can include at least a first plastic/polymer barrier layer disposed directly adjacent to and in direct physical contact with the QD phosphor layer 604, and a reflective film layer, e.g., a reflective metal layer such as an aluminum film layer, beneath the plastic barrier layer, whereby the plastic/polymer barrier film is disposed between the QD phosphor layer 604 and the reflective film layer. Optionally, the bottom reflective barrier film can further include at least a second polymer/plastic film layer disposed beneath the reflective film layer, whereby the reflective film layer is disposed between the first and second polymer/plastic layers in the bottom reflective film stack. The one or more plastic/polymer layers can prevent scratching of or damage to the reflective film layer and improve adhesion between the reflective film layer and the QD phosphor layer 604 or other layers in the lighting device.

Diffuser Film

In certain embodiments of the present invention, the lighting device comprises a diffuser film, which is distinct from and supplemental to the scattering features described herein, such as the diffuser film 504 shown in the conventional LCD 500 of FIG. 5. The diffuser film can include any diffuser film known in the art, including gain diffuser films, and can be disposed above or below the LGP, above or below the QD film of the present invention, or above or below the one or more BEFs or other optical films of the BLU. In preferred embodiments, the QD film (or other features of the present invention) eliminates the need for a conventional diffuser film in the BLU, thereby minimizing the thickness of the lighting device. As discussed in more detail below, the QD film can include one or more scattering or diffuser features associated therewith, which can serve the purpose of traditional diffusers in addition to increasing secondary emission of QDs in the QD film.

In other embodiments, the device can include one or more diffuser films in addition to or alternative to the QD phosphor film layer. For example, the BLU can include one or two diffuser films above the QD film.

Brightness Enhancement

In preferred embodiments of the present invention, the BLU comprises one or more brightness-enhancing features or brightness-enhancing films. As referred to herein, "brightness enhancement films" (BEFs) and "brightness enhancement features" are films or features which reflect a portion of light back toward the direction from which the light was transmitted. Light traveling toward the BEF or brightness enhancement feature will be transmitted through the film or feature, depending on the angle at which the light is incident upon the film or features. For example, as shown in FIGS. 16C-16D, the brightness enhancement features 1650 of BEFs 1601 comprise prisms or prism grooves formed in parallel on the top surface of the films 1601. Light traveling upward from the LGP 1606 will transmit through the BEFs if the light is normal or perpendicular to the planar films 1601. However, such light will be reflected downward toward the LGP if the light has a higher angle. The BEFs and brightness enhancement features can be chosen to have multiple reflection angles for light of different angles, and such features and angles can be chosen to achieve a desired brightness or light "recycling." For example, a first polarizer film (or BEF) can reflect light having an angle of about 15-25 degrees from the plane perpendicular to the film (i.e., 65-75 degrees from the normal), and a second film can reflect light having an angle of about 25-35 degrees from the perpendicular plane. The BEFs can be disposed with the enhancement features 1650 disposed in opposite directions, as shown in the films 1620a, 1620b of FIG. 16D. Additional BEFs can also be included. The use of multiple-angle and multiple-direction reflection features results in "solid-angle recycling," which recycles light reaching the BEFs from various directions. In preferred embodiments of the present invention, the angles or pitches of the one or more BEFs will be chosen to reflect a significant portion of primary light toward the QD film, such that the QD quantity can be greatly reduced to achieve a desired secondary light emission from the QDs.

In certain embodiments, one or more barrier layers can have brightness enhancement features formed thereon or therein, whereby the one or more barrier layers functions as both a barrier and a BEF. The BLU can comprise any of the brightness-enhancing features and BEFs described herein, including those features and films discussed above with respect to the LGP and QD film barrier layers and FIGS. 16 and 21-26. In preferred embodiments, the lighting device comprises at least two or more BEFs 601, at least one LGP 606, and a QD film remote phosphor package 602 disposed between the LGP 606 and the BEFs 601, as shown in FIGS. 6A and 6B, or between the bottom reflective film 608 and the BEFs 601, as shown in FIG. 6C. In additional embodiments, the LGP and/or one or more barrier layers comprises a BEF or brightness-enhancing features—e.g., as discussed above with respect to FIGS. 16 and 21-26. In preferred embodiments, the QD BLU comprises at least one BEF, more preferably at least two BEFs. Suitably, the BLU can comprise at least three BEFs, wherein at least one BEF comprises a reflective polarizer BEF (i.e., a DBEF). The brightness-enhancing features and BEFs can include polarizers, reflective polarizers, light extraction features, light recycling features, or any brightness-enhancing features known in the art. The BEFs and brightness-enhancing features 1650 can include conventional BEFs. For example, the BEFs can include a first layer having pitches or prisms having a first pitch angle, and at least a second layer having pitches or prisms having a second pitch angle. In still further embodiments, the BLU can include a third BEF layer having pitches or prisms having a third pitch angle. Suitable BEFs include conventional BEFs, including BEFs available from 3M™, including the 3M™ Vikuiti™ brightness enhancement films.

In certain embodiments, the one or more BEFs can be one or more separate or distinct layers from the QD film and the LGP. In other embodiments, as described above, at least one of the LGP or barrier layers comprises at least one BEF. In still other embodiments, the QDs are disposed in one or more BEFs, such as a bottom, middle, or top BEF, such that the QD film and the one or more BEFs are wholly or partially integrated in the same layer. In certain embodiments, the QD phosphor material can be formed into an appropriate BEF. For example, the QD phosphor material layer can comprise brightness-enhancing features at the top and/or bottom surfaces of the QD phosphor material layer. In certain embodiments, the QD BLU comprises a first population of QDs (e.g., red light emitting QDs) disposed in the QD phosphor material layer, a second population of QDs (e.g., green light emitting QDs) disposed in a first BEF disposed above the QD phosphor material layer, and suitably at least a second BEF disposed above the first BEF. In certain embodiments, the QD BLU comprises at least two BEFs, wherein a first BEF comprises a first population of QDs (e.g., red light emitting QDs), and a second BEF comprises a second population of QDs (e.g., green light emitting QDs).

In preferred embodiments, the one or more BEFs are chosen to reflect or refract a high percentage of light back toward the QD phosphor material layer, whereby the primary light recycling is increased, and the optical path length of primary light is further increased in the QD phosphor material.

The QD-comprising BEFs can be formed using conventional BEF methods and materials such that the BEF material is the host matrix material of the QD phosphor material, or the BEF can comprise any suitable QD matrix material, including any suitable matrix materials mentioned herein.

Inter-Element Media Materials

The QD lighting device of the present invention can comprise one or more medium materials between adjacent elements of the lighting device. The device can include one or more medium material disposed between any of the adjacent elements in the device, including the primary light sources and the LGP, the LGP and the QD film, between different layers or regions within the QD phosphor material, the QD phosphor material and one or more barrier layers, the QD phosphor material and the LGP, the QD phosphor material and one or more BEF, diffuser, reflector, or other features; between multiple barrier layers, or between any other elements of the lighting device. The one or more media can include any suitable materials, including, but not limited to, a vacuum, air, gas, optical materials, adhesives, optical adhesives, glass, polymers, solids, liquids, gels, cured materials, optical coupling materials, index-matching or index-mismatching materials, index-gradient materials, cladding or anti-cladding materials, spacers, epoxy, silica gel, silicones, any matrix materials described herein, brightness-enhancing materials, scattering or diffuser materials, reflective or anti-reflective materials, wavelength-selective materials, wavelength-selective anti-reflective materials, color filters, or other suitable media known in the art. Suitable media materials include optically transparent, non-yellowing, pressure-sensitive optical adhesives. Suitable materials include silicones, silicone gels, silica gel, epoxies (e.g., Loctite™ Epoxy E-30CL), acrylates (e.g., 3M™ Adhesive 2175), and matrix materials mentioned herein. The one or more media materials can be applied as a curable gel or liquid and cured during or after deposition, or pre-formed and pre-cured prior to deposition. Suitable curing methods include UV curing, thermal curing, chemical curing, or other suitable curing methods known in the art. Suitably, index-matching media materials can be chosen to minimize optical losses between elements of the lighting device.

Scattering

QD-based phosphors and related systems exhibit unique complexities compared to traditional lighting systems. For example, most traditional lighting systems involving LED packages require highly directional light from the source LED. However, in certain embodiments of the present invention, a highly diffuse and primary light source is preferred to increase the primary light path in the QD phosphor material. As illustrated in FIG. 8, QDs naturally emit light isotropically, meaning that the secondary light 816 produced by each QD 813 will emit in all directions from the QD surface. Quite differently, a typical source LED package emits primary light 814 in a more unidirectional or Lambertian manner, rather than isotropically. As a result, the respective radiation patterns emitted by the LED primary light source and the QD phosphor material will be different. These differences in radiation patterns contribute to non-uniformity of color and brightness in a lighting device (e.g., a display) encompassing the QD phosphor. The present invention includes certain methods and devices which correct these non-uniformities in color and brightness. Additionally, the unidirectional emission pattern of the primary light source limits the natural path length of the primary light in the BLU. The present invention includes methods and devices for scattering light, such as primary light, to increase the path length of primary light in the QD phosphor material of the QD film, thereby increasing secondary light emission and efficiency.

The present invention includes methods and devices for manipulation of primary light to increase the optical path length of primary light in a QD light conversion film. In preferred embodiments, the manipulation of primary light includes increasing scattering of the primary light in the QD phosphor material of the QD film. As used to herein, "scattering" refers to the deflection or redirection of light to change its directional trajectory to a more isotropic or diffuse (i.e., less Lambertion or unidirectional) emission path upon incidence of one or more scattering features. In preferred embodiments, the mechanism of scattering is primarily due to Mie scattering and the difference in the index of refraction of the scattering features and the surrounding material, such as the QD phosphor material. An illustration of Mie scattering is shown in FIGS. 27A and 27B, which depicts the scattering of unidirectional primary light 2714a to more diffuse primary light 2714b for different-sized scattering beads 2740a, 2740b. In certain embodiments, the light scattering mechanism of the scattering features can comprise Mie scattering, refraction, reflection, diffuse refraction or reflection, sub-surface refraction or reflection, diffuse transmittance, diffraction, or any suitable combination thereof. Notably, the QD film comprising scattering features provides a combination scattering/diffuser film layer and QD light conversion film layer, thereby eliminating the need for separate phosphor and diffuser films in the display BLU.

As will be understood by persons having ordinary skill in the art, the scattering mechanisms will depend on a number of factors, including the characteristics of the primary light, matrix materials, and the scattering features. For example, the scattering induced by the scattering features will depend on the wavelength(s), direction, and other properties of light being scattered; the refractive indices of the materials, the index change between the features and the surrounding matrix, any index change within the particle, the molecular structure and grain boundary of the scattering features; the scattering feature dimensions, density, volume, shape, surface structure, location, and orientation; and more. Although some absorption by the scattering features can be tolerated, preferred scattering materials will exhibit zero or minimal light absorbance to allow for highly elastic scattering and efficiency. Dynamic light scattering techniques, such as those known in the art, can be used to determine the ideal characteristics for the scattering features in a particular lighting device of the present invention. Trial and error methods may also be used to determine the best possible configuration for a particular lighting device embodiment. Additionally, theoretical calculations can also be used to approximate scattering. For example, Mie Theory calculations known in the art can be used to describe the scattering process in embodiments comprising a dispersion of dielectric spheres similar in size to the wavelength of scattered light.

In preferred embodiments of the present invention, primary light is selectively scattered to change the directionality of the primary light, resulting in an increased probability of QD excitation and secondary light emission, and thus also decreasing the amount of primary light that passes through the remote phosphor material without being absorbed by the QDs. In a preferred class of embodiments, the scattering features comprise one or more scattering features having a refractive index different than that of the host matrix material at the interface between the scattering feature and the host matrix material. For example, the scattering features can comprise scattering domains 1330b, as shown in FIG. 13B. The scattering domains are spatial regions comprising a material having refractive index different than that of another matrix material, whereby primary light is redirected in the QD phosphor material. In a preferred embodiment, as depicted in FIG. 27C, the scattering features comprise scattering particles 2740 are dispersed throughout the QD phosphor material 2704. Upon entering the QD phosphor material, primary light 2714a will either transmit completely through the remote phosphor material, be scattered by one or more scattering particles, and/or be absorbed by a QD 2713 and cause secondary light emission 2716. In this manner, less QDs are required to achieve a desired secondary emission, since changing the directionality of the incoming primary light will increase the probability of QD absorption. In additional embodiments, the scattering features can comprise scattering voids, such as air bubbles or gaps in the QD phosphor material. In still other embodiments, the one or more barrier layers can include scattering features to increase scattering in the QD phosphor material, as described above regarding the barrier layer features and FIGS. 15B-15I. Suitably, the QD film comprises at least one barrier layer disposed below the QD phosphor material, wherein the at least one barrier layer comprises scattering features 1550, whereby the scattering features scatter primary light transmitted into the QD phosphor material. In yet another class of embodiments, the QD film comprises at least one population of primary light emitting phosphors in the QD film—e.g., QDs which emit additional primary light, such as blue light, such that the isotropic primary blue light emitted by the QDs is absorbed by the secondary light emitting QDs in the QD film. In one example embodiment, the scattering features comprise blue light emitting QDs dispersed in the QD phosphor material. The blue light emitting QDs can be dispersed evenly throughout the QD phosphor material, the blue QDs can be disposed below the secondary light emitting QDs in the QD phosphor material, or at least a portion of the blue QDs can be disposed below at least a portion of the secondary light emitting QDs (e.g., the red and green light emitting QDs).

The most important characteristics for controlling scattering by the scattering particles will include the refractive index, size, volume, and density of the scattering particles. As will be understood by persons having ordinary skill in the art, the scattering bead characteristics can be tuned to achieve ideal scattering in the QD phosphor material.

Suitable scattering particles comprise any suitable optical materials known in the art: alumina, sapphire, air or other gas, hollow beads or particles such as air- or gas-filled materials (e.g., air/gas-filled glass or polymer); polymers, including PS, PC, PMMA, acrylic, methyl methacrylate, styrene, melamine resin, formaldehyde resin, or a melamine and formaldehyde resin (e.g., Epostar™ S12 melamine-formaldehyde resin beads, available from Nippon Shokubai Co., Ltd.); and any suitable combination thereof. Preferred scattering particle materials include glass, such as high-refractive index optical glass, silica glass or borosilicate glass. In a preferred embodiment, the QD phosphor material comprises APS-coated or PEI-coated QDs and epoxy, and the scattering particles comprise silica or borosilicate. Preferred scattering particles comprise one or more optical materials having a refractive index higher than that of the surrounding material.

In certain embodiments, the scattering particles comprise a first plurality of scattering particles having a first index of refraction and a second plurality of scattering particles having a second index of refraction which is different than the first index of refraction. For example, the scattering particles can include a first plurality of silica beads having a refractive index of about 1.43 and a second plurality of melamine-formaldehyde resin beads (e.g., Epostar™ S12 melamine-formaldehyde resin beads, available from Nippon Shokubai Co., Ltd.) having a refractive index of about 1.66. In one example embodiment, the silica beads can have a diameter of about 1 μm, and the melamine-formaldehyde resin beads can have a diameter of about 1.5 μm.

Preferably, the scattering features comprise a monodisperse population of spherical particles having a smooth surface. Suitably, the scattering particles can have a maximum dimension which is not greater than about 4 times the wavelength of the preferentially scattered light—e.g., the primary light; preferably blue primary light. Preferably, the scattering particles have a maximum dimension which is similar to the wavelength of the preferentially scattered light—e.g., the primary light; preferably blue primary light. The scattering particles can be spherical particles having a diameter of less than 5 μm. Preferably, the primary light comprises blue light and the scattering particles have a diameter of about 0.5 μm to about 2 μm, 0.5 μm to 2 μm, about 0.5 μm to about 1.5 μm, 0.5 μm to 1.5 μm, about 0.5 μm to about 1 μm, 0.5 μm to 1 μm, 0.5 μm, about 0.5 μm, 0.75 μm, about 0.75 μm, 1.5 μm, about 1.5 μm, 1.75 μm, about 1.75 μm, 2 μm, or about 2 μm. Most preferably, the scattering particles have a diameter of 1 μm or about 1 μm. Preferably, the scattering particles comprise a monodisperse population of spherical particles, which are preferably embedded or disposed within the QD phosphor material.

The scattering particles can have any suitable concentration in the QD phosphor material. Preferably, the scattering particles have a density of about 2 g/cm³, or greater. In preferred embodiments, the material density of the scattering beads will be chosen to optimize dispersion in the QD phosphor material. For example, the material density of the scattering particles can be higher than the QD phosphor material to promote settling toward the bottom of the QD phosphor material. Preferably, the material density of the scattering particles is similar to the QD phosphor material to prevent settling toward the bottom of the QD phosphor material prior to curing. The concentration of scattering particles can be about 1% to about 15% by volume, or about 2% to about 30% by weight, depending on the characteristics of the scattering particles and the QD phosphor material. Suitably, the scattering particles comprise spherical beads comprising silica, borosilicate, or polystyrene, preferably silica or borosilicate, most preferably silica; and having a diameter of about 1-2 μm, most preferably 1 μm or about 1 μm. Preferably, the QD phosphor material comprises spherical beads having a diameter of 1 μm, or about 1 μm, wherein the concentration of beads is about 1-15% by volume or about 2-30% by weight, more preferably about 2.5-10% by volume or about 5-20% by weight, most preferably about 5-10% by volume or about 10-20% by weight. As will be understood by persons having ordinary skill in the art, the QD phosphor material volume or concentration should be adjusted for the volume of QD phosphor material displaced by the scattering beads.

In other embodiments, the scattering features comprise surface features formed on one or more surface of one or more of the LGP and barrier layers. For example, the scattering features can comprise micro-textures, random micro-textured patterns, prisms, pitches, pyramids, grooves, lenses, bumps, waves, scratches, domes, or the like, including any suitable features mentioned herein, including those mentioned above in regards to FIGS. 15-16 and 21-22. In any of the embodiments mentioned herein, the scattering features preferably have a size on the order of less than 5 μm—e.g., a size of about 5 μm or less, about 2 μm or less, about 1.5 μm or less, about 1 μm or less, or about 0.5 μm or less.

The present invention relates to a QD light conversion film which uses an unexpectedly low concentration of quantum dots. In one experimental example, a QD film was formed in an inert environment using Loctite™ epoxy E-30CL, whereby QDs embedded in APS particles were mixed into the epoxy to form a transparent two-phase system upon curing the QD-APS-epoxy emulsion into a 250 μm thick layer. It would normally be expected that an optical density of about 0.5 would be required to achieve a proper white point using red and green phosphors that rely on blue LED primary light transmission to cover the NTSC color gamut triangle (shown in FIG. 3). For example, this is the case in a QR remote phosphor package. However, it was discovered, much to the surprise of the inventors, that the QD film according to one embodiment of present invention resulted in a drop in required QD concentration of about 10-25×. This large reduction in optical density of the QR phosphor material makes the concept of a film feasible and cost-effective.

In one experimental example, a QD film was made in an inert environment using Loctite™ epoxy E-30CL, whereby QDs embedded in APS particles were mixed into the epoxy to form a transparent two-phase system upon curing the QD-APS-epoxy emulsion into a 250 μm film with an optical density of 0.05. The film was placed on top of a light guide in a cell phone display, and almost no green or red light was detected. Another identical formulation was made, and 5% by volume 2 μm silica beads were added. Due to the large refractive index difference between the epoxy (1.52) and the silica beads (1.42), the display with the QD film exhibited an idea white point and increased brightness.

| Experimental Results | |
|---|---|
| Without Scattering Particles: | With Scattering Particles: |
| CIE x = 0.201 | CIE x = 0.300 |
| CIE y = 0.115 | CIE y = 0.280 |
| L = 2660 nits | L = 5020 nits |

In additional experimental examples, a QD film having scattering beads was compared to a QR capillary remote phosphor package. The QD film allowed for QD reductions of 15× and 25× compared to QR phosphor packages in the same mobile phone and laptop devices, as well as improved white point and color uniformity, increased brightness, less blue leakage, and reduced temperature of the QD phosphor package.

Multiple arrangements of the scattering particles can achieve the beneficial effects provided by the present invention. For example, as shown in FIGS. 24A, 25A, 27C, and 28A-28F, the scattering particles are preferably disposed within the same layer or medium as the QDs. In one preferred class of embodiments, the QD film comprises at least one population of QDs and at least one population of scattering particles, wherein at least a first portion of the scattering particles are disposed below at least a first portion of the QDs, such that the first portion of scattering particles are closer in proximity to the incident primary light than the first portion of QDs. Most preferably, the scattering particles are dispersed uniformly (i.e., evenly or homogeneously) throughout the QD phosphor material in a colloidal fashion. The scattering beads can be sonicated prior to deposition in order to promote even dispersion within the QD phosphor material.

As shown in FIGS. 24B-24H and 25B-25I, the scattering particles 2440, 2540 can be disposed more predominantly in particular regions of the QD phosphor material 2404, 2505, such as toward the top, middle, bottom, or edges of the QD phosphor material, or any suitable combination thereof. The scattering particles can be closer or further from the incident surface of the primary light. The scattering particles can have a gradient density, increasing or decreasing from top to bottom, bottom to top, one or more edges, or any other location within the QD phosphor material 2404, 2504. In embodiments having multiple QD phosphor material layers, as shown in FIGS. 26B-26G, the scattering particles 2640 can be dispersed within one or more QD phosphor material layers of multiple QD phosphor material layers 2604a, 2604b, as shown in FIGS. 26D-26E, or between multiple such layers, as shown in FIG. 26F-26G. The scattering particles can be embedded in one or more matrix materials, as shown in FIGS. 26D-26F, or deposited without a matrix material, as shown in FIG. 26G. The different QD phosphor layers can have differing arrangements or characteristics of scattering particles. For example, the different QD phosphor layers can have different scattering particle characteristics. For example, scattering particle populations 2640a and 2640b, shown in FIG. 26D, can have different sizes, materials, refractive indices, material densities, concentrations, quantities, gradients, or arrangements. For example, the multiple QD phosphor layers can comprise any combination of different layers described above regarding FIGS. 23, 24, and 25. Preferably, the scattering particles are disposed in the same layer as each population of QDs so as to maximize the multi-directional dispersion of primary light within each QD remote phosphor layer comprising QDs, and thus maximize the probability of absorption by the QDs. While only one, two, or three QD phosphor material layers are shown in FIG. 26, the QD film can comprise any suitable number of QD phosphor material layers. The multiple layers can be distinct from one another, or merged as a single QD phosphor material layer.

Figure 29A:
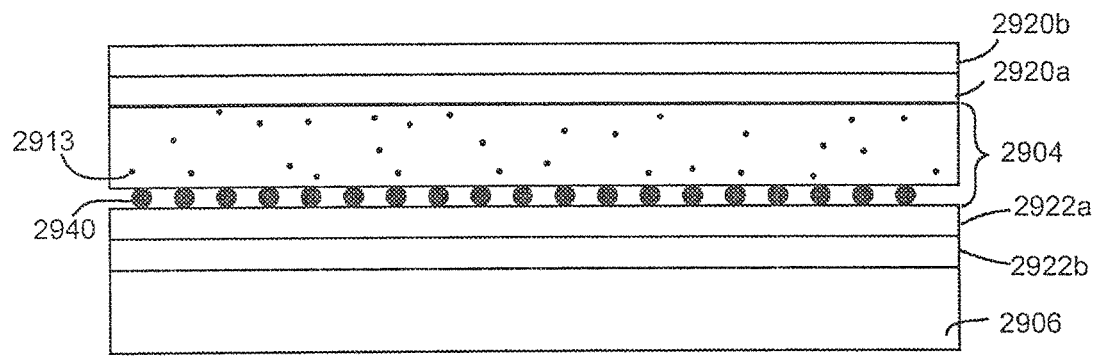
Figure 29B:
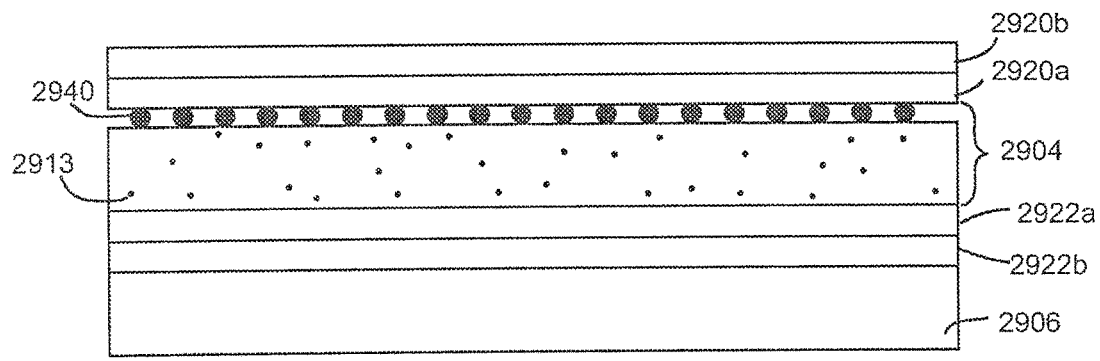
Figure 29C:
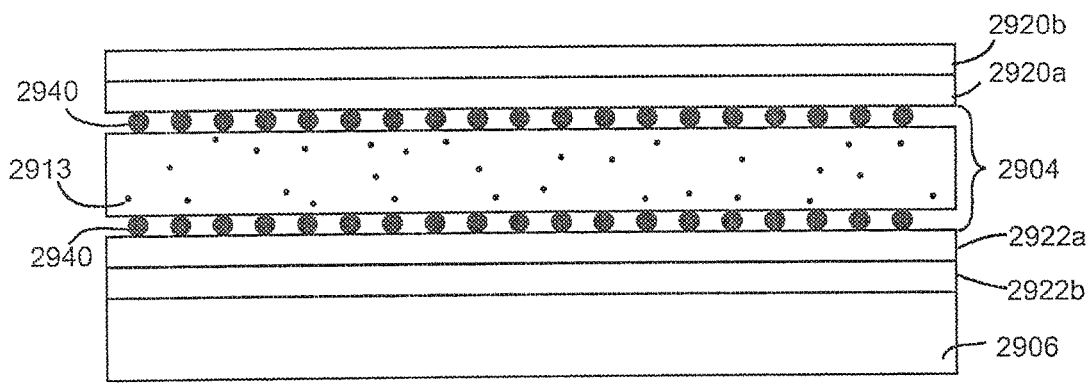
Figure 30A:
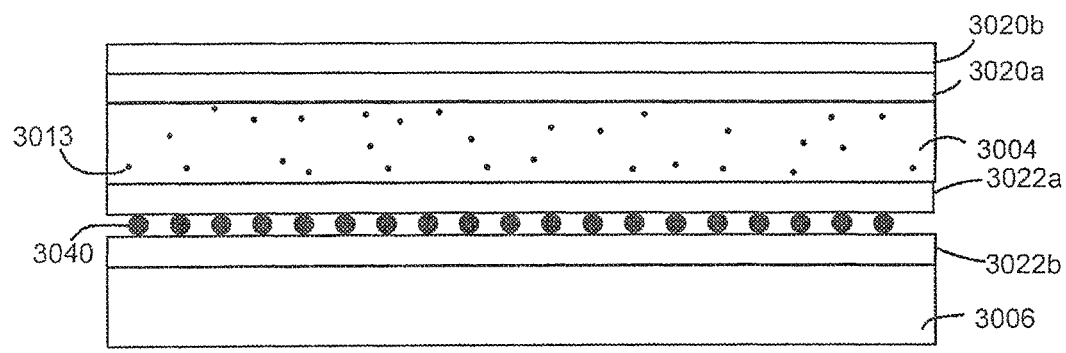
Figure 30B:
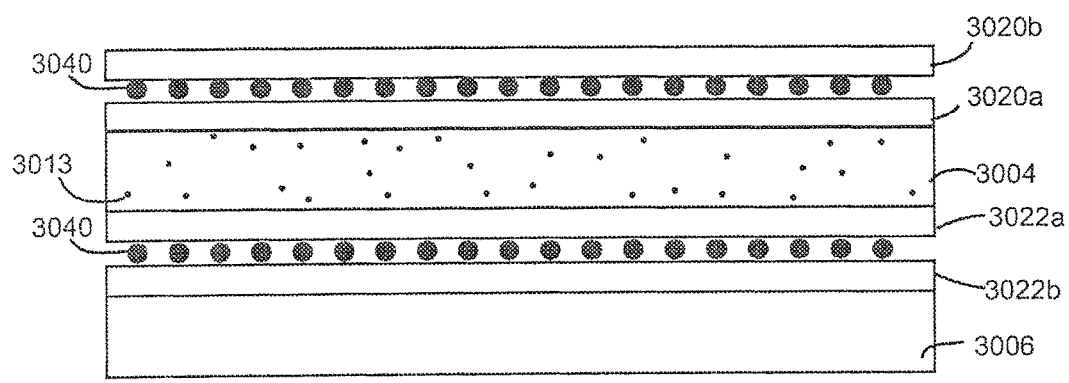
Figure 30C:
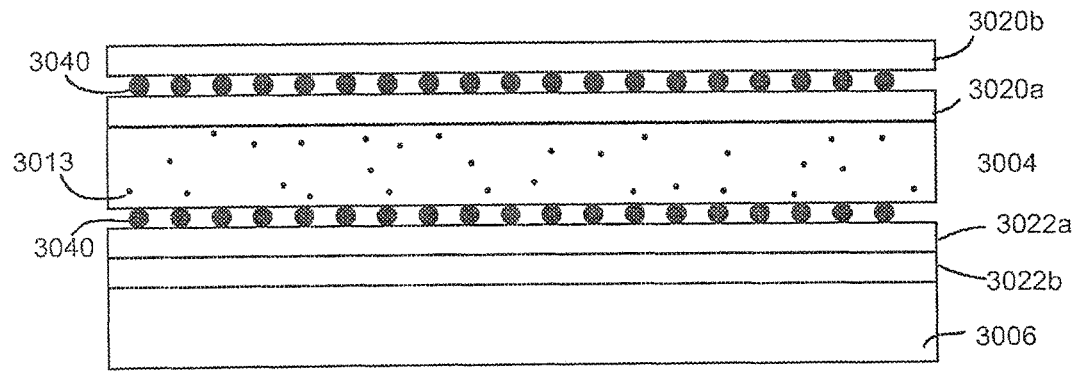
Figure 31A:
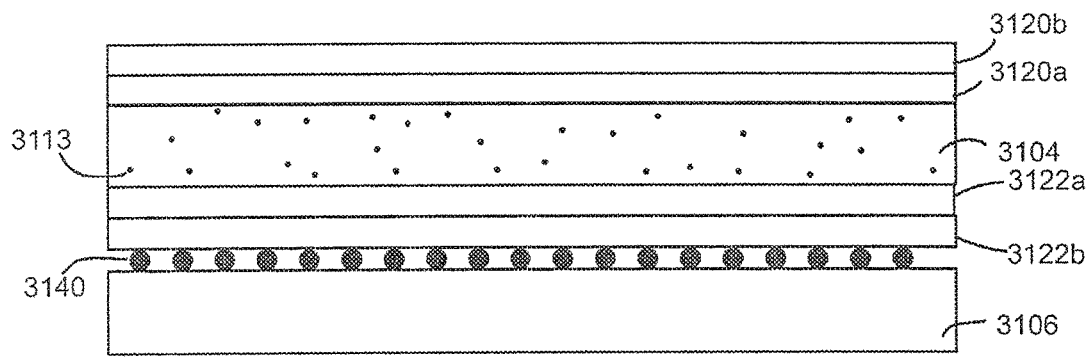
Figure 31B:
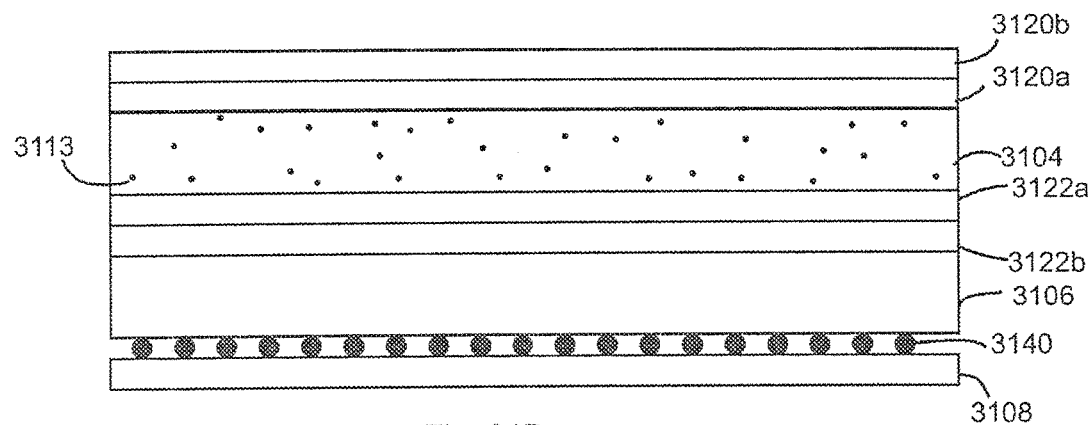
Figure 31C:
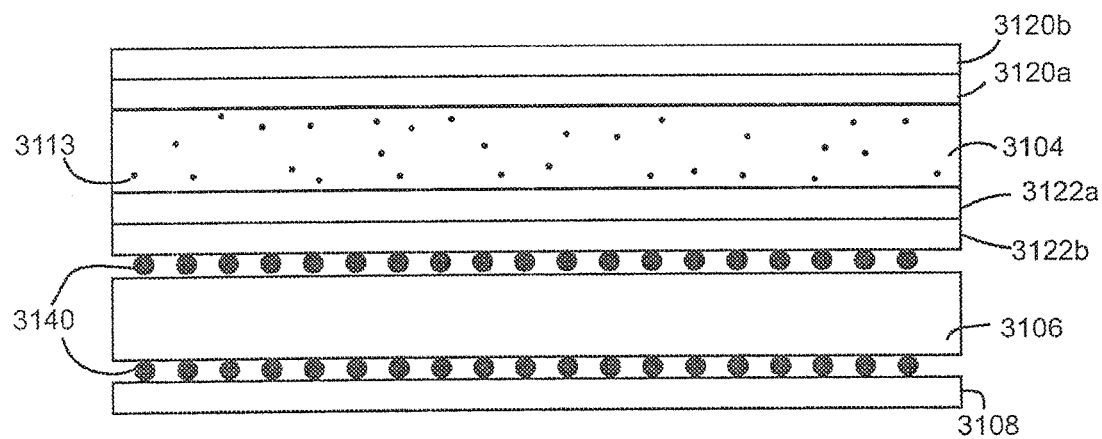
Figure 32:
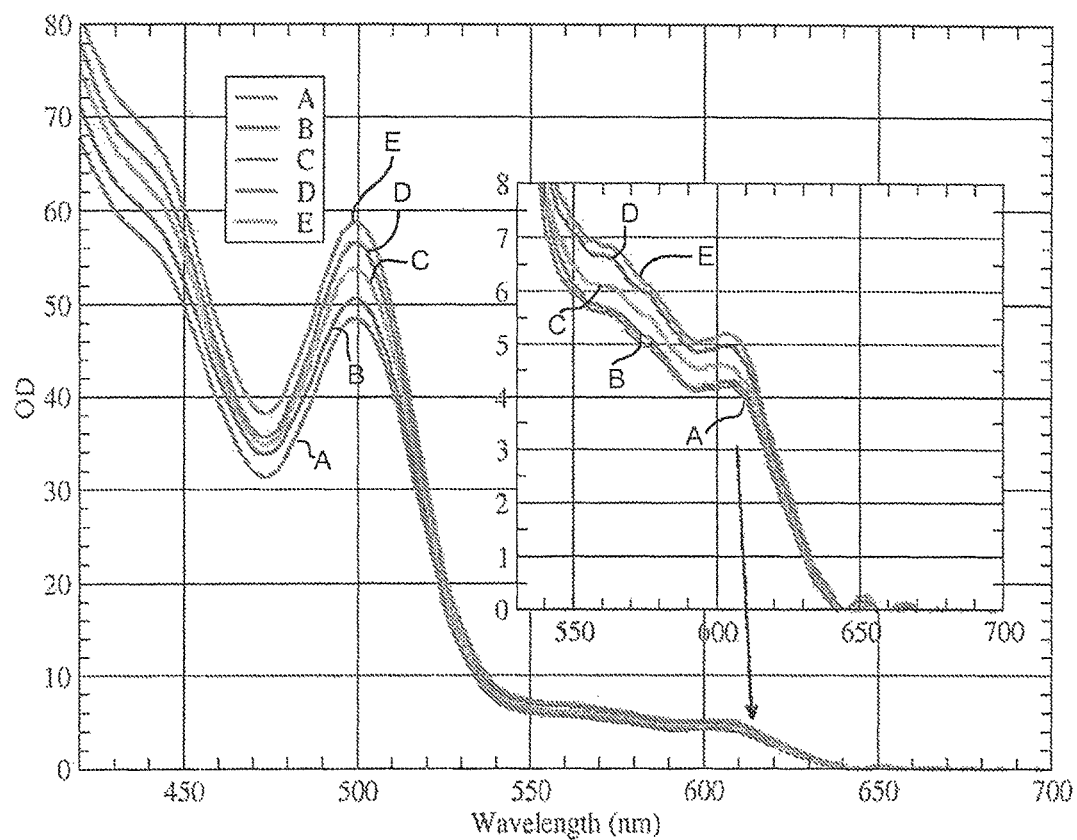

In certain embodiments, as illustrated in FIGS. 29-31, the scattering particles 2940, 3040, 3140 are disposed adjacent the QD phosphor material. For example, the scattering particles can be disposed directly adjacent the QD phosphor material. The scattering particles can be disposed on or near the bottom (FIG. 29A), top (FIG. 29B), or both sides (FIG. 29C) of the QD phosphor layer. The scattering particles can be disposed in direct contact with the QD phosphor material as shown in FIGS. 29A-29C, and/or separated by one or more barrier layers of the device, as shown in FIGS. 30A-30C and 31A-31C. The scattering particles can be disposed above and/or below the LGP, as shown in FIGS. 31A-31C. As described above, the scattering particles can be located adjacent, on, or within the LGP, as shown in FIGS. 24-25 and FIGS. 31A-31C. The scattering particles can be disposed within one or more of the barrier layers of the device—e.g., within one or more of the barrier layers 1420a-1420d, 1422a-1422d, shown in FIG. 14A-14C.

As will be understood by persons having ordinary skill in the art, any of the methods and devices related to primary light manipulation or scattering can be combined with any of the QD film embodiments of the invention, including those embodiments specifically described herein.

Layers and Spatial Variations

As described above, the QD film of the present invention includes a QD phosphor material layer. In preferred embodiments, the QD phosphor material layer will have a uniform thickness over the entire display viewing plane surface area. In other embodiments, the QD phosphor material layer can have a varied thickness over the viewing plane surface area, and can have a wedge-shape increasing or decreasing in thickness away from one or more edges of the QD film. The QD film can be formed having any suitable shape. In preferred embodiments, the QD phosphor material and QD film form a flat film having a uniform thickness over the entire display viewing plane surface area. In embodiments having multiple QD phosphor material layers, as shown in FIGS. 26B-26G, the thickness of each layer can have a thickness chosen for ideal curing.

Figure 24A:
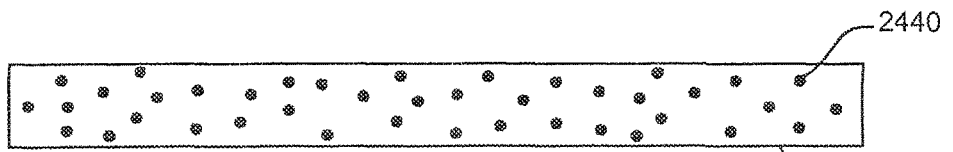
Figure 24B:
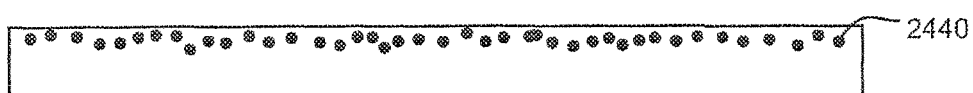
Figure 24C:
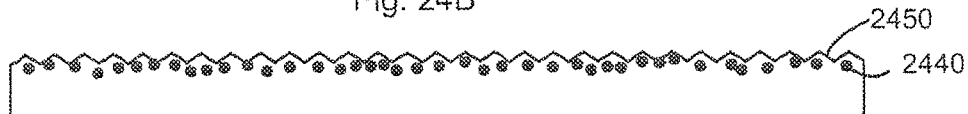
Figure 24D:
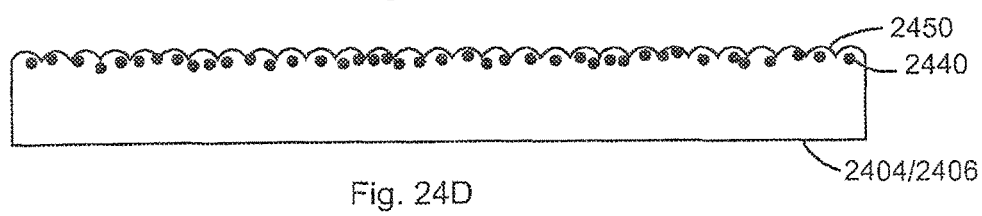
Figure 24E:
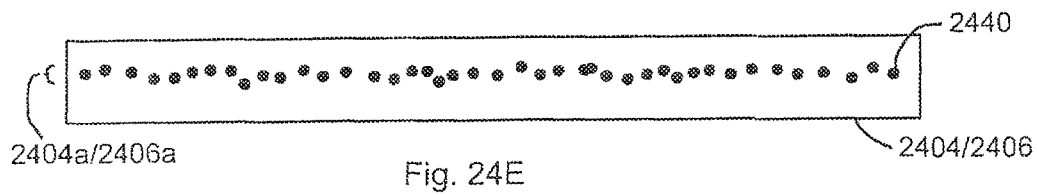
Figure 24F:
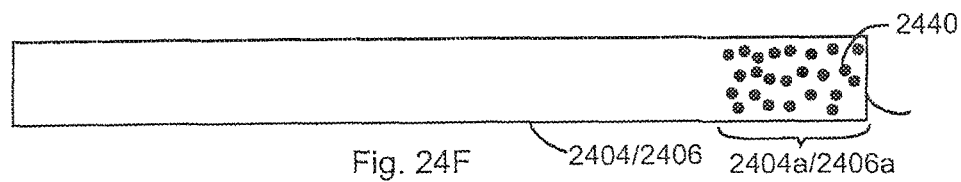
Figure 24G:
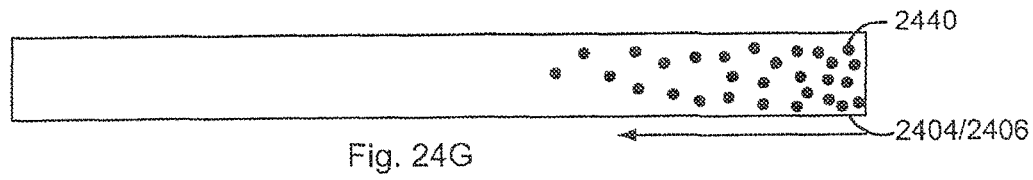
Figure 24H:
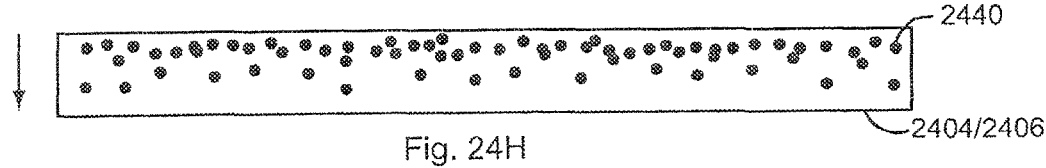

Multiple arrangements of QDs and/or other features of the QD phosphor material (e.g., scattering particles) can achieve the beneficial effects provided by the present invention. For example, as shown in FIGS. 23A, 24A, and 27C, the QDs are dispersed uniformly (i.e., evenly or homogeneously) throughout the QD phosphor material in a colloidal fashion.

In certain embodiments, the QD phosphor material of the QD film can include multiple layers or spatial regions having different elements or characteristics. For example, the QD film can include multiple QD phosphor material layers having different matrix materials comprising differing refractive indices. As another example, the QD phosphor material can comprise a first layer or region comprising a first population of QDs capable of emitting secondary light having a first wavelength (e.g., green light-emitting QDs), and a second layer or region comprising a second population of QDs capable of emitting secondary light having a second wavelength (e.g., red light-emitting QDs). The QD film may further comprise a population of scattering beads or other scattering features disposed in the same layer as one or more of the QD populations, and/or in at least a third layer or region. The at least third layer or region can be disposed adjacent and/or between one or more QD-containing layers. In still other embodiments, the multiple layers or spatial regions of the QD phosphor material can comprise spatially varied characteristics, such as QD concentration, scattering bead concentration, or other characteristics. For example, as shown in FIGS. 23B-24H, 24B-24H, and 25B-25I, the QDs 2313, 2513 and/or scattering particles 2440, 2540 can be disposed more predominantly in particular regions of the QD phosphor material, such as toward the top, middle, bottom, or edges of the QD phosphor material, or any suitable combination thereof. The QDs and/or scattering particles can be disposed closer or further from the incident surface of the primary light. The QDs and/or scattering particles can have a gradient density, increasing or decreasing from top to bottom, bottom to top, one or more edges, or any other location within one or more layers of the QD phosphor material. In additional embodiments, the QD film can comprise one or more layers comprising a blank matrix material—e.g., formed as top and/or bottom layers of the QD phosphor material. Such blank matrix material layers can provide increased adhesion to adjacent layers such as barrier layers, provide additional thickness, provide optical matching to adjacent layers, or can function as a barrier layer.

The QD film can have one QD phosphor material layer, as shown in FIG. 26A. In preferred embodiments, the QD film comprises a QD phosphor material having two or more layers, such as layers 2604a and 2604b shown in FIG. 26B. In preferred embodiments, the QD phosphor material comprises multiple layers, as shown in FIGS. 26B-26G, and the QDs 2613 and/or scattering features (e.g., scattering particles) 2640 can be dispersed within one or more QD phosphor material layers of the multiple QD phosphor material layers. The different QD phosphor material layers can have the same or different arrangements or characteristics of QDs and/or scattering features. For example, the different QD phosphor layers can have different QD characteristics in one or more of the different QD phosphor material layers, such as different QD emission colors, concentrations, sizes, materials, gradients, or arrangements. Additionally or alternatively, the different QD phosphor layers can have different scattering particle characteristics, such as differing scattering particle sizes, materials, refractive indices, densities, quantities, gradients, or arrangements. For example, the multiple QD phosphor layers can comprise any combination of different layers described above regarding FIGS. 23, 24, and 25. For example, in one or more of the QD phosphor material layers, as shown in FIGS. 23B-23H, FIGS. 24B-24H, and FIGS. 25B-25I, the QDs 2313, 2513 and/or the scattering beads 2440, 2540 can be disposed more predominantly in particular regions of the QD phosphor material 2304, 2504, such as toward the top, middle, bottom, or edges of the QD phosphor material, or any suitable combination thereof. The QDs and/or scattering particles can be closer to or further from the incident surface of the primary light. The QDs and/or scattering particles can have a gradient density, increasing or decreasing from top to bottom, bottom to top, one or more edges, or any other location within the QD phosphor material. In preferred embodiments having multiple QD phosphor material layers, the QDs 2613, 2613a, 2613b can be dispersed within one or more QD phosphor material layers of multiple QD phosphor material layers 2604a, 2604b, 2604c or between multiple such layers, as shown in FIG. 26F-26G. The scattering particles can be embedded in one or more matrix materials, as shown in FIGS. 26D-26F, or deposited without a matrix material, as shown in FIG. 26G. The different QD phosphor layers can have differing arrangements or characteristics of scattering particles. For example, the different QD phosphor layers can have different scattering particle characteristics. For example, QD populations 2613a and 2613b, as shown in FIGS. 26C, 26D, 26F, and 26G, can have different emission colors, concentrations, sizes, materials, gradients, arrangements, or any combination thereof. In preferred embodiments, scattering particles 2640, 2640a, 2640b are disposed in the same layer as each population of QDs so as to maximize the multi-directional dispersion of primary light within each QD remote phosphor layer comprising QDs, and thus maximize the probability of primary light absorption by the QDs. While only one, two, or three QD phosphor material layers are shown in FIG. 26, the QD film can comprise any suitable number of QD phosphor material layers. The multiple layers can be distinct from one another, or merged as a single QD phosphor material layer. Methods for forming the multiple QD phosphor material layers can include applying and curing each layer prior to applying the next layer, or applying multiple layers and curing the multiple layers at the same time.

In one class of embodiments, the QD film remote phosphor package of the present invention includes a QD phosphor material comprising at least one population of QD phosphors. The QDs are chosen based on the desired emission properties of the lighting application for which the QD film is used. The phosphor material converts at least a portion of the primary light into different wavelengths of light. The QD phosphor material can include any QDs suitable for emitting secondary light upon down-conversion of primary light emitted from a primary light source and absorbed by the QDs. In preferred embodiments, the QD phosphor material includes a first population of quantum dots of a material and size which emit red secondary light upon excitation by the primary light, and a second population of quantum dots of a material and size which emit green secondary light upon excitation by the primary light. In such embodiments, a portion of the blue primary light, the red secondary light, and the green secondary light are collectively emitted from the QD film and the overall lighting device as white light. Each population of QDs can be disposed in the same or different QD phosphor material layers. In a preferred embodiment, the QD film comprises a first QD phosphor material layer comprising a population of red light emitting QDs, a second QD phosphor material layer comprising a population of green light emitting QDs, and at least one population of scattering particles disposed within one or more of the first QD phosphor material layer, the second QD phosphor material layer, and a separate QD film layer.

In additional embodiments, the QD phosphor material can suitably comprise additional and/or different QD populations for emitting additional primary light (e.g., blue light), or secondary light of an additional and/or different color than the red and green light-emitting QD populations (e.g., yellow light, or a different shade of red or green light). In one example embodiment, the phosphor material comprises a third population of QDs of a material and size which emit blue light upon excitation by the primary light, which primary light can include blue or ultraviolet light, for example. In other embodiments, the phosphor material may comprise a population of quantum dots or a combination of different populations of quantum dots of a material and size which emit light at the desired wavelength of light emission upon excitation. The phosphor material can comprise a population of quantum dots of a material and size which emit red, orange, yellow, green, or blue light; or multiple populations of quantum dots which comprise any combination thereof.

In certain embodiments, the QD film can include a plurality of spatial regions having multiple different light emission characteristics. In one embodiment, the QD film comprises a first plurality of spatial regions comprising a first population of QDs capable of emitting light having a first wavelength or wavelength range (e.g., green light-emitting QDs), and at least a second plurality of spatial regions comprising a second population of QDs capable of emitting light having a second wavelength or wavelength range which is different than the first wavelength or wavelength range (e.g., red light-emitting QDs). The QD film can further comprise a third plurality of spatial regions comprising a third population of QDs capable of emitting light having a third wavelength or wavelength range which is different from at least one of the first and second wavelengths or wavelength ranges (e.g., blue light-emitting QDs). The QD film can comprise additional pluralities of spatial regions comprising additional populations of QDs capable of emitting light having additional wavelengths or wavelength ranges different from at least one of the first, second, and third wavelengths or wavelength ranges. For example, the QD film can include a plurality of distinct spatial regions or pixels, wherein each pixel comprises a plurality of smaller spatial regions or subpixels which emit different colors of light. For example, the QD phosphor layer can include a plurality of pixels, wherein each pixel includes a first subpixel comprising one or more red light-emitting QDs, a second subpixel comprising one or more green light-emitting QDs, and a third subpixel comprising one or more blue light-emitting QDs.

Color Tuning and White Point

Preferred embodiments include a first population of quantum dots which emit red secondary light and a second population of quantum dots which emit green secondary light, most preferably wherein the red and green light-emitting QD populations are excited by a portion of the blue primary light to provide white light. Suitable embodiments further comprise a third population of quantum dots which emit blue secondary light upon excitation. The respective portions of red, green, and blue light can be controlled to achieve a desired white point for the white light emitted by the device. For a quantum dot phosphor material according to the present invention, the total amount of primary light which is converted versus the amount which is passed through the remote phosphor is a function of the phosphor concentration. Thus, the amount of primary light converted to secondary light will depend on the concentration of quantum dots in the phosphor material in the phosphor package. The resulting color and brightness of the light emitted from the device can be controlled by changing the ratio and/or concentration of each population of quantum dots in the phosphor material—i.e., the green and red light-emitting phosphor quantum dot populations in the phosphor material. Additionally, the color and brightness can be controlled by changing the characteristics of the scattering particles in the QD phosphor material, such as the size, quantity, material, concentration, and arrangement of scattering particles.

In order to achieve a desired light output, such as a desired white point and brightness, each of the primary light source, the QDs, and the scattering particles can be toggled, either alone or in combination. In preferred embodiments, each of the primary and secondary light sources are chosen to maximize the efficiency of the system and provide the desired color and brightness of light emitted from the primary and secondary light sources. For example, the primary light source can be chosen based on optimal efficiency for the desired emission characteristics, and the primary light source may also be chosen to have an excitation wavelength at which the maximum amount of energy is absorbed and reemitted by the phosphor material. The QDs can be adjusted to provide the desired output when combined with the primary light source. The primary light source can be chosen based on established standards of the phosphor material. However, in preferred embodiments, the QD phosphor material is tailored to provide the desired light output based on established characteristics of the primary light source. The ability to toggle the QDs to accurately achieve a desired light emission output is one advantage of the many advantages of size-tunable QDs as a phosphor material in lighting devices such as display BLUs. In preferred embodiments, the QDs are chosen based on their emission wavelength and spectral width (i.e., color and color purity), as well as quantum efficiency, to maximize brightness of the secondary light emission. Adjusting the concentration of QDs and the ratio of different QD populations will affect the optical density of the QD phosphor material.

Suitably, the QDs will be loaded in the QD film at a ratio of between about 0.001% and about 75% by volume, depending upon the application, QD characteristics, QD film characteristics, and other BLU characteristics. The QD concentrations and ratios can readily be determined by the ordinarily skilled artisan and are described herein further with regard to specific applications. In exemplary preferred embodiments, the QD phosphor material of the QD film comprises less than about 20%, less than about 15%, less than about 10%, less than about 5%, less than 1%, or less than about 1% QDs by volume.

Several factors can be toggled to achieve a desired light output, whether the desired light emission is a single color of light emitted by a single population of QDs, or a mixed color of light emitted by both primary and secondary light and/or multiple different populations of QDs which emit different colors of light. In a preferred embodiment, the QD BLU emits white light comprising a mixture of blue light from the primary light source and secondary light including both red and green light emitted by respective populations of QDs. The primary and secondary light sources can be chosen to achieve a desired white point for the QD BLU. In preferred embodiments, the QD phosphor material comprises multiple layers having different green and/or red light emitting QD concentrations. Preferably, the green and red light emitting QDs are disposed in separate and distinct layers of the QD phosphor material. In other suitable embodiments, the first and second QD populations are formed in the same QD phosphor material layer(s).

Suitable methods for forming the QD film include a multi-point, iterative formulation for achieving any desired white point. In a preferred embodiment, the method of forming the QD phosphor material of the QD film includes an iterative multi-point formulation for white point targeting, wherein the QD phosphor material is formed starting with a first nominal mixture of QDs in a matrix material comprising a first percentage of red and green light emitting QDs in a base matrix material, then adding one or more additional mixtures of QDs in a matrix material, a blank matrix material, or a mixture of scattering particles in a matrix material. In one example embodiment, as shown in FIGS. 32, 33A-33C, the method includes a five-point formulation for white point targeting, wherein the QD phosphor material is formed from (A) a first nominal mixture of APS-coated QDs (or more preferably PEI-coated QDs) in an epoxy matrix material, to which one or more of (B) a second, (C) a third, (D) a fourth, and (E) a fifth mixture of APS-coated (or PEI-coated) QDs in epoxy is added to the nominal mixture (A). The respective amounts of each mixture can be included in any suitable amount, depending on the desired white point, brightness, and thickness of the QD phosphor material layer, as will be understood by a persons of ordinary skill in the art. Suitably, an iterative process is used to achieve the desired white point and brightness, wherein the mixtures are added independently, until the desired emission characteristics and thickness are achieved for the QD film. After each mixture is added, the QD phosphor material can be tested for white point and brightness, and the process can be stopped upon reaching the desired white point, brightness, and QD phosphor material layer thickness. Suitably, the QD film and emission characteristics, including the optical density, emission wavelengths, FWHM, white point, and brightness, can be periodically tested using ultraviolet-visible and fluorescence spectroscopy, or other suitable methods of spectrophotometry known in the art.

Figure 33A:
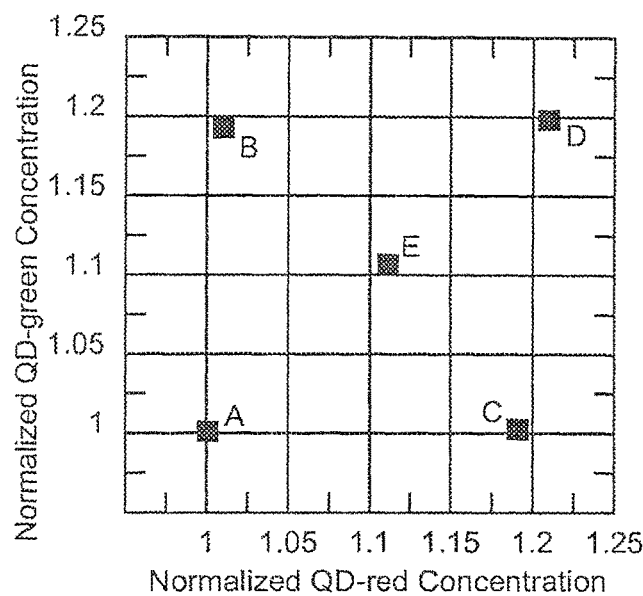
Figure 33B:
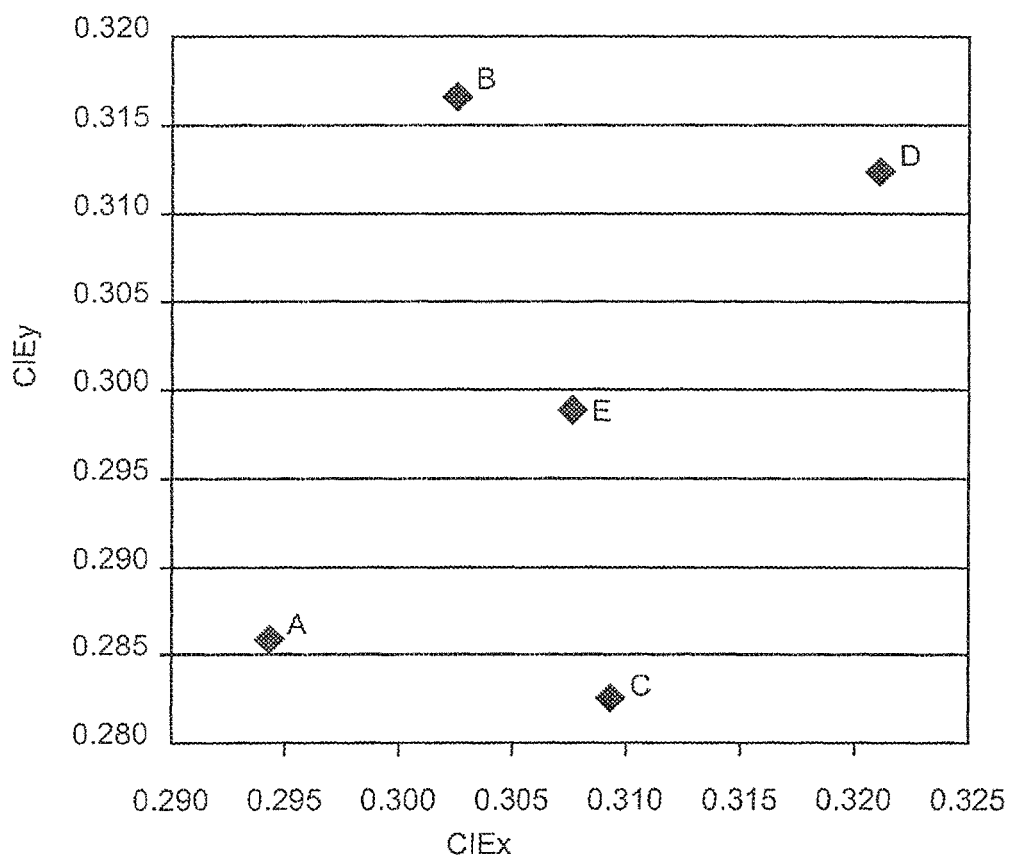
Figure 33C:
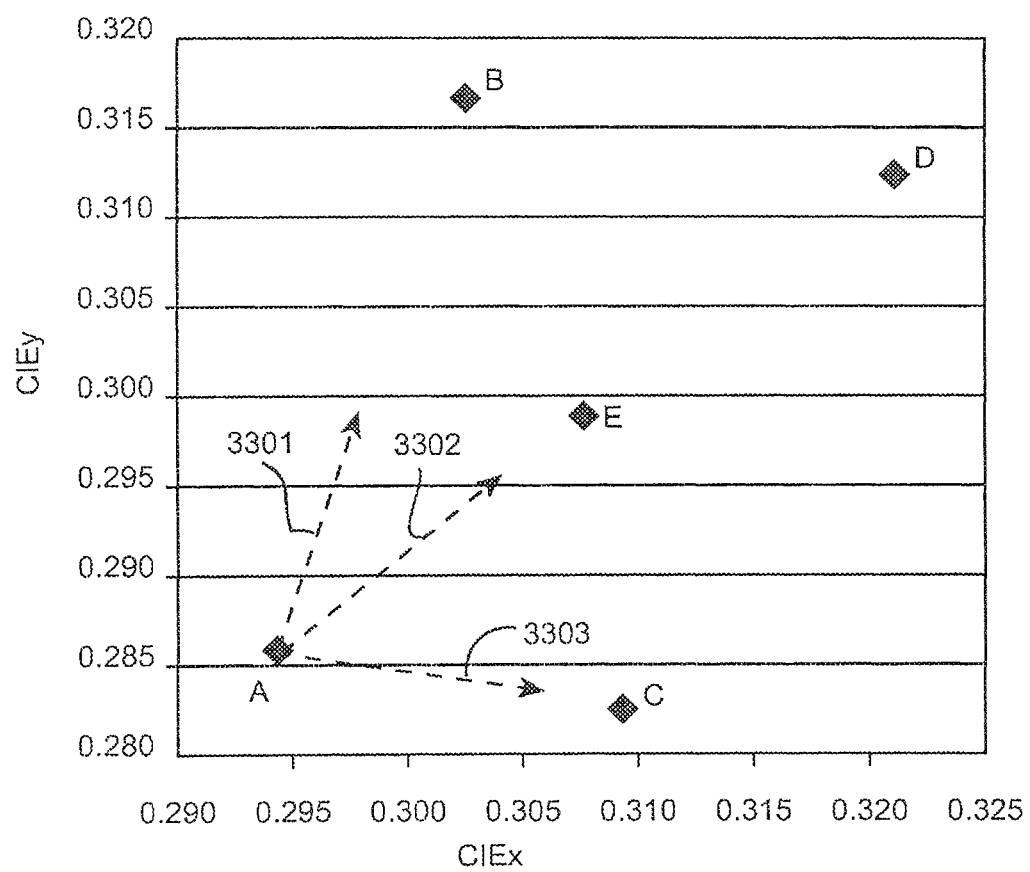

In one exemplary embodiment, the nominal mixture (A) comprises 30% by volume green light emitting QDs and 15% by volume red light emitting QDs. To the mixture (A), a suitable amount of one or more of the mixtures (B) comprising 20% by volume green light emitting QDs, (C) comprising 20% by volume red light emitting QDs, (D) 20% green and 20% red, and (E) 10% green and 10% red, can be added in any suitable amount. As shown in FIG. 33C, the mixture (B) can be added to achieve a predominantly more green light 3301, the mixture (C) can be added to achieve a predominantly more red light 3303, and either of the mixtures (D) and (E) can be added to achieve similar proportions of more red and green light 3302. Mixture (D) can be added when much more red and green light is desired, and/or when less film thickness is desired to be added to the QD phosphor material. Mixture (E) can be added when less red and green light is desired, and/or when more film thickness is desired. As will be understood by persons of ordinary skill in the art, absorbance of secondary light by the QDs will likely occur, and will require adjustments to balance such absorbance. For example, in embodiments having green and red light emitting QDs, a portion of the green secondary light will be absorbed and reemitted as red secondary light. To remedy this, a higher percentage or concentration of green light emitting QDs will be required to balance the additional red secondary light produced by green light absorbance. In preferred embodiments, each of the mixtures (A)-(E) further comprises a population of scattering particles, wherein the scattering particles can have the same or different concentration in each mixture. In other suitable embodiments, the scattering particles are added to the QD phosphor material in a separate mixture of scattering particles and a matrix material. In one exemplary QD film embodiment, the final QD phosphor material formulation comprises about 55% by volume green light emitting ligand-coated QDs, about 25% by volume red light emitting ligand-coated QDs, about 5% by volume scattering particles, and about 30% by volume matrix material. Preferably, the ligand material comprises APS, the matrix material comprises epoxy, and the scattering particles comprise silica or borosilicate beads. More preferably, the ligand material comprises PEI, the matrix material comprises epoxy, and the scattering particles comprise silica or borosilicate beads.

In an example embodiment, the concentration of quantum dots in the phosphor material is set so that roughly 20% of the incident light will pass through the phosphor without conversion into secondary light—i.e., 20% of the primary blue light will exit the phosphor material. The remainder of the primary light entering the phosphor material is absorbed by the quantum dots and re-emitted as secondary light or lost due to inefficiencies. For example, in the example embodiment where 20% of the blue primary light transmits through and exits the phosphor package, 32% of the primary light is re-emitted as green light and 40% is re-emitted as red light. In this example embodiment, the QDs of the phosphor material have a quantum yield of about 90%, so the remaining 8% of the primary light is lost due to absorption without reemission in the phosphor material. Since some of the green secondary light in the phosphor is absorbed and re-emitted as red light by the red light-emitting QDs, additional changes in the ratios of the green and red quantum dots in the phosphor material may be needed to achieve the final desired output emission spectrum from the top plate of the phosphor.

As will be understood by persons of ordinary skill in the art the specific percentages of the different QD populations are not limiting, and any suitable mixture or mixtures of QDs and matrix materials can be employed to form the QD film. Additionally, any of the QD film embodiments described herein can be formed using the multi-formulation method described herein, for example, including multi-layered QD phosphor materials and QD phosphor material layers having different or varied QD and/or scattering particle characteristics.

QD Phosphor Material Application

The QD phosphor material can be deposited by any suitable method known in the art, including but not limited to painting, spraying, solvent-spraying, wet-coating, adhesive coating, spin-coating, tape coating, or any suitable deposition method known in the art. Preferably, the QD phosphor material is cured after deposition. Suitable curing methods include photo-curing, such as UV-curing, and thermal curing. Traditional laminate film processing methods, tape-coating methods, and/or roll-to-roll fabrication methods can be employed in forming the QD films of the present invention. The QD phosphor material can be coated directly onto the desired layer of the lighting device. Alternatively, the QD phosphor material can be formed into a solid layer as an independent element and subsequently applied to the BLU stack. The QD phosphor material can be deposited on one or more barrier layers, the LGP, or another layer of the BLU.

In other lighting device embodiments (e.g., a down lighting device), the QD phosphor material can be deposited on any suitable surface or substrate of the lighting device. In one example embodiment, the QD phosphor material can be deposited on the interior surface of the housing of a lighting device, and the QD phosphor material can optionally be sealed by depositing a barrier layer adjacent the QD phosphor material. In another example embodiment, the QD film is first formed, suitably including barrier layers adjacent the QD phosphor material on the top and bottom sides, and the QD film is subsequently molded to form an emissive layer of the lighting device. In one example embodiment, the QD film is molded to form (or fit) the exterior housing or walls of the lighting device.

In a preferred class of embodiments, the QD phosphor material is deposited via wet-coating and thermally cured post-deposition. As shown in FIG. 34, illustrating a suitable method for forming the QD film, one or more bottom barrier layers is provided in step 3410, one or more QD phosphor material mixtures are deposited onto the barrier substrate in step 3420 to form the QD phosphor material layer 3404, one or more top barrier layers are deposited on the QD phosphor material in step 3430, the QD phosphor material is cured in step 3440, the QD film is optionally sealed in step 3450, and the QD film is applied to the desired lighting device, such as a display BLU, in step 3460.

In certain embodiments, each of the first and second barriers 3520, 3522 can include glass sheets which are cut into smaller sections. This cutting can be done after any of steps 3430, 3440, and 3450. In such embodiments, convenient roll-to-roll manufacturing can be employed to form the various layers of the device. In still further embodiments, the first and second glass plates can be provided in a size appropriate for the device application prior to application of the QD phosphor material 3420. Upon formation of the QD film remote phosphor package, the QD film is optically coupled to one or more primary light sources, such as blue LEDs, such that light from the primary light sources is incident on the bottom surface of the bottom glass plate. Preferably, the QD film is disposed above a LGP of a display BLU, such that the incident primary light is entirely incident on the bottom plate. Most preferably, the QD film is disposed between the LGP and at least one BEF of a LCD BLU.

Preferably, the mixtures are thermally cured to form the QD phosphor material layer. In a preferred embodiment, the QD phosphor material is coated directly onto a barrier layer of the QD film, and an additional barrier layer is subsequently deposited upon the QD phosphor material to create the QD film. A support substrate can be employed beneath the barrier film for added strength, stability, and coating uniformity, and to prevent material inconsistency, air bubble formation, and wrinkling or folding of the barrier layer material or other materials. Additionally, one or more barrier layers are preferably deposited over the QD phosphor material to seal the material between the top and bottom barrier layers. Suitably, the barrier layers can be deposited as a laminate film and optionally sealed or further processed, followed by incorporation of the QD film into the particular lighting device. The QD phosphor material deposition process can include additional or varied components, as will be understood by persons of ordinary skill in the art. Such embodiments will allow for in-line process adjustments of the QD phosphor emission characteristics, such as brightness and color (e.g., to adjust the QD film BLU white point), as well as the QD film thickness and other characteristics. Additionally, these embodiments will allow for periodic testing of the QD film characteristics during production, as well as any necessary toggling to achieve precise QD film characteristics. Such testing and adjustments can also be accomplished without changing the mechanical configuration of the processing line, as a computer program can be employed to electronically change the respective amounts of mixtures to be used in forming a QD film.

In a preferred process embodiment for forming the QD film, as shown in FIG. 35, different mixtures of QD phosphor materials are provided in separate mixtures A, B, C, D, E prior to deposition. In one example embodiment, mixtures A-E can include the five mixtures described above regarding FIG. 33 and the five-point formulation method including mixtures A, B, C, D, and E.

In another example embodiment, the process can include multiple mixtures of QD phosphor materials having different characteristics. For example, a first mixture A can include a first population of QDs capable of emitting a first wavelength of secondary light (e.g., red light), and a second mixture B can include a second population of QDs capable of emitting a second wavelength of secondary light different from the first wavelength (e.g., green light). The process can include additional mixtures, such as a third mixture C comprising a third population of QDs which emit red light having a different wavelength than the first wavelength of red light, and a fourth mixture D comprising a fourth population of QDs which emit green light having a different wavelength than the second wavelength of green light. Any suitable ratio mixture of any of the first, second, third, and fourth mixtures can be combined to create the desired QD phosphor material characteristics. Such mixtures can be further combined with at least a fifth mixture E comprising blank matrix material (e.g., epoxy), a population of scattering beads, or a combination thereof. The mixtures can be deposited simultaneously or separately, and can be cured individually or simultaneously.

In still another embodiment, the mixtures include multiple mixtures of ligand-coated QDs in an epoxy matrix material, wherein the mixtures have different QD concentrations. For example, the process can include a first mixture of ligand-coated QDs in epoxy having a first concentration of red light-emitting QDs, a second mixture of ligand-coated QDs in epoxy having a second concentration of red light-emitting QDs which is higher than the first concentration, a third mixture of ligand-coated QDs in epoxy having a third concentration of green light-emitting QDs, and a fourth mixture of ligand-coated QDs in epoxy having a fourth concentration of green light-emitting QDs which is higher than that of the third concentration. Preferably, the ligand is APS or, more preferably, PEI. Any suitable ratio mixture of any of the first, second, third, and fourth mixtures can be combined to create the desired QD phosphor material characteristics. Such mixtures can be further combined with at least a fifth mixture comprising a blank epoxy material, one or more populations of scattering beads, or a combination thereof, to form the QD phosphor material of the QD film.

In a preferred class of embodiments, the processes of the present invention can comprise forming a first mixture having a first QD concentration, coating a substrate with the first mixture to form a first layer of the QD phosphor material, forming a second mixture having a second QD concentration, coating the substrate with the second mixture to form a second layer of the QD phosphor material, and curing the first and second QD phosphor material layers. In certain embodiments, the processes can further comprise repeating these steps with a third through $i^{th}$ mixture of QDs, coating the substrate with the third through $i^{th}$ mixtures to form third through $i^{th}$ QD phosphor material layers, and curing the third through $i^{th}$ QD phosphor material layers. The first through $i^{th}$ layers can have the same or different emission characteristics, QD types, QD concentrations, matrix materials, refractive indices, and/or scattering particle sizes, concentration, or materials; or other differing characteristics. By providing individual QD phosphor material layers, each with a potentially different characteristics, a QD film can be generated that has a QD gradient throughout the overall layer, or other gradient properties throughout the overall QD phosphor material layer. In other embodiments, any of the characteristics of the individual layers can be the same, or can be prepared in such a manner that the overall characteristic varies within an individual layer only, or from layer to layer in a non-graded fashion. In additional embodiments, the processes of the present invention can comprise forming a single QD phosphor material from such multiple mixtures, such as the first through $i^{th}$ mixtures.

In any of the foregoing embodiments, the process can include one or more mixtures comprising scattering features, such as scattering beads, and a matrix material. The process can include multiple mixtures having different sizes and/or concentrations of scattering beads. For example, the process can include a first mixture comprising a first size of scattering beads and at least a second mixture comprising a second size of scattering beads. Additionally, or alternatively, the process can include a first mixture comprising a first concentration of scattering beads and at least a second mixture comprising a second concentration of scattering beads.

In any of the foregoing embodiments, the process can include a blank matrix material, such as epoxy, a PEI-epoxy mixture, or an APS-epoxy mixture, which can be added to the QD phosphor material mixture to adjust the QD phosphor material layer thickness, adhesiveness, index of refraction, QD concentration, scattering bead concentration, viscosity, or other elements. The blank material can provide a seal material, such as a seal region around the edges of the individual QD phosphor layers, and the blank material can be used to form a buffer layer to separate distinct regions of the QD phosphor material.

In certain embodiments, processes for forming the QD film include the formation of spatial variations in one or more layers of the QD film, as explained in more detail above.

Electroluminescent Devices

In one general class of embodiments, the QD film includes a plurality of QDs, whereby the QD film is used as an electroluminescent light source. As shown in FIGS. 39A-39C, the electroluminescent device 3900 includes a QD film 3902 including a luminescent QD layer 3904. Preferably, the luminescent QD layer 3904 includes a plurality of QDs dispersed in a matrix material 3930. Preferably, the QD layer 3904 includes multiple different QDs capable of emitting different wavelengths of light. In preferred embodiments, the luminescent QD layer 3904 includes a uniform mixture of different QDs which together emit a mixed color of light (e.g., white light), whereby the light emitted from the electroluminescent device 3900 is a uniform, mixed color of light comprising the different colors of light emitted by the different QDs. For example, the QD layer 3904 can include a mixture of red light-emitting QDs 3904a, green light-emitting QDs 3904b, and blue light-emitting QDs 3904c, wherein the red, green, and blue light-emitting QDs are uniformly distributed throughout the horizontal plane of the QD layer 3904 such that the light emitted by the electroluminescent device 3900 is white light.

Most preferably, the QD layer includes a first plurality of QDs capable of emitting red light, a second plurality of QDs capable of emitting green light, and a third plurality of QDs capable of emitting blue light, In certain embodiments, the QD layer 3904 includes a monolayer of QDs.

The layers surrounding the luminescent QD layer 3904 in the electroluminescent device 3900 can include any arrangement of layers suitable for forming an electroluminescent BLU, including any layers and arrangement of layers known to those of ordinary skill in the art. In the example embodiment shown in FIG. 39A, the device includes the luminescent QD layer 3904, an anode layer 3962, and a cathode layer 3964. Preferably, the cathode layer 3964 is a reflective layer, whereby light emitted by the electroluminescent QDs is reflected away from the cathode layer 3964, such that light is emitted by the BLU only from the top surface of the BLU. The cathode layer 3964 can be the reflective layer, or a separate reflective layer can be included (not shown). As shown in FIG. 39B, the device can further include a first encapsulation or barrier layer 3920 and a second encapsulation or barrier layer 3922. Preferably, the electroluminescent QD layer 3904 disposed between the first and second encapsulation layers. Preferably, each of the first and second encapsulation barrier layers are directly adjacent to and in direct physical contact with the electroluminescent QD layer 3904. As shown in FIG. 39C, the device can further include a hole transport layer (HTL) 3966 disposed between the electroluminescent QD layer 3904 and the anode 3962, and/or an electron transport layer (ETL) 3968 disposed between the electroluminescent QD layer 3904 and the cathode 3964. In another embodiment (not shown), the device can include the anode, the cathode, and the HTL and/or ETL, whereby one or more of these layers forms a barrier layer to protect the electroluminescent QD layer. As will be understood by persons of ordinary skill in the art, any suitable combination of these layers or elements described herein can be employed to form the electroluminescent BLU of the present invention.

In one embodiment, the electroluminescent QD BLU can include pixel electronics, e.g., row and column transistors, to individually address different spatial regions or pixels of the QD layer 3904. This allows for electrical stimulation (or lack thereof) of QDs confined to the particular region of the QD layer 3904 which is electronically addressed by the relative transistors. This allows for local light emission and local dimming over different spatial regions of the QD layer simultaneously, thereby saving energy and improving contrast during operation of the BLU. In one embodiment, the anode layer 3962 and/or cathode layer 3964 can include row and/or column transistors. For example, the BLU can include an active matrix or a passive matrix transistor configuration to address individual spatial regions or pixels in the QD layer 3904, or any other transistor configurations known to those of ordinary skill in the art.

In another class of embodiments, the luminescent QD layer 3904 can include a plurality of spatial regions distinguished by the color of light emitted by the quantum dots disposed within each spatial region. For example, the QD layer 3904 can include a first plurality of spatial regions or pixels patterned in the QD layer to create a BLU for a display device. Each pixel can include a separate subpixel for emitting red, green, and blue light. The QD phosphor layer can include a first plurality of spatial regions or subpixels comprising red-emitting QDs, a second plurality of spatial regions or subpixels comprising green-emitting QDs, and optionally a third plurality of spatial regions or subpixels comprising blue-emitting QDs. The subpixels can be patterned using the roll-to-roll processing techniques described herein, whereby a separate QD matrix material is applied to form the red, green, and blue light-emitting spatial regions or subpixels. As explained above, the BLU can include any suitable transistor configuration for individually addressing the individual pixels and subpixels, whereby addressing each pixel or subpixel causes electrical stimulation of the QDs associated with each individual pixel or subpixel.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

As will be understood by persons of ordinary skill in the art, any of the foregoing device and/or processing components can be used in any suitable combination to form the QD film of the present invention.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A display backlighting unit (BLU), comprising:
    (a) at least one primary light source that emits primary light;
    (b) a light guide panel (LGP) optically coupled to the at least one primary light source, whereby the primary light is transmitted through the LGP;
    (c) a remote phosphor film comprising at least two populations of light emitting quantum dots (QDs), wherein the remote phosphor film is disposed over the LGP, wherein the primary light transmits through the LGP and into the remote phosphor film;
    (d) a first barrier film and a second barrier film, wherein the first and second barrier films are each disposed adjacent the remote phosphor film and on opposite sides thereof, and wherein the remote phosphor film is not directly physically coupled to the LGP;
    (e) a first reflector film disposed beneath the LGP, wherein the first reflector film reflects primary light toward the QDs in the remote phosphor film; and
    (f) a second reflector film disposed on top of the remote phosphor film, wherein the second reflector film reflects and recycles a portion of the primary light, such that the portion of the primary light has an increased optical path length within the remote phosphor film to cause increased primary light absorption by the QDs and thereby increase emission of secondary light.

2. The BLU of claim 1, wherein the second reflector film comprises a brightness enhancing film (BEF).

3. The BLU of claim 1, wherein the at least two populations of light emitting QDs comprises a first population of QDs configured to emit first secondary light and a second population of QDs configured to emit second secondary light at a different wavelength than the first secondary light, whereby at least a portion of the primary light is absorbed by the two populations of QDs and reemitted by the QDs as the first and second secondary light.

4. The display BLU of claim 2, wherein:
    each of the first and second barrier films includes a polymer sublayer and an oxide sublayer; and
    one of the first and second barrier films is directly physically coupled to the LGP.

5. The display BLU of claim 2, wherein the second reflector film further comprises:
    a first BEF configured to reflect and recycle a first portion of the primary light; and
    a second BEF configured to reflect and recycle a second portion of the primary light;
    wherein the first portion of the primary light and the second portion of the primary light have different incident angle ranges towards the second reflector film.

6. The display BLU of claim 5, wherein the second reflector film further comprises:
    a third BEF configured to reflect and recycle a third portion of the primary;
    wherein the third portion of the primary light has a different incident angle range towards the second reflector film compared to the first portion and the second portion of the primary light.

7. The display BLU of claim 5, wherein the at least one of the BEF and the second BEF is a reflective polarizer BEF.

8. The BLU of claim 1, wherein the first reflector film is a white film.

9. The BLU of claim 1, wherein the first reflector film comprises a reflective mirror.

10. The BLU of claim 1, wherein the first reflector film comprises scattering features.

11. The display BLU of claim 1, wherein the remote phosphor film comprises a plurality of layers.

12. The display BLU of claim 1, wherein the remote phosphor film comprises a plurality of individual films cut from one or more larger phosphor films.

13. The display BLU of claim 1, wherein a thickness of the polymer sublayer and a thickness of the oxide sublayer are less than a quarter of a thickness of the remote phosphor film.

14. A display backlighting unit (BLU), comprising:
    (a) at least one primary light source that emits primary light;
    (b) a light guide panel (LGP) optically coupled to the at least one primary light source, whereby the primary light is transmitted through the LGP;
    (c) a remote phosphor film comprising at least two populations of light emitting quantum dots (QDs), wherein the remote phosphor film is disposed beneath the LGP, wherein the primary light transmits through the LGP and into the remote phosphor film;

(d) a barrier film disposed adjacent a top surface of the remote phosphor film and a first reflector film disposed on an opposite side thereof, and wherein the remote phosphor film is not directly physically coupled to the LGP; and (e) a second reflector film disposed on top of the LGP, wherein the second reflector film reflects and recycles a portion of the primary light, such that the portion of the primary light has an increased optical path length within the remote phosphor film to cause increased primary light absorption by the QDs and thereby increase emission of secondary light.

15. The BLU of claim 14, wherein the second reflector film comprises a BEF.

16. The BLU of claim 14, wherein the first reflector film comprises one or more plastic or polymer barrier film layers and one or more reflective material layers.

17. The BLU of claim 14, wherein the first reflector film includes at least a first plastic or polymer barrier layer disposed directly adjacent to and in direct physical contact with the QD remote phosphor film, and a reflective film layer comprising a metal layer beneath the barrier layer.

18. The BLU of claim 17, wherein the metal layer comprises aluminum.

19. The display BLU of claim 14, wherein a thickness of the polymer sublayer and a thickness of the oxide sublayer are less than a quarter of a thickness of the remote phosphor film.

20. The display BLU of claim 14, wherein the barrier film is directly physically coupled to the LGP and includes a polymer sublayer and an oxide sublayer.

* * * * *